US012768460B2

(12) United States Patent
Laidlaw et al.

(10) Patent No.: US 12,768,460 B2
(45) Date of Patent: Oct. 20, 2026

(54) MIXING DEVICE

(71) Applicant: CFV Innovations, Inc., Vero Beach, FL (US)

(72) Inventors: Morgan Laidlaw, Santa Ana, CA (US); Chris Beukers, Vero Beach, FL (US); Arthur Viet Ho, Huntington Beach, CA (US); Gillian Callaghan, Vero Beach, FL (US)

(73) Assignee: CFV INNOVATIONS, INC, Vero Beach, FL (US)

( * ) Notice: Subject to any disclaimer, the term of this patent is extended or adjusted under 35 U.S.C. 154(b) by 0 days.

(21) Appl. No.: 19/250,248

(22) Filed: Jun. 26, 2025

(65) Prior Publication Data

US 2026/0002597 A1 Jan. 1, 2026

Related U.S. Application Data

(60) Provisional application No. 63/665,495, filed on Jun. 28, 2024.

(51) Int. Cl.

| | |
|---|---|
| ***F16K 11/20*** | (2006.01) |
| *B01F 23/451* | (2022.01) |
| *F16K 11/00* | (2006.01) |

(52) U.S. Cl.
CPC ............ *F16K 11/20* (2013.01); *B01F 23/451* (2022.01); *F16K 19/00* (2013.01)

(58) Field of Classification Search
CPC ........ F16K 15/04; F16K 7/12; G05D 16/0655
See application file for complete search history.

(56) References Cited

U.S. PATENT DOCUMENTS

| | | | | |
|---|---|---|---|---|
| 2008/0094935 A1* | 4/2008 | Newton | ............. | A01M 7/0092 366/132 |
| 2021/0347624 A1* | 11/2021 | Newton | ............... | B01F 23/451 |

* cited by examiner

*Primary Examiner* — P. Macade Nichols
(74) *Attorney, Agent, or Firm* — CF3; Stephen Eisenmann

(57) ABSTRACT

This disclosure relates to a mixing device including: an ingredient source coupled to a check valve and an ingredient pump, the ingredient pump coupled to an ingredient pump outlet line; a water supply connected to a water CF Valve, the CF Valve coupled to a water outlet line; the ingredient pump outlet line coupled to a high flow CF Valve and a low flow CF Valve; and a controller which operates at least one of the high flow CF Valve and the low flow CF Valve based on formula data to produce an ingredient outlet flow from at least one of the high flow CF Valve and the low flow CF Valve where the ingredient outlet flow and a water outlet flow from the water outlet line mix to produce a product mixture based on the formula data.

20 Claims, 33 Drawing Sheets

| | CFVI Mixing Device |
|---|---|
| Footprint | 24" x 16" x 10" |
| Portable | Yes |
| Flow Rate | 2 GPM |
| Dose Range | 1:1000 to 1:10 |
| Dose Accuracy | +/- 5% |
| Programmed Dosing | Yes |
| Sold Out Alarm | Yes |
| Annual Seal Replacements | No |
| Pressure Drop Through System | ~2 psi |
| Connected to the IoT | Yes |

1400

Benchmark Values (Lab Scale)

1402

| | 1406 | 1410 | 1412 | 1414 | 1416 | 1418 | 1420 | 1422 | 1424 | 1426 | 1428 |
|---|---|---|---|---|---|---|---|---|---|---|---|
| | % Tap | 1 | 2 | 3 | 4 | 5 | 6 | 7 | 8 | 9 | 10 |
| uS | 510 | 900 | 1320 | 1820 | 2240 | 2750 | 3150 | 3660 | 3960 | 4520 | 4840 |

1404

| | 1408 | 1430 | 1432 | 1434 | 1436 | 1438 | 1440 | 1442 | 1444 | 1446 | 1448 |
|---|---|---|---|---|---|---|---|---|---|---|---|
| | % Tap | 0.1 | 0.2 | 0.3 | 0.4 | 0.5 | 0.6 | 0.7 | 0.8 | 0.9 | 1 |
| uS | 540 | 640 | 670 | 700 | 730 | 760 | 800 | 830 | 860 | 910 | 970 |

FIG. 14A

1450

Baseline Test Runs

| Channel 1LF (1451) | | | | |
|---|---|---|---|---|
| % Open (1452) | Run 1 (1453) | Run 2 (1454) | Run 3 (1455) | Average (1456) |
| 1457 10 | 920 | 820 | 790 | 843 |
| 1458 20 | 790 | 790 | 780 | 787 |
| 1459 30 | 770 | 780 | 800 | 783 |
| 1460 40 | 810 | 810 | 810 | 810 |
| 1461 50 | 790 | 810 | 830 | 810 |
| 1462 60 | 850 | 850 | 860 | 853 |
| 1463 70 | 890 | 890 | 850 | 877 |
| 1464 80 | 910 | 880 | 930 | 907 |
| 1465 90 | 930 | 930 | 920 | 927 |
| 1466 100 | 920 | 970 | 920 | 937 |

| Channel 1HF(0.045") (1467) | | | | |
|---|---|---|---|---|
| % Open (1468) | Run 1 (1469) | Run 2 (1470) | Run 3 (1471) | Average (1472) |
| 1473 10 | 980 | 950 | 970 | 967 |
| 1474 20 | 1440 | 1370 | 1420 | 1410 |
| 1475 30 | 1930 | 1860 | 1890 | 1893 |
| 1476 40 | 2420 | 2340 | 2450 | 2403 |
| 1477 50 | 2910 | 3020 | 2960 | 2963 |
| 1478 60 | 3370 | 3450 | 3470 | 3430 |
| 1479 70 | 4000 | 3970 | 3980 | 3983 |
| 1480 80 | 4550 | 4520 | 4580 | 4550 |
| 1481 90 | 5050 | 5130 | 5090 | 5090 |
| 1482 100 | 5490 | 5480 | 5450 | 5473 |

FIG. 14B

| 1508 | BLEND % | % OPEN (1510) | LAB TEST uS (1512) | FIELD AVE (1514) |
|---|---|---|---|---|
| 1516 | 0.1 | 10 | 640 | 843 |
| 1518 | 0.2 | 20 | 670 | 787 |
| 1520 | 0.3 | 30 | 700 | 783 |
| 1522 | 0.4 | 40 | 730 | 810 |
| 1524 | 0.5 | 50 | 760 | 810 |
| 1526 | 0.6 | 60 | 800 | 853 |
| 1528 | 0.7 | 70 | 830 | 877 |
| 1530 | 0.8 | 80 | 860 | 907 |
| 1532 | 0.9 | 90 | 910 | 927 |
| 1534 | 1 | 100 | 970 | 937 |

1502

PREDICTIVE MODELING

1504

| TARGET uS (1581) | PROJECTED % OPEN (1582) |
|---|---|
| 640 | -40 |
| 670 | -26 |
| 700 | -12 |
| 730 | 2 |
| 760 | 16 |
| 800 | 35 |
| 830 | 49 |
| 860 | 63 |
| 910 | 86 |
| 970 | 114 |

HF (0.045") 1536

| 1538 | BLEND % | % OPEN (1540) | LAB TEST uS (1542) | FIELD AVE (1544) |
|---|---|---|---|---|
| 1546 | 1 | 10 | 900 | 967 |
| 1548 | 2 | 20 | 1320 | 1410 |
| 1550 | 3 | 30 | 1820 | 1893 |
| 1552 | 4 | 40 | 2240 | 2403 |
| 1554 | 5 | 50 | 2750 | 2963 |
| 1556 | 6 | 60 | 3150 | 3430 |
| 1558 | 7 | 70 | 3660 | 3983 |
| 1560 | 8 | 80 | 3960 | 4550 |
| 1562 | 9 | 90 | 4520 | 5090 |
| 1564 | 10 | 100 | 4840 | 5473 |

| TARGET uS | PROJECTED % OPEN |
|---|---|
| 900 | 10 |
| 1320 | 18 |
| 1820 | 28 |
| 2240 | 36 |
| 2750 | 46 |
| 3150 | 54 |
| 3660 | 64 |
| 3960 | 69 |
| 4520 | 80 |
| 4840 | 87 |

1600

| LOW FLOW (0.016") | | | | |
|---|---|---|---|---|
| LAB % | TARGET uS | % OPEN | MEASURED uS | VARIANCE |
| 0.1 | 640 | 4 | 660 | 3.1% |
| 0.2 | 670 | 7 | 680 | 1.5% |
| 0.3 | 700 | 11 | 680 | 2.9% |
| 0.4 | 730 | 23 | 690 | 5.5% |
| 0.5 | 760 | 32 | 710 | 6.6% |
| 0.6 | 800 | 45 | 760 | 5.0% |
| 0.7 | 830 | 58 | 790 | 4.8% |
| 0.8 | 860 | 70 | 820 | 4.7% |
| 0.9 | 910 | 90 | 910 | 0.0% |
| 1.0 | 970 | 100 | 910 | 6.2% |

| HIGH FLOW (0.045") | | | | |
|---|---|---|---|---|
| LAB % | TARGET uS | % OPEN | MEASURED uS | VARIANCE |
| 1 | 900 | 10 | 1000 | 11.1% |
| 2 | 1320 | 18 | 1330 | 0.8% |
| 3 | 1820 | 28 | 1780 | 2.2% |
| 4 | 2240 | 36 | 2190 | 2.2% |
| 5 | 2750 | 46 | 2740 | 0.4% |
| 6 | 3150 | 54 | 3100 | 1.6% |
| 7 | 3660 | 64 | 3640 | 0.5% |
| 8 | 3960 | 69 | 3960 | 0.0% |
| 9 | 4520 | 80 | 4380 | 3.1% |
| 10 | 4840 | 87 | 4780 | 1.2% |

FIG. 16

MIXING DEVICE

PRIORITY INFORMATION

The present application claims priority to Provisional Patent Application No. 63/665,495 filed Jun. 28, 2024, which is incorporated in its entirety by reference.

BACKGROUND DISCUSSION

The treatment industry is becoming more complex based on customer demand for customized treatment plans. These customized treatment plans require precision applications of various solids, liquids, and/or gases. In addition, material cost, labor cost, and labor safety are important factors that need to be enhanced. Further, customers demand a high level of precision to ensure that these customized treatment plans are safe and cost effective. By utilizing this disclosure, the operator can achieve clean, customized, precision treatment plans with reduced material cost and labor cost while increasing labor safety. In addition, customizable user interfaces can increase customer satisfaction.

Fertigation is the process of combining liquid fertilizer and water for simultaneously irrigating and fertilizing plants. These processes allows for optimal nutrient delivery at each stage of the plant's growth. Liquid fertilizers most commonly come in two parts (A & B) because the combined product is not stable. Dosing liquid fertilizers involves introducing part A, part B, and often an acid for pH adjustment into a water flow at specific rates. This final blend can be sent to a feed tank or directly to the plants. Accurate fertigation can have an order of magnitude difference at harvest time. For example, for marijuana plants, a poor grow can result in 3 ounces of bud per plant while a good grow can result in 16 ounces per plant. Since the selling price for growers can vary between $1000 per pound to $2000 per pound, the revenue difference between a good harvest and a poor harvest can be 10×. Based on an average yield of 1.4 ounces per square foot of grow, a small-to-medium size grower has 10,000 square feet, which yields an average of 875 pounds per grow with roughly 2 grows per year. Therefore, the difference between a good harvest and a poor harvest can be $875,000 to $5,200,000. In this growing process, the fertigation is a critical element in the success of the harvest. In various examples, dosing mistakes can kill the plants and result in major losses. Further, mold and pH burn can be particularly troublesome and must be managed with tailored fertigation methods.

This disclosure relates to the field of fluid mixing at specific ratios for agriculture, cleaning, and chemical mixing. More specifically, the disclosure relates to a portable device that uses a controller and precise valves to dispense and/or deliver programmed ratios of water and three or more ingredients, as set by the user. The device may also use just one ingredient, two ingredients, and/or Nth number of ingredients.

Existing liquids (and/or solids and/or gases) blending systems use a combination of peristaltic pumps, educators, and/or drum pumps. These systems control flow with meters and/or timers. Ingredients are injected via slugs so that the resulting streams have varying ratios. In some cases, the systems require separate and bulky mixing chambers. These systems are typically skid mounted and/or mounted to the wall. Further, these systems may not have a notification functionality to provide a notice that an ingredient has run out.

BRIEF DESCRIPTION OF THE DRAWINGS

FIG. 14A is a benchmark value chart, according to one embodiment;

FIG. 14B are baseline test run charts, according to various embodiments;

DETAILED DESCRIPTION

Figure 1:
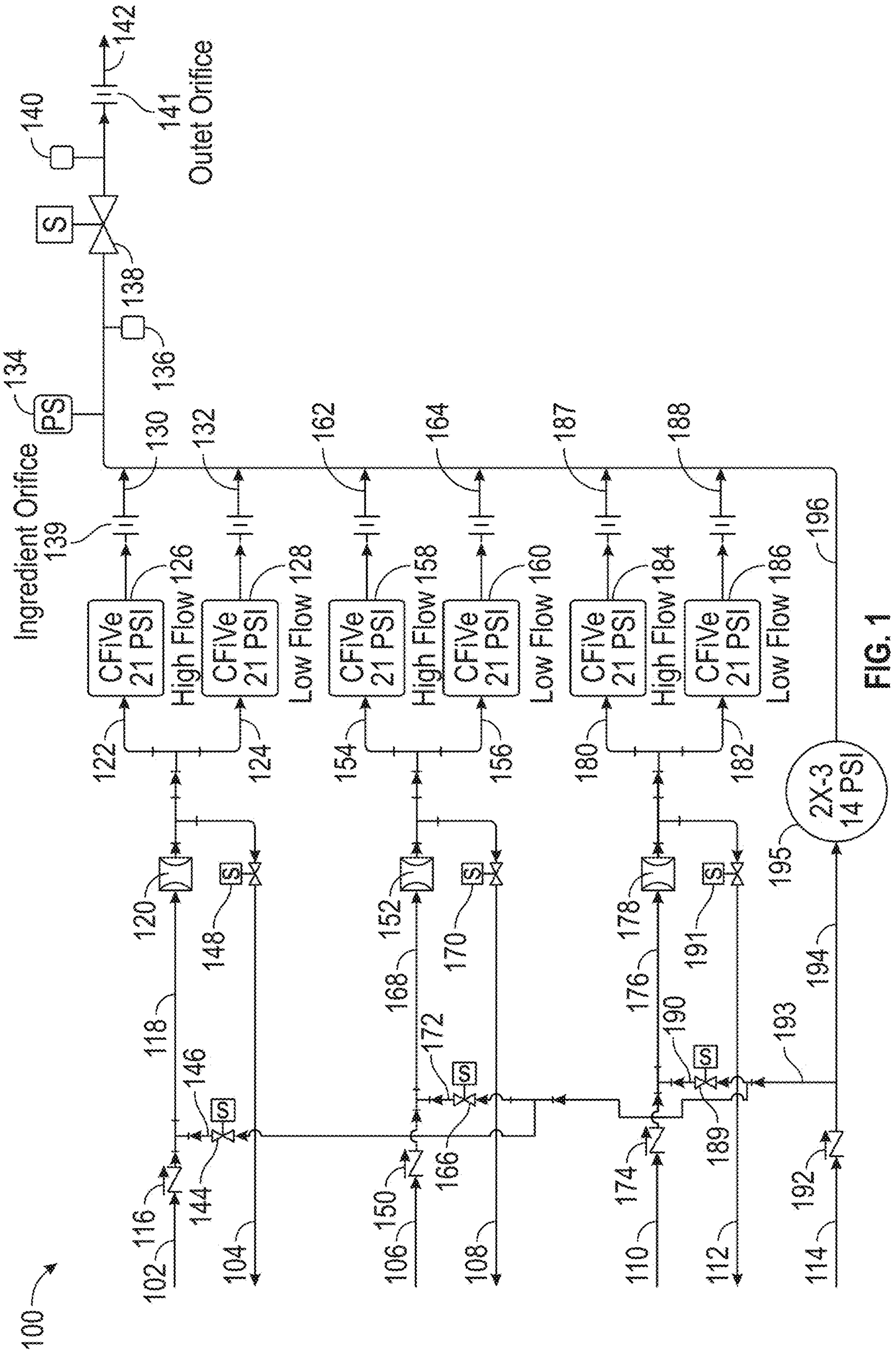
FIG. 1 is an illustration of an exemplary embodiment of the mixing device (and/or treatment device), according to one embodiment.

In FIG. 1, an illustration of an exemplary embodiment of the mixing device (and/or treatment device) is shown, according to one embodiment. In one embodiment, a mixing device 100 (and/or treatment device) may include a first ingredient supply line 102, a first ingredient check valve 116, a first ingredient pump supply line 118, a first ingredient pump 120, a first ingredient high flow CF Valve supply line 122, a first ingredient high flow CF Valve 126, a first ingredient high flow CF Valve outlet line 130, a pressure sensor 134, a temperature sensor 136, an outlet solenoid 138, an ingredient orifice 139, a conductivity sensor 140, an outlet orifice 141, and/or an outlet line 142.

In another example, the mixing device 100 (and/or treatment device) may include a first ingredient low flow CF Valve supply line 124, a first ingredient low flow CF Valve 128, and/or a first ingredient low flow CF Valve outlet line 132.

In another example, the mixing device 100 (and/or treatment device) may include a first ingredient return line 104 and/or a first ingredient priming solenoid 148.

In another example, the mixing device 100 (and/or treatment device) may include a second ingredient supply line 106, a second ingredient check valve 150, a second ingredient pump supply line 168, a second ingredient pump 152, a second ingredient high flow CF Valve supply line 154, a second ingredient high flow CF Valve 158, and/or a second ingredient high flow CF Valve outlet line 162.

In another example, the mixing device 100 (and/or treatment device) may include a second ingredient low flow CF Valve supply line 156, a second ingredient low flow CF Valve 160, and/or a second ingredient low flow CF Valve outlet line 164.

In another example, the mixing device 100 (and/or treatment device) may include a second ingredient return line 108 and/or a second ingredient priming solenoid 170.

In another example, the mixing device 100 (and/or treatment device) may include a third ingredient supply line 110, a third ingredient check valve 174, a third ingredient pump supply line 176, a third ingredient pump 178, a third ingredient high flow CF Valve supply line 180, a third ingredient high flow CF Valve 184, and/or a third ingredient high flow CF Valve outlet line 187.

In another example, the mixing device 100 (and/or treatment device) may include a third ingredient low flow CF Valve supply line 182, a third ingredient low flow CF Valve 186, and/or a third ingredient low flow CF Valve outlet line 188.

In another example, the mixing device 100 (and/or treatment device) may include a third ingredient return line 112 and/or a third ingredient priming solenoid 191.

In another example, the mixing device 100 (and/or treatment device) may include a water supply line 114, a water line inlet to a check valve 193, a water check valve 192, a water line inlet to a CF Valve 194, a water line CF Valve 195 (e.g., 2X-3 valve), a water line outlet line 196, a first water flush solenoid valve 189, a first water flush solenoid outlet 190, a second water flush solenoid valve 166, a second water flush solenoid outlet 172, a third water flush solenoid valve 144, and/or a third water flush solenoid outlet 146.

In one example, the system is a portable liquid (and/or solids and/or gases) mixing system that blends water with any combination of three or more fluids (and/or solids and/or gases) ingredient streams with variable ratios and durations using intermittent constant flow valves. Further, in various other embodiments, the system may run one or two fluids (and/or solids and/or gases) ingredient streams with variable ratios and durations using intermittent constant flow valves. In one example, a controller modulates the dispensing ratios to achieve the specified flow ratios set by the controller. In one example, the intermittent dispensing is at a short enough interval that regardless of the desired ratio each ingredient is being added every second to the water stream and/or main carrier. In this example, no downstream mixing or agitation is required for a uniform product.

In one embodiment, the system is the size of a carry-on suitcase and can be easily programmed by any user. Further, the solenoid controlled constant flow valve (CF Valve) do not require calibration and/or maintenance. The reliability of the CF Valve eliminates the requirement for real time ratio monitoring (e.g., conductivity). However, as an optional configuration, a conductivity sensor may be integrated for user's confidence and/or alarming functionality. In various embodiments, recipes (e.g., ratio mixtures for one or more ingredients (e.g., 1 to Nth)) may be programmed at the unit and saved for later use. In another example, any ratio can be intermittently dosed and/or continuously dosed. For example, ingredient A may be dosed for 0.5 seconds out of 1 second, while ingredient B may be dosed for 0.3 seconds out of 1 second, and ingredient Nth may be dosed at 0.98 second out of 1 second. In one example, the system may monitor one or more pump motors' currents to detect if an ingredient has run out. This condition may trigger an alarm, a notification (e.g., email, text, phone call, etc.), and/or a pause in production and/or treatment and/or mixing. These alarms, warnings, and/or notifications may occur via a Bluetooth connection, a hardwire connection, an Internet connection, and/or a control system. Further, an inventory warning and/or alarm and/or notification may occur based on an inventory level of one or more ingredients. In another example, the device, system, and/or method may be controlled via a Bluetooth connection, a hardwire connection, an Internet connection, and/or a control system.

In one embodiment, the system and/or device may have a designated water line with a CF Valve (constant flow valve) that will maintain the outlet pressure at a designated set-point. In one example, an outlet orifice on the CF Valve outlet will set the water flow rate. In one example, there may be three or more ingredient lines with self-priming, electric diaphragm pumps that send the ingredients forward to ingredient CF Valves. In one example, these ingredient CF Valves have outlet pressures matching or slightly higher than the water pressure. In one example, all outlet flows pass through an ingredient orifice and then are combined in a mixing manifold. In another example, no mixing manifold is utilized. In one example, the orifice size for the high flow rate is 0.043" and the orifice size for the low flow rate is 0.015". In various examples, the high flow rate and/or low flow rate orifices may be 0.001", 0.002", . . . , 0.010", 0.011", . . . , 0.040", 0.041", . . . , 0.065", 0.066", . . . , 0.101", 0.0102", . . . , 0.999", 1.000", etc. In various examples, the high flow rate and/or low flow rate orifices may be any size and/or diameter disclosed in this document.

In one example, after the mixing manifold there is a solenoid valve to control the total system flow. In various examples, this valve may or may not be used to adjust the total water flow. In one example, water to the system and/or device may be at least 15 psi. In one example, each ingredient can be drawn from containers at ambient pressure by the electric diaphragm pumps. In another example, a total fluid flow rate is 2-5 gallons per minute. In another example, the systems and/or device may utilize any ratio (e.g., as high as 1:10 or as low as 1:1000).

In one example of operating the system and/or device, the customer connects a water line with greater than 15 psi water pressure to the ¾" hose bib on the inlet side of the unit. Further, the customer inserts the ¼" tubing into the press-fit connections for each ingredient on the inlet side of the unit. In addition, another hose can be connected to the ¾" hose bib on the outlet for delivery to the plants or a feed tank. In addition, the customer uses the controller to set the following parameters into the controller: Total run time for the water (e.g., 1 hour); Total run time for each ingredient (e.g., 5 minutes or 1 hour); Delay for ingredient injections (e.g., 30 minutes or 0 minutes); Ratio for each ingredient to be injected (e.g., 1:50); Delay the start time for the run; and/or Start run. In this example, the unit may deliver the blended fertigation feed for the preset amount of time and then shut off the flow. In one example, if an ingredient runs dry or stops flowing, the controller will alarm and/or shut down the system and/or device.

Figure 2A:
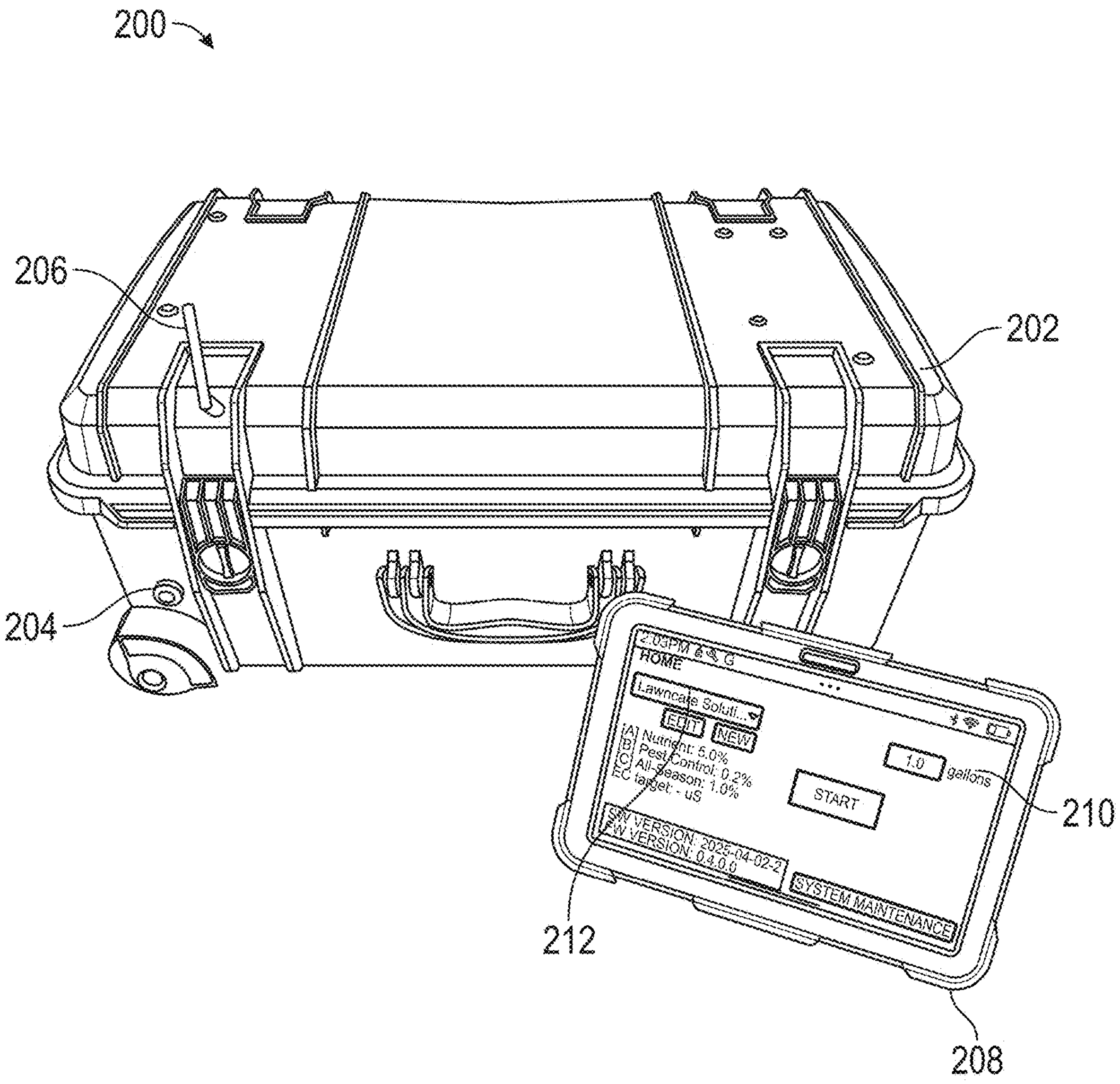
FIG. 2A is an illustration depicting the mixing device (and/or treatment device) and a screen/interface, according to one embodiment.

In FIG. 2A, an illustration depicting the mixing device (and/or treatment device) and a screen/interface is shown, according to one embodiment. In one example, a mixing device 200 may include a case 202, a product outlet 204, an antenna 206 (e.g., Bluetooth antenna and/or any other type of antenna), and/or a mobile device 208. In one example, the mobile device 208 may include a home page 212 with various data entry areas 210. In an example, the mobile device 208 may be a controller for the mixing device 200.

Figure 2B:
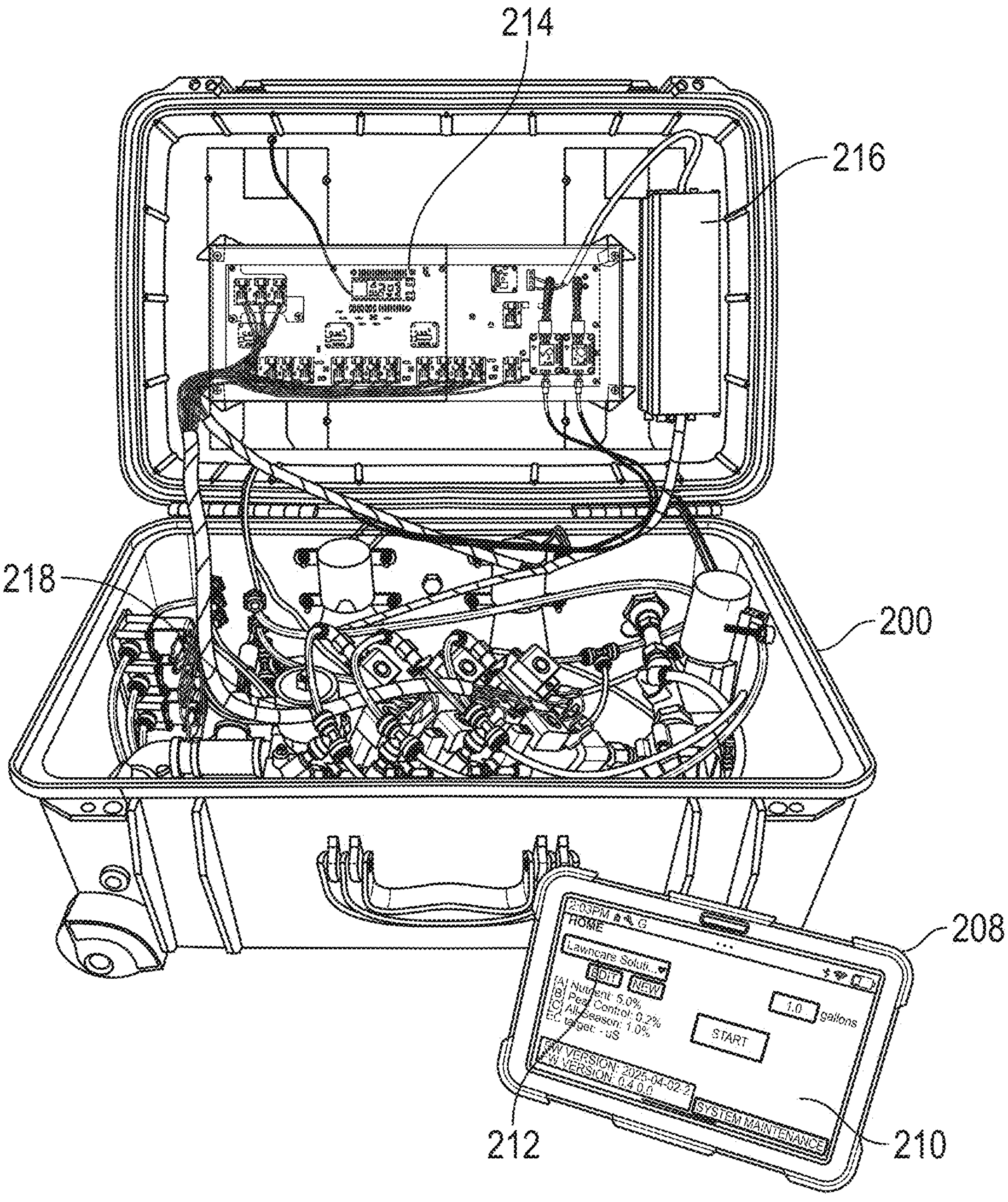
FIG. 2B is another illustration depicting the mixing device (and/or treatment device) and a screen/interface, according to one embodiment.

In FIG. 2B, another illustration depicting the mixing device (and/or treatment device) and a screen/interface is shown, according to one embodiment. In one example, a mixing device 200 may include one or more processors 214, a power supply 216, and/or one or more valves 218. The one or more valves 218 may be high flow CF Valves and/or low flow CF Valves. In addition, there may be a high flow CF Valve and a low flow CF Valve for one or more channels (e.g., 1, 2, 3, 4, 5, . . . , 20, . . . , Nth). In various embodiments, the one or more channels may be associated with one or more ingredients. In various embodiments, the products and/or ingredients may be liquid fertilizer (Urea, Ammonia Nitrate), plant nutrient formulas, disinfectant, tile cleaner, degreaser (acetone or isopropyl alcohol), surfactants, Surfactant based cleaners (C9-11 alcohols ethoxylated, Sodium Lauryl Sulfate), herbicides (Glysophate, MCPA, MCPP-p), and/or pesticides (Bifenthrin).

In one example, the mobile device 208 may include the home page 212 with various data entry areas 210. In an example, the mobile device 208 may be a controller for the mixing device 200.

Figure 2C:
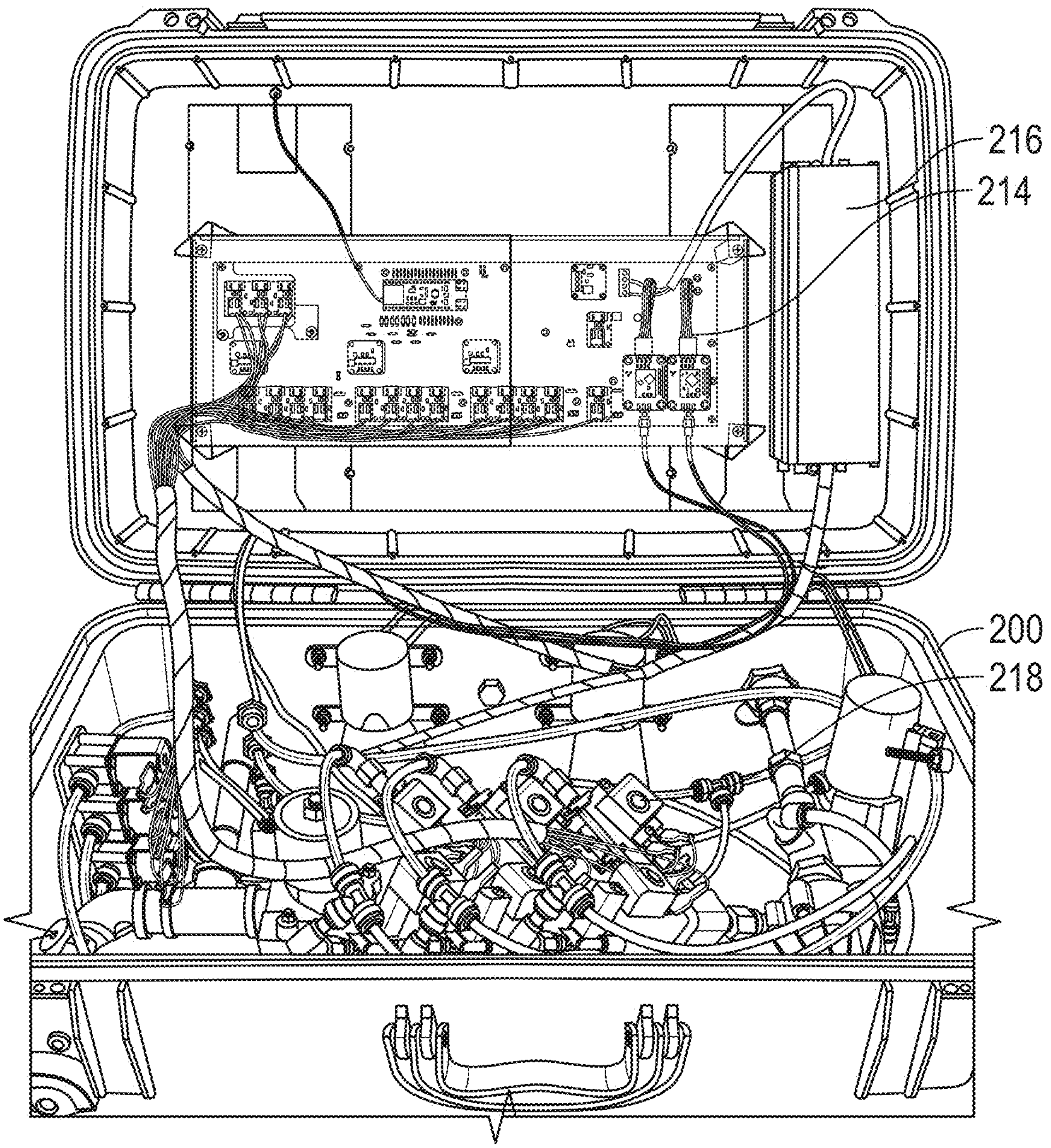
FIG. 2C is another illustration depicting the mixing device (and/or treatment device), according to one embodiment.

In FIG. 2C, another illustration depicting the mixing device (and/or treatment device) is shown, according to one embodiment. In one example, the mixing device 200 may include one or more processors 214, the power supply 216, and/or one or more valves 218. The one or more valves 218 may be high flow CF Valves and/or low flow CF Valves. In addition, there may be a high flow CF Valve and a low flow CF Valve for one or more channels (e.g., 1, 2, 3, 4, 5, . . . , 20, . . . , Nth). In various embodiments, the one or more channels may be associated with one or more ingredients. In one example, the mobile device 208 may include the home page 212 with various data entry areas 210. In an example, the mobile device 208 may be a controller for the mixing device 200. In another example, there may be a high flow CF Valve and a low flow CF Valve for a first channel and a second channel but only a high flow CF Valve for a third channel. In addition, there may be a high flow CF Valve and a low flow CF Valve for a first channel, a low flow CF Valve for a second channel, and a high flow CF Valve for a third channel. In various embodiments, one or more channels may have both a high flow CF Valve and a low flow CF Valve, while one or more channels have only a high flow CF Valve and one or more channels have only a low flow CF Valve. In various embodiments, any number of channels can have a high flow CF Valve, a low flow CF Valve, and/or both the high flow CF Valve and the low flow CF Valve. Further, where both a low flow CF Valve and a high flow CF Valve are connected to a channel, the channel may utilize only the low flow CF Valve, only the high flow CF Valve, and/or both the low flow CF Valve and the high flow CF Valve to complete one or more mixing and/or treatment procedures.

Figure 2D:
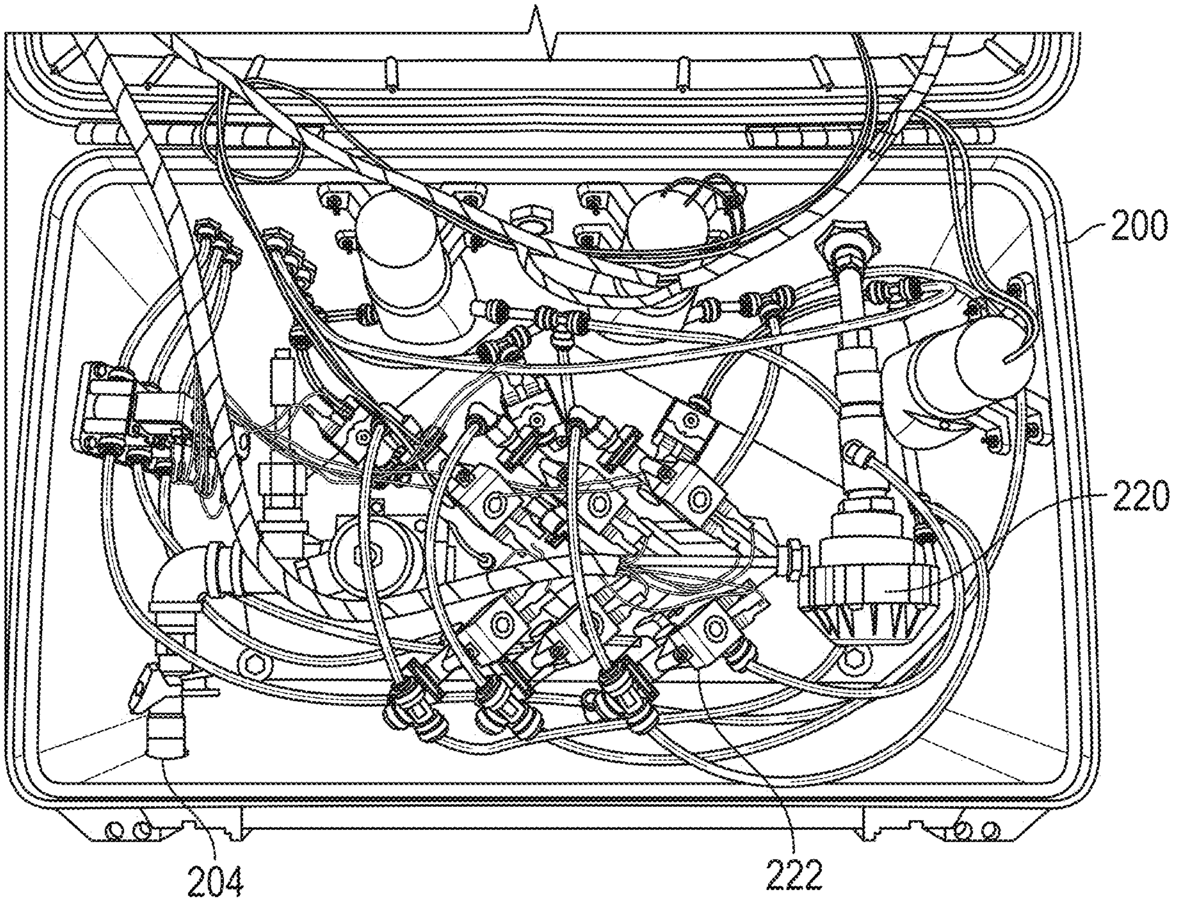
FIG. 2D is another illustration depicting the mixing device (and/or treatment device), according to one embodiment.

In FIG. 2D, another illustration depicting the mixing device (and/or treatment device) is shown, according to one embodiment. In one embodiment, the mixing device 200 may include the product outlet 204, a 2X-3 CF Valve 220, and/or a CF VALVE (AND/OR CFIVE) low flow valve 222. The 2X-3 CF Valve is in place to regulate the water pressure, ensuring a consistent pressure in the manifold. This is important for two reasons. First, it produces a consistent total outlet flow rate from the system (set by the outlet orifice). In one example, the flow rate needs to be fixed for the system to accurately calculate how much ingredient to add to meet the user's input (e.g., 5% ingredient). Second, this creates a fixed pressure drop from the CF VALVE (AND/OR CFIVE) into the manifold. In one example, this is critical for our design because the system and/or device can predict how much ingredient passes through a CF VALVE (AND/OR CFIVE) orifice of a given size whenever the CF VALVE (AND/OR CFIVE) is opened. In this iteration of the device this pressure differential is maintained at ~6.5 psi (21 psi at the CF VALVE (AND/OR CFIVE) to 14.5 psi inside the mixing manifold as set by the 2X-3). So the ingredient flow is the resulting flow through the CF VALVE (AND/OR CFIVE) orifice based on the orifice size and a 6.5 psi pressure differential.

Figure 2E:
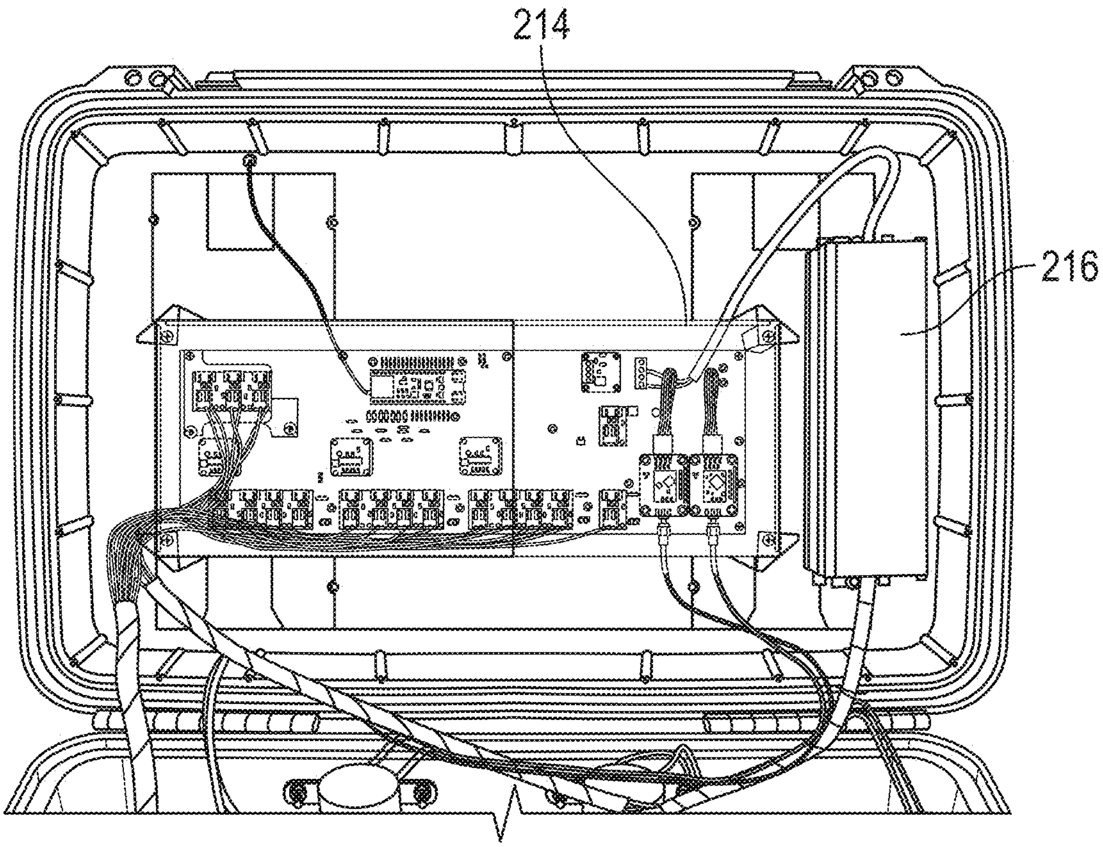
FIG. 2E is another illustration depicting the mixing device (and/or treatment device), according to one embodiment.

In FIG. 2E, another illustration depicting the mixing device (and/or treatment device) is shown, according to one embodiment. In one example, the mixing device 200 may include one or more processors 214 and the power supply 216.

Figure 2F:
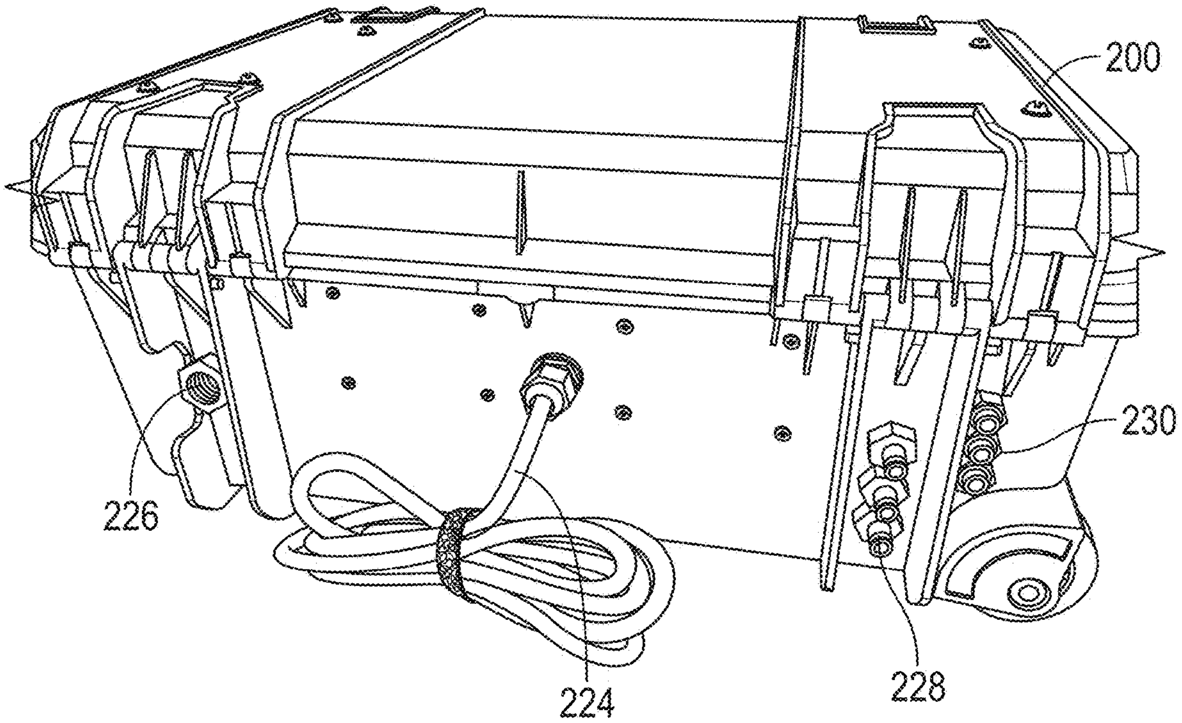
FIG. 2F is another illustration depicting the mixing device (and/or treatment device), according to one embodiment.

In FIG. 2F, another illustration depicting the mixing device (and/or treatment device) is shown, according to one embodiment. In one embodiment, the mixing device 200 may include a power cord 224, a water outlet 226, one or more ingredients inlets 228, and/or one or more ingredients returns 230.

Figure 2G:
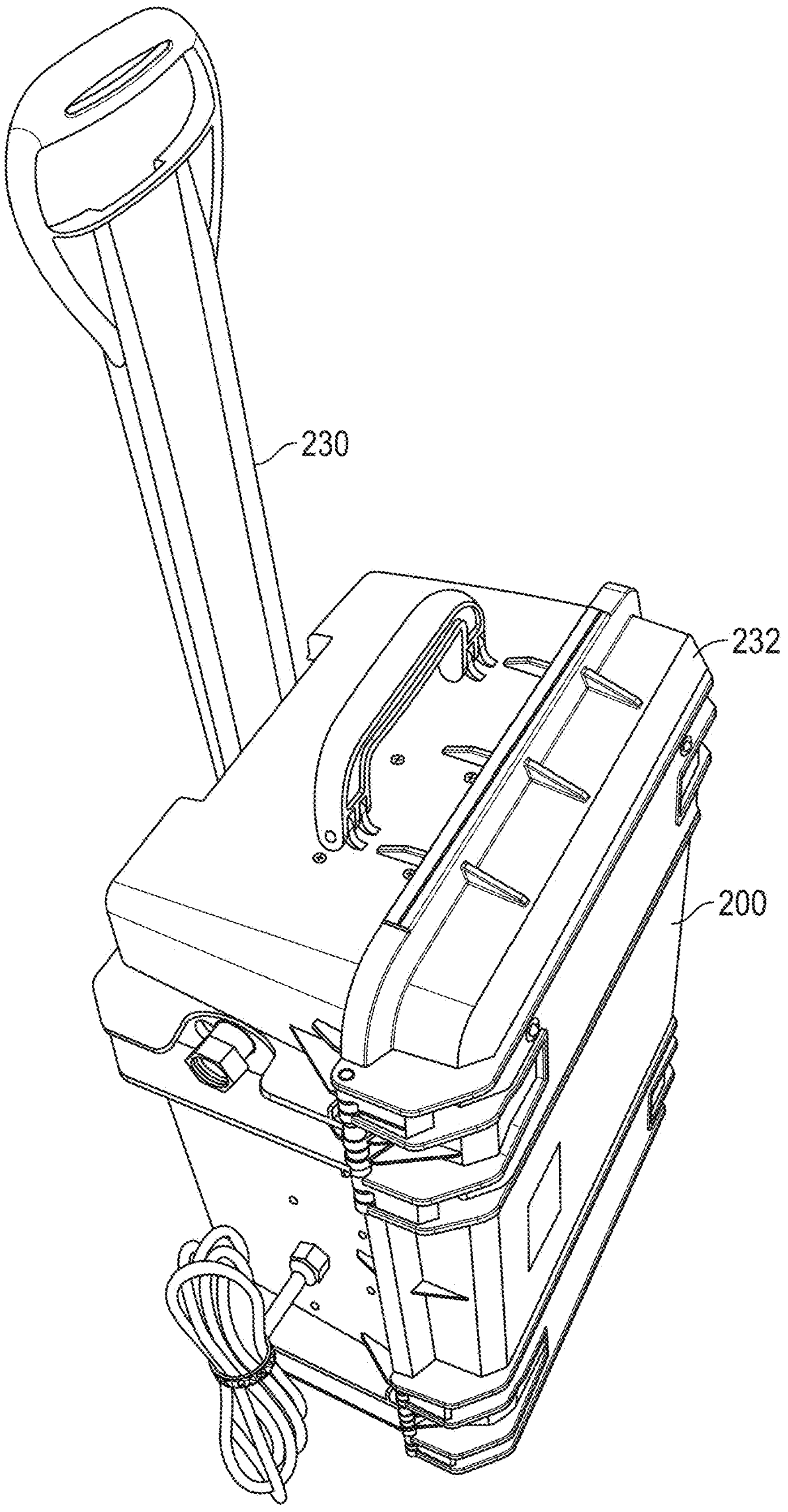
FIG. 2G is another illustration depicting the mixing device (and/or treatment device), according to one embodiment.

In FIG. 2G, another illustration depicting the mixing device (and/or treatment device) is shown, according to one embodiment. In one embodiment, the mixing device 200 may include a cover 232, a moving handle 230, and/or one or more wheels.

In one example, each unit may have a designated water line with a 2X-3 CF Valve (constant flow valve) to maintain the manifold pressure at a designated setpoint. An orifice on the manifold outlet will set the total product flow rate. In one example, there are three or more ingredient lines with self-priming, electric diaphragm pumps that send the ingredients to electrically actuated CFVs (CFiVes or CF VALVE (AND/OR CFIVE) s). In one example, the ingredient CF VALVE (AND/OR CFIVE) valves have outlet pressures slightly higher than the manifold pressure. All CF VALVE (AND/OR CFIVE) outlets' flows pass through an orifice and then are combined in a mixing manifold. In one example, after the mixing manifold is a solenoid valve to control the total system flow. In various examples, this valve may or may not be used to adjust the total water flow. In one example, the water to the unit must be at least 25 psi. In another example, each ingredient can be drawn from containers at ambient pressure by the electric diaphragm pumps. In one example, the total fluid flow rate is 2 gallons per minute. In another example, the units may be designed for ingredient ratios as high as 1:5 or as low as 1:1000.

In another example, each CF VALVE (AND/OR CFIVE) valve can be pulsed as short as 1/10th of a second, which means a CF VALVE (AND/OR CFIVE) can control flow down to 10% of its full open flow rate, which is set by its outlet orifice. In another example, each ingredient line is equipped with a high flow CF VALVE (AND/OR CFIVE) and a low flow CF VALVE (AND/OR CFIVE). In this example, the difference is the opening size of the outlet orifices. In one example, these orifices are set so that the flow rate through the high flow at 10% open time is the same as the low flow at 100% open time. In this example, this approach allows each ingredient on the system to have a 100:1 turn down. For example, an ingredient could make up 10% of the final blend or 0.1% of the final blend, a 100× difference.

In another embodiment, the customer connects a water line with greater than 25 psi water pressure to the ¾" hose bib on the back side of the unit. In this example, the customer inserts the ¼" tubing into the press-fit connections for each ingredient on the back side of the unit for both supply and return (prime). In this example, a short hose section is connected to the outlet on the front for delivery finished goods to tanks or containers. In this example, the customer uses the application interface to set the following parameters into the controller: A product formula with a ratio for each ingredient to be injected (e.g., Ingredient A—3%); Total volume of product needed (e.g., 2 gallons); and/or start run. In this example, the unit starts every run by priming all active ingredient lines. In one example, the priming functionality is completed by opening the priming valves with the CF VALVE (AND/OR CFIVE) s off (closed). In this example, each pump runs and recirculates the ingredients back to their supply vessels, purging any bubbles in the ingredient lines. Further, after this priming period, the priming valves close. In this example, the CF VALVE (AND/OR CFIVE) s begin pulsing to deliver the required flow rate of each ingredient and the outlet valve opens. In this example, the system and/or device will deliver the full formula every second it dispenses. Further, all valves close and pumps shut off once the total volume of product is dispensed. In addition, if an ingredient runs out the system will alarm and pause production. Based on the alarm and/or pause in production, the user can replace the empty ingredient vessel and resume production.

In another example, the system has an integrated flush system for purging ingredients from the pumps, CF VALVE (AND/OR CFIVE) s, and outlet manifold. In this example, when the user selects this option the outlet valve opens and the flush valves and pumps for the selected ingredient lines run. In this example, the process sends supply water through the pumps, CF VALVE (AND/OR CFIVE) s, and the manifold for a set period of time.

In another example, the motor current may be monitored for "Ingredient Out" detection. In this example, the system and/or device has the ability to stop production when an ingredient runs out. In various examples, there are different ways to detect when an ingredient runs out. For example, a pressure sensor or pressure switch can be used to sense when the ingredient runs out and/or the pressure in the line falls below the typical pump outlet pressure. To avoid adding pressure sensors, the system uses electrical current to detect an ingredient out condition. In various examples, the amperage through our electric diaphragm pumps varied based on the operating conditions. The five scenarios were: 1. No flow—Pressure switch triggered; 2. High flow—large orifice with high pulse rate or full open; 3. Low flow—small orifice or low pulse rate, pressure switch frequently triggered; 4. Ingredient out or no prime—air in the pump, running wide open, no back pressure; and 5. Priming—Max flow and little to no back pressure.

In various examples, the system and/or device may be able to distinguish between scenarios 1-4. The fifth scenario is a controlled event, and it is triggered by an ingredient out condition, so the system and/or device does not need to detect condition 5. Since the amperage the pump draws is different for conditions 1-4, the system's and/or device's controller uses a current monitor to identify when a pump moves from conditions 1-3 to condition 4. This method eliminates the need for pressure sensing devices, reducing wiring and controller complexity.

In another example, pulse rate modeling may be utilized. One important consideration for this system's operation is the viscosity of each ingredient. A CF Valve will accurately regulate pressure regardless of the fluid viscosity, from syrups to air. However, the actual flow rates through a fixed orifice at a set pressure will vary based on viscosity. Because this is the case, each ingredient to be used in the system is tested and modeled for flow rate. In one example, after this modeling is complete, the pulse rates can be programed for each ingredient so that accurate dosing can is achieved through the same fixed orifices despite varying viscosities. In one example, this flow model is found by running each ingredient through a test protocol. The protocol may involve dosing the ingredient at varying pulse rates and comparing those outcomes against lab bench samples. In one example, the protocol results in a flow model for each ingredient.

In one example, the system's architecture is designed to quickly scale up or down based on customer need. For example, if a customer's application does not require the 100:1 dosing range some CF VALVE (AND/OR CFIVE) s can be removed. Another example would be dispensing the CF VALVE (AND/OR CFIVE) s directly at the outlet, rather than the manifold. A third possibility is not using water at all in the product output. And almost as easily as they can be removed, these elements could be added for more complex systems.

Figure 3A:
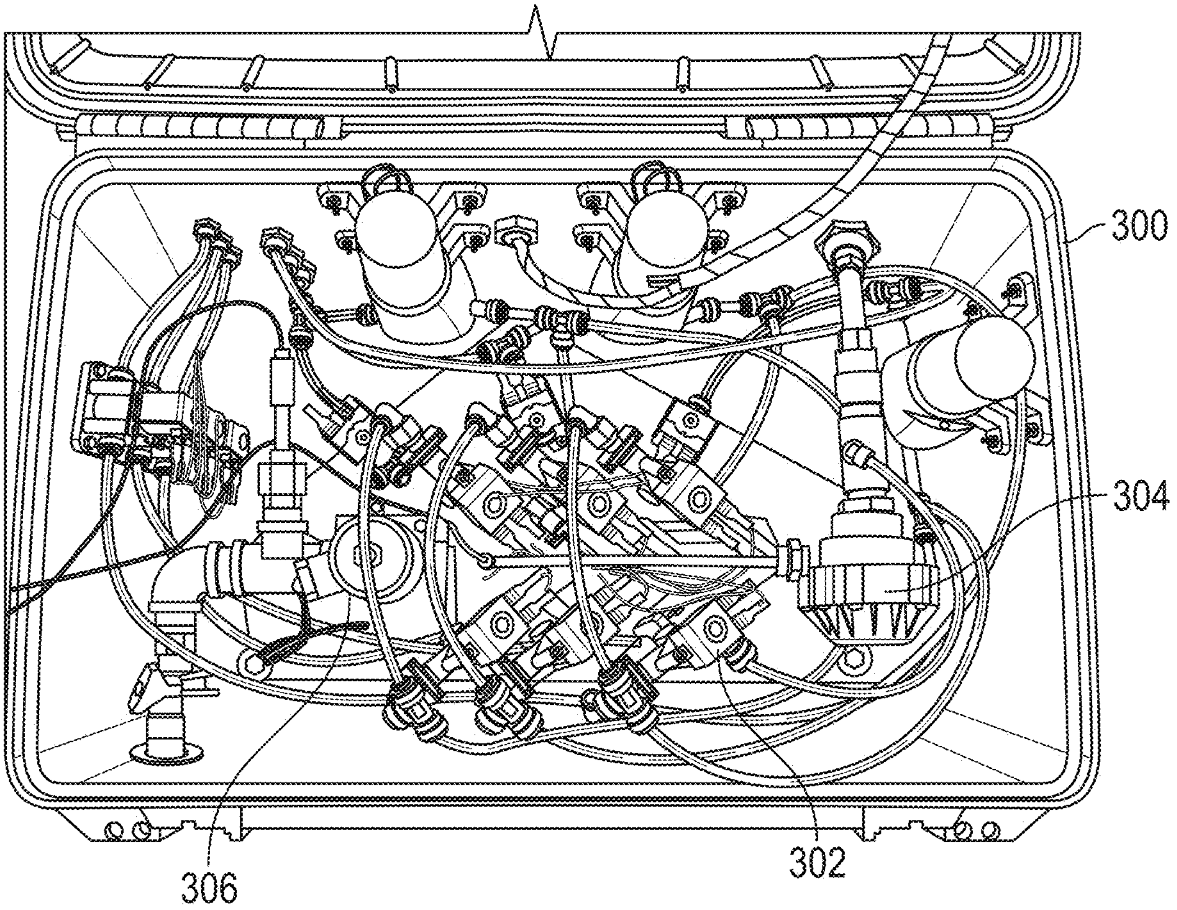
FIG. 3A is another illustration depicting the mixing device (and/or treatment device), according to one embodiment.

In FIG. 3A, another illustration depicting the mixing device (and/or treatment device) is shown, according to one embodiment. In one embodiment, a mixing device 300 may include one or more low flow CF Valves 302, a CF Valve 304 (e.g., 2X-3 CF Valve), and/or an outlet valve 306.

Figure 3B:
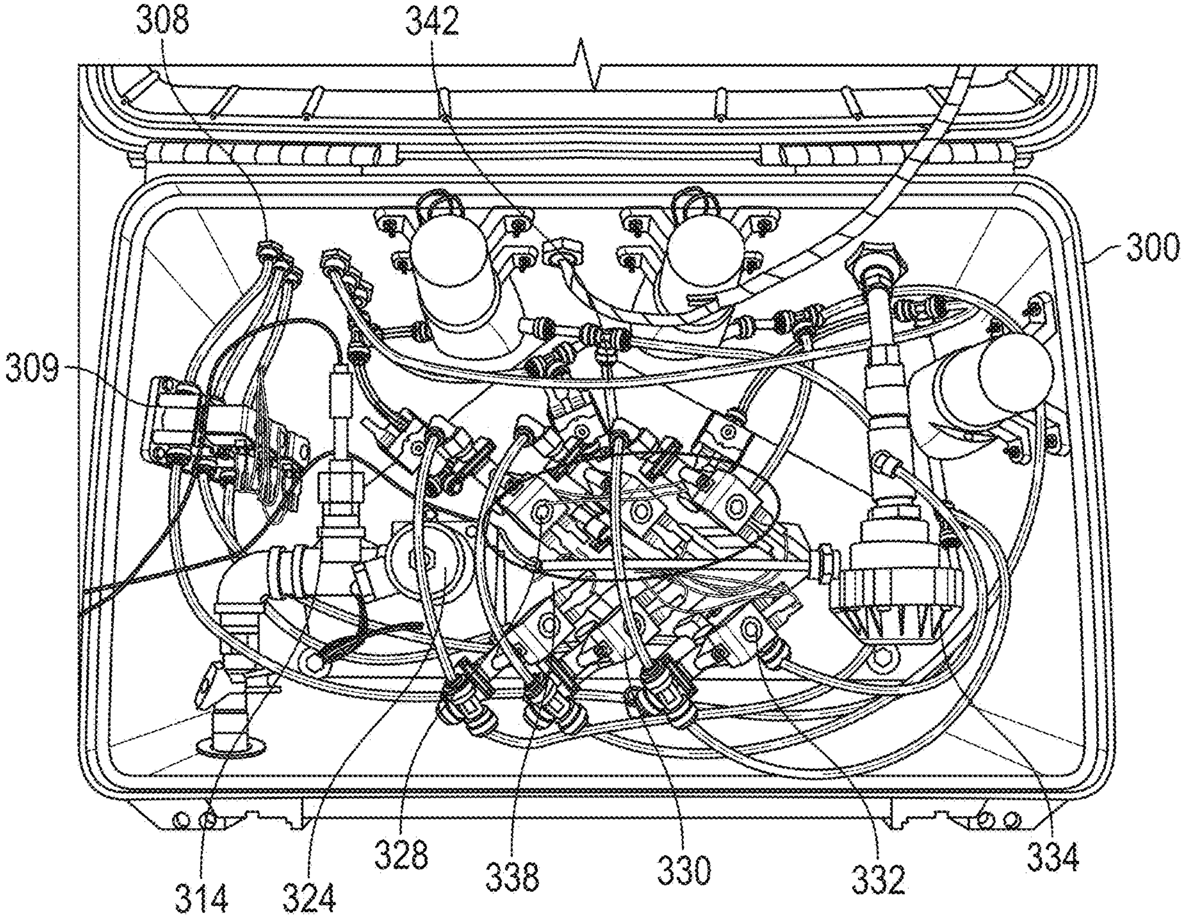
FIG. 3B is another illustration depicting the mixing device (and/or treatment device), according to one embodiment.

In FIG. 3B, another illustration depicting the mixing device (and/or treatment device) is shown, according to one embodiment. In one embodiment, a mixing device 300 may include one or more ingredient outlets 308, one or more ingredient priming valves 309 (e.g., channel A priming valve, channel B priming valve, channel C priming valve, etc.), a EC sensor 314, an outlet valve 324, a third channel high flow CF Valve 328, a second channel low flow CF Valve 330, a first channel low flow CF Valve 332, a temperature sensor 338, the CF Valve 334 (e.g., 2X-3 CF Valve), and/or a second channel flush valve 342 (e.g., channel B).

Figure 3C:
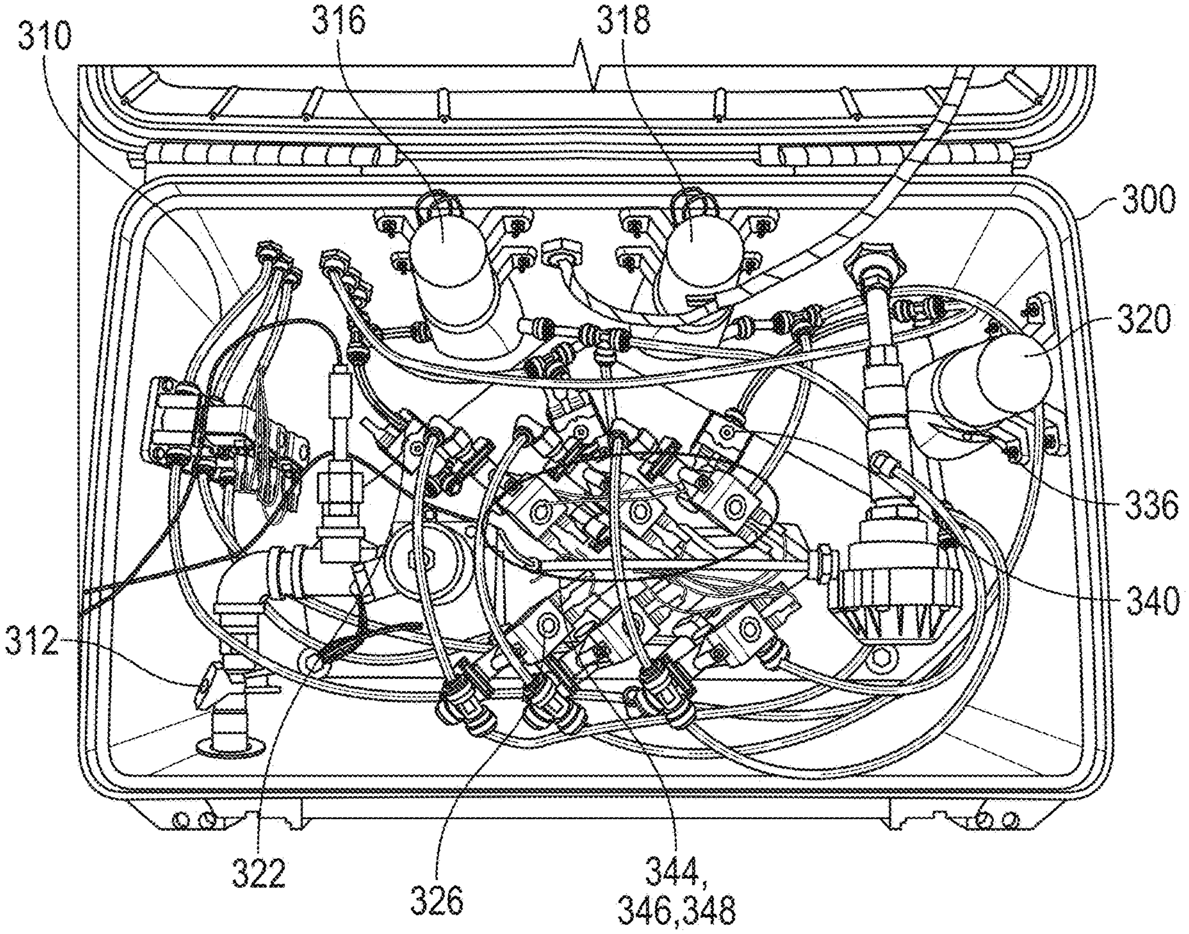
FIG. 3C is another illustration depicting the mixing device (and/or treatment device), according to one embodiment.

In FIG. 3C, another illustration depicting the mixing device (and/or treatment device) is shown, according to one embodiment. In one embodiment, the mixing device 300 may include one or more prime valves outlets 310, an outlet orifice 312, a third channel pump 316, a second channel pump 318, a first channel pump 320, a third channel flush valve 322 (e.g. channel C), a third channel low flow CF Valve 326 (e.g., channel C), a third channel high flow CF Valve 344 (e.g., channel C), a second channel high flow CF Valve 346 (e.g., channel B), a first channel high flow CF Valve 348 (e.g., channel A), a water check valve 336, and/or a flush valve 340.

Figure 3D:
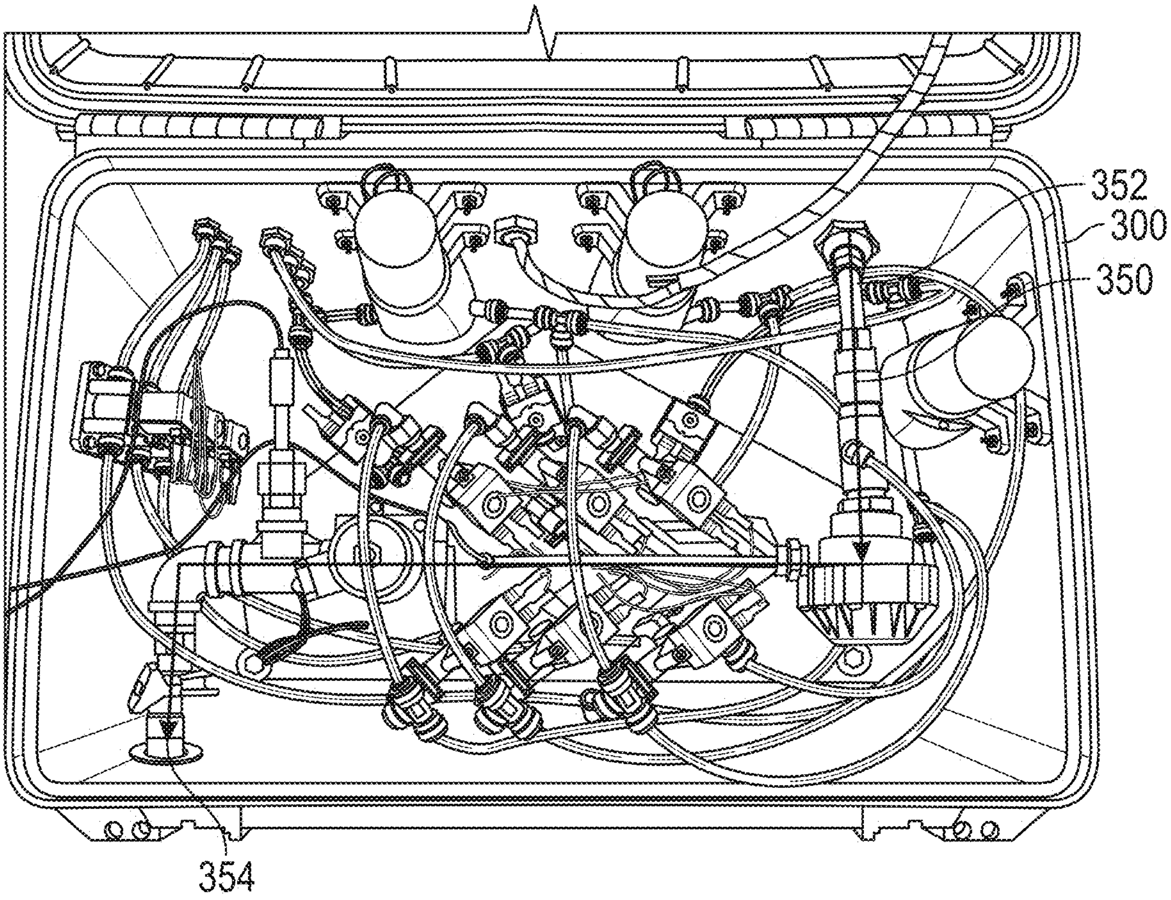
FIG. 3D is another illustration depicting the mixing device (and/or treatment device), according to one embodiment.

In FIG. 3D, another illustration depicting the mixing device (and/or treatment device) is shown, according to one embodiment. In one embodiment, the mixing device 300 may include a water check valve 350, a water inlet line 352, and/or a water outlet line 354. In one example, the water's path from the water inlet line 352 to the water outline line is shown by the arrows in FIG. 3D.

Figure 3E:
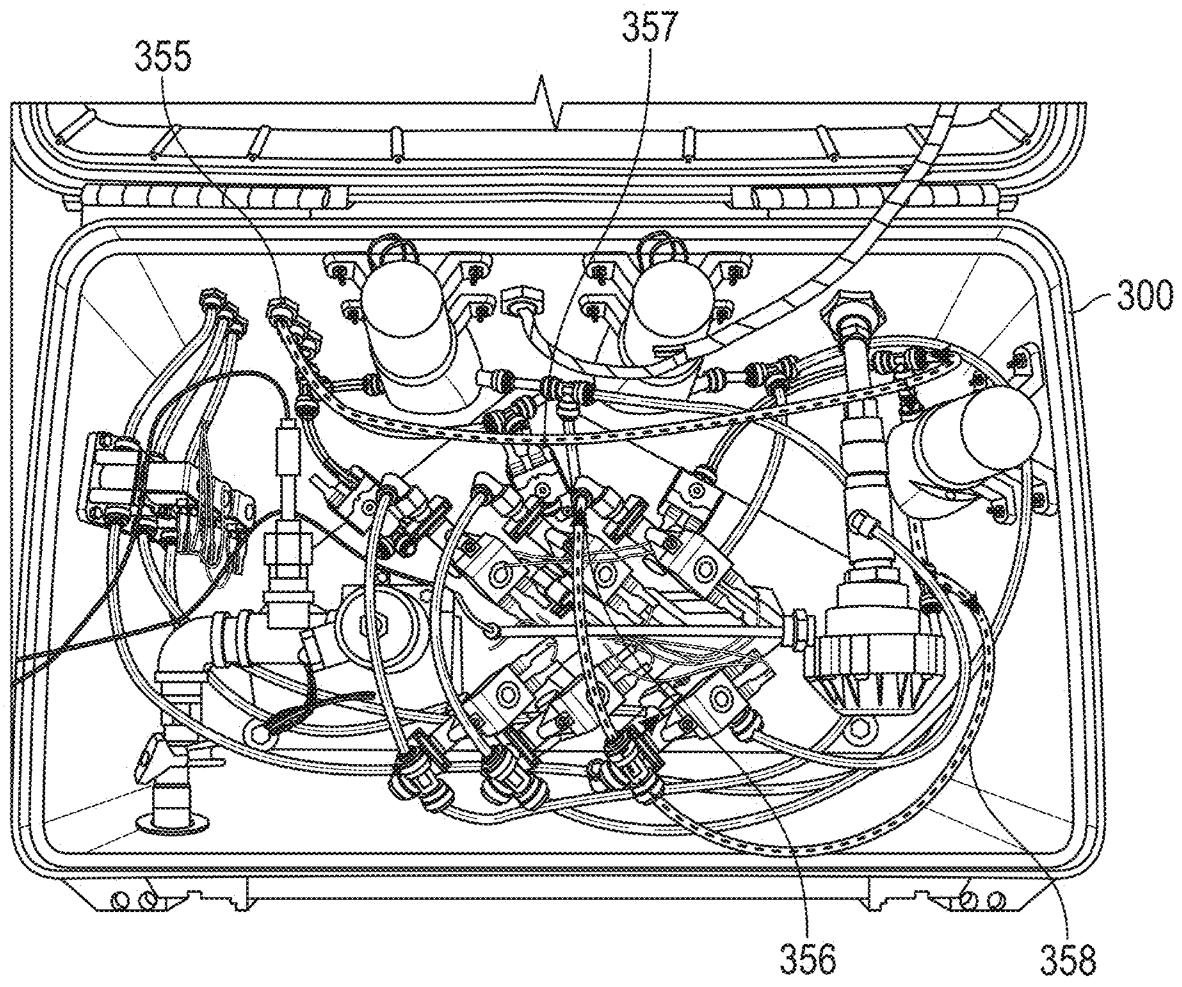
FIG. 3E is another illustration depicting the mixing device (and/or treatment device), according to one embodiment.

In FIG. 3E, another illustration depicting the mixing device (and/or treatment device) is shown, according to one embodiment. In one embodiment, the mixing device 300 may include a first channel inlet 355, a first channel line 357, a first channel line to the high flow CF Valve 356, and/or a first channel line to the low flow CF Valve 358.

Figure 3F:
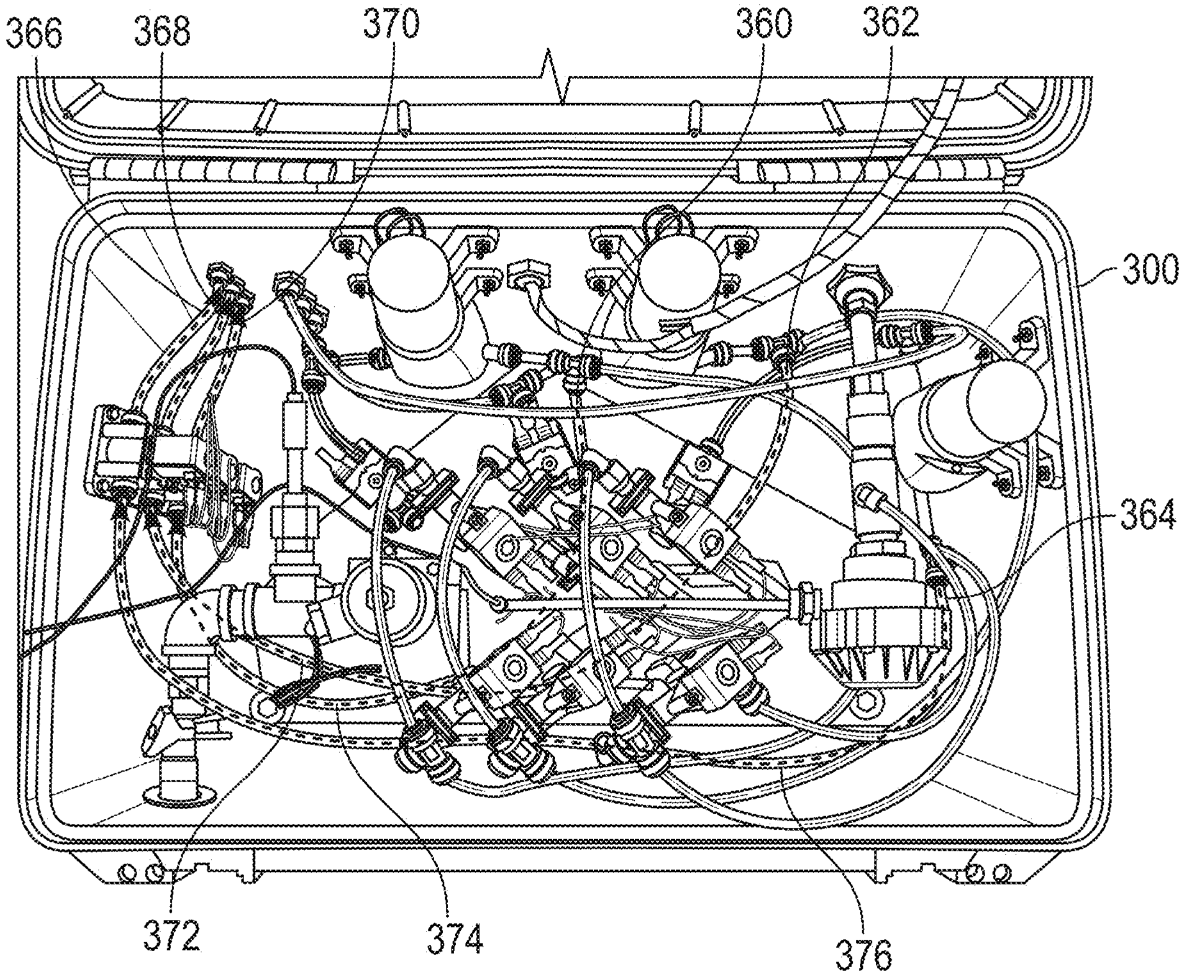
FIG. 3F is another illustration depicting the mixing device (and/or treatment device), according to one embodiment.

In FIG. 3F, another illustration depicting the mixing device (and/or treatment device) is shown, according to one embodiment. In one embodiment, the mixing device 300 may include a first ingredient outlet 366, a second ingredient outlet 368, a third ingredient outlet 370 (and/or an Nth ingredient outlet), a first ingredient priming line 376, a second ingredient priming line 374, a third ingredient priming line 372, a first ingredient priming line starting point 364, a second ingredient priming line starting point 362, and/or a third ingredient priming line starting point 360.

Figure 3G:
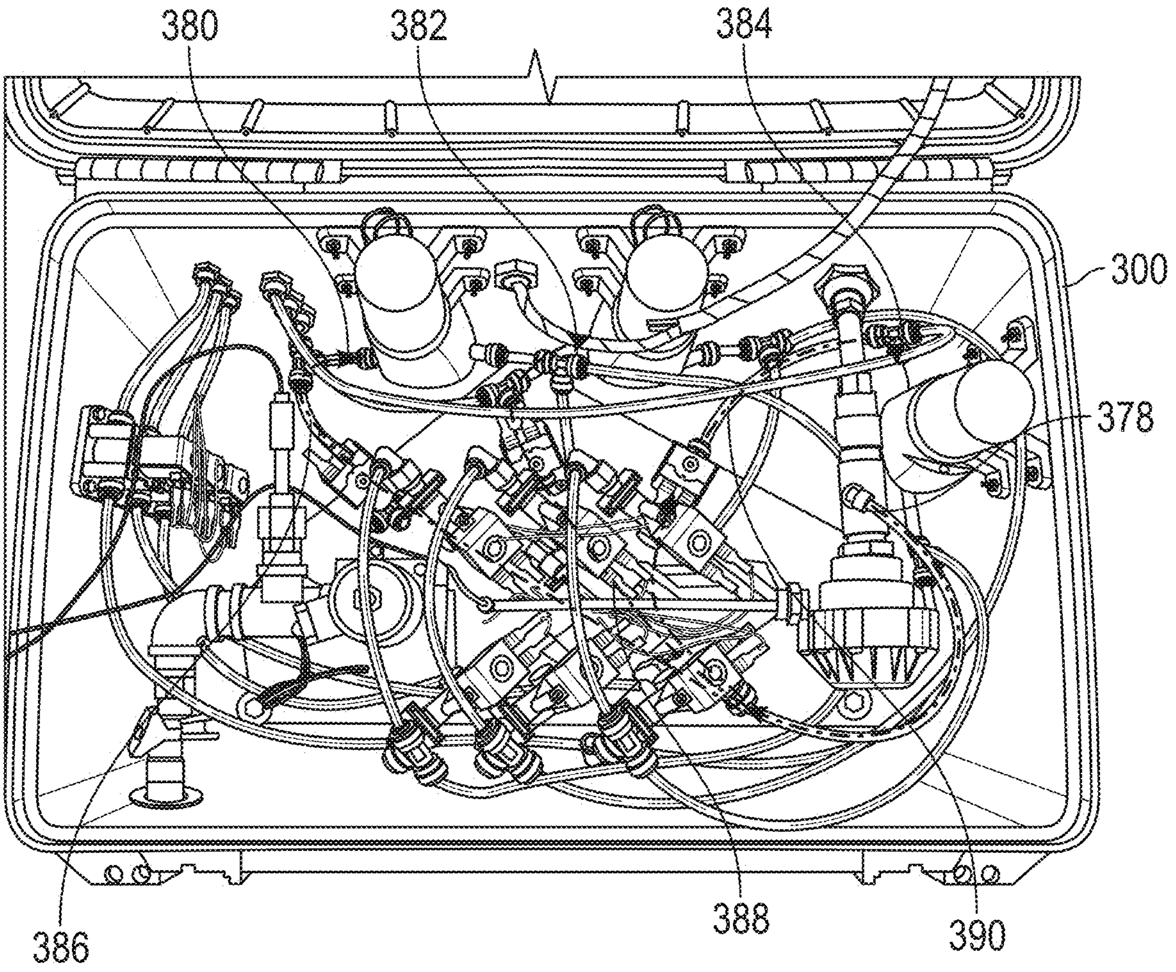
FIG. 3G is another illustration depicting the mixing device (and/or treatment device), according to one embodiment.

In FIG. 3G, another illustration depicting the mixing device (and/or treatment device) is shown, according to one embodiment. In one embodiment, the mixing device 300 may include a first flushing line 378, a first flushing line outlet 380, a second flushing line outlet 382, and/or a third flushing line outlet 384. In another example, a third flushing line 386 is shown between the third channel high flow CF Valve and the third channel pump. Further, a second flushing line 388 is shown between the second channel high flow CF Valve and the second channel pump. In addition, a first flushing line 390 is shown between the first channel high flow CF Valve and the first channel pump.

In various embodiments, the system may dilute/mix lawn-care products (e.g., herbicides) and/or cleaning products (e.g., window cleaner and/or general cleaners). In one example, fertigation products have a part A and part B, which the system would blend in the desired ratios. In another example, the only metric that the system tracks is the electrical conductivity (EC) of the final blend. In one example, a customer may be able to measure the EC of a hand mixed batch and enter that value into the software, after which the system may monitor the outlet EC in real time and have an alarm functionality if the blend goes off specifications for some reason.

In various examples, the flow rates may be modified based on changing the orifices to achieve the desired flow rates. In one example, a total output flow rate is fixed at 2 GPM. In this example, each high flow CF VALVE (AND/OR CFIVE) can do 0.02 to 0.2 GPM and each low flow CF VALVE (AND/OR CFIVE) can do 0.002 to 0.02 GPM, which means a given ingredient can make up between 0.1% to 10% of the final blend. It should be noted that % may equal percent and/or percentage.

In one example, the inlet pressure to all the CF VALVE (AND/OR CFIVE) s is approximately 35 psi. In this example, the diaphragm pumps have pressure switches that turn off the pumps when pressures reach 35-40 psi. In this example, the minimum required pressure to the CF VALVE (AND/OR CFIVE) s is 25 psi.

In another example, the flow modeling is determined. In this example, a calculation for a Y=MX+B formula is performed for each ingredient that determines what % open corresponds to any desired % dose (between 0.1 and 10%). In one example, a benchmark is determined by sampling on a lab scale at concentrations between 0.1% and 10% by weight. These measurements are recorded and the resulting EC values of each sample in uS is determined. Next, a field run is completed. The ingredient is run through the system at 10% open to 100% open in increments of 10% for both the high and low flow valves (independently). The scenarios are run three times and an average of the EC values is determined. Next, a predictive model is generated. In this example, a chart of the field run data and calculations of the trendline formula (y=mx+b) are produced. In this example, by entering the desired uS from the benchmark data into this formula, we get a projected % open to achieve that desired uS value. Next, the results are determined. In this example, the system tests the projected % open values. The system is run at each of those % open values and the output uS is match to the targeted uS for that % dose to determine any variance. In one example, if one of the values is far off the % open is modified until the measured uS is close. Lastly, a chart of the % dose against the actual % open (to achieve the benchmark uS values) is generated. In this example, this trend line produces the Y=MX+B formula that is utilized to directly convert the % dose to % open. If a customer wants a 5% solution, the model may direct the controller to pulse the high flow valve at 45% open per second. In another example, if a customer wants a 0.5% solution the model and/or controller may instruct the low flow valve to pulse at 38% open.

Figure 4:
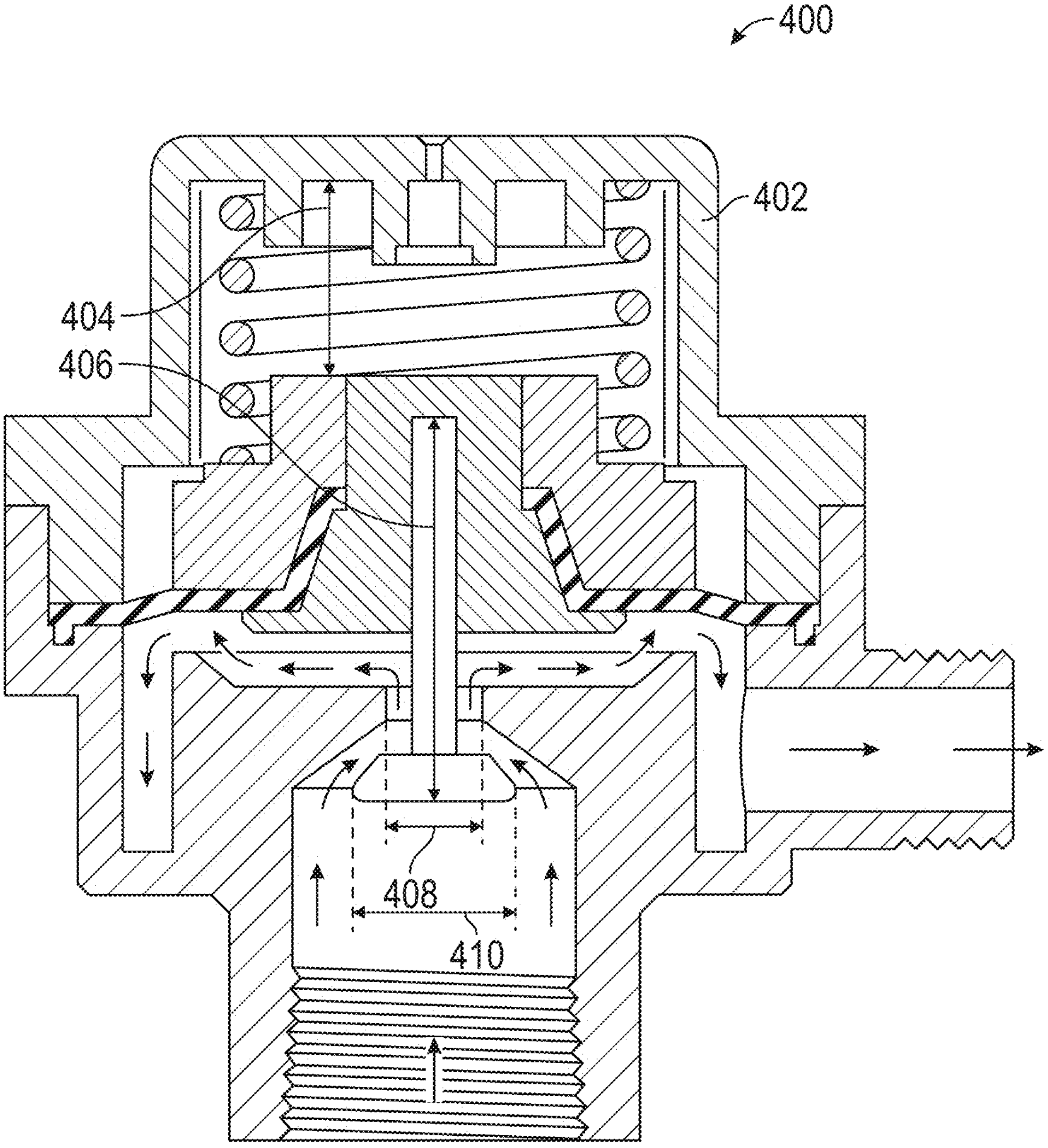
FIG. 4 is an illustration of a CF Valve utilizing in the mixing device (and/or treatment device), according to one embodiment.

In FIG. 4, an illustration of a CF Valve utilizing in the mixing device (and/or treatment device) is shown, according to one embodiment. FIG. 4 demonstrates the operations of the CF Valve (and/or CFiVe) technology, which can precisely control flow rate and pressure. Therefore, accurate accounting may be completed to determine inventory drawl and/or utilization. In other words, based on the amount of time the CF Valve (and/or CFiVe) is opened and/or operated, one or more calculations can be completed relating to liquid/gas/solid used (e.g., liquid 1 used x units, liquid 2 used y units, gas 1 used z units, gas 2 used zz units, solid 1 used aa units, solid 2 used bb units etc.). For example, based on the information that the CF Valve (and/or CFiVe) was open for 10 hours; 3 minutes; and 13 seconds during a first day, the system, device, and/or method may determine that 10,000 units of liquid 1 were used with 40,000 units of water (e.g., liquid 2) and/or 5,000 units of chemical X (e.g., solid 1), and/or 1,000 units of gas 1 were utilized. Further, based on the information that the CF Valve 1 was open for 10 hours; 3 minutes; and 13 seconds during a first day, the system, device, and/or method may determine the above-referenced calculations. In addition, based on the information that the CF Valve 2 was open for 8 hours; 5 minutes; and 6 seconds during a first day, the system, device, and/or method may determine that 7,000 units of liquid 2 were used with 10,000 units of water (e.g., liquid 2) and/or 2,000 units of chemical X (e.g., solid 1), and/or 3,000 units of gas 1 were utilized.

This information can be combined with inventory data to provide a just in time delivery cycle. Further, similar information for a plurality of liquids/gases/solids can determine chemical consumption and/or product consumption relative to each other, which can indicate one or more operational actions and/or issues. In another example, based on information from the CF Valves' usage, liquid 1 used 300 units whereas liquid 2 used only 80 units. Since liquid 2 performance relative to liquid 1 is outside a historical trend line, one or more actions (e.g., maintenance call, liquid/gas/solid container inspection, on-site marketing visit, etc.) may be taken. A CF Valve (and/or CFiVe) 400 may include a housing 402, a spring force 404, a throttle pin 406, an inlet orifice 408, and a throttle pin head 410.

Figure 5:
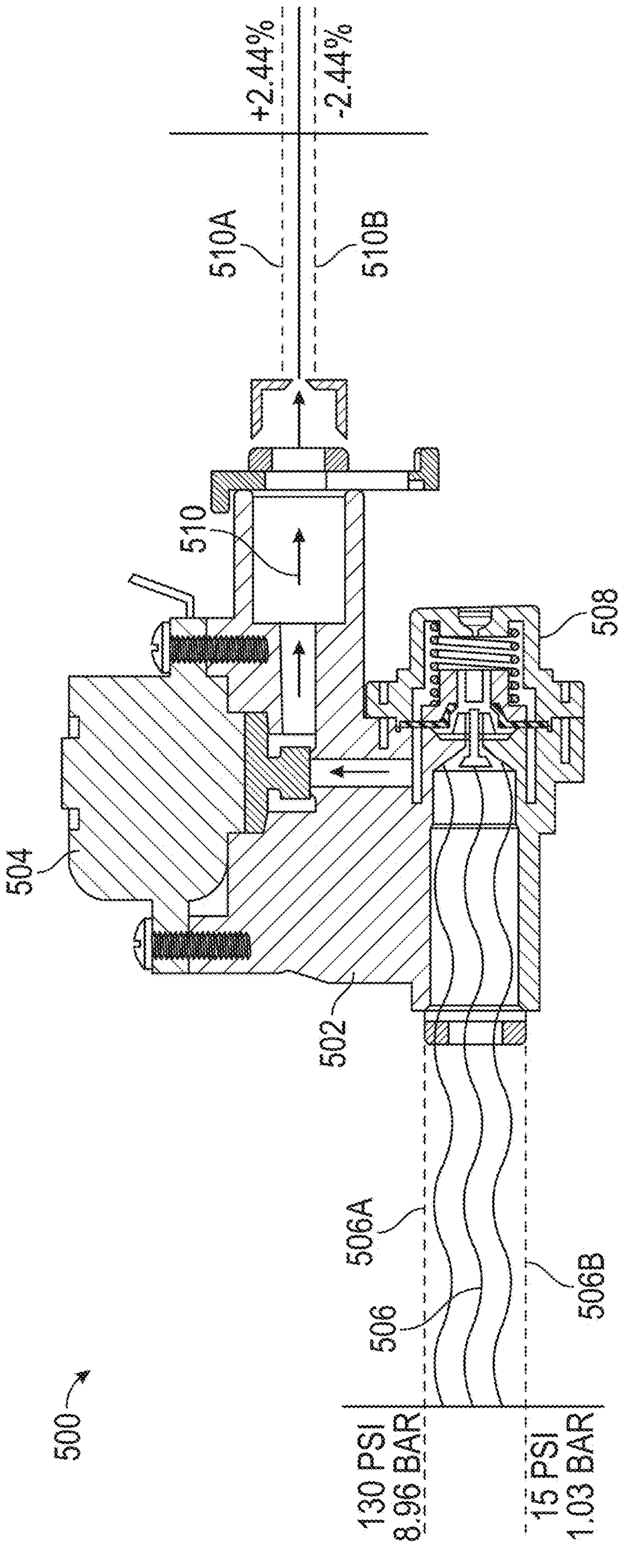
FIG. 5 is an illustration of a CF Valve utilizing in the mixing device (and/or treatment device), according to one embodiment.

In FIG. 5, an illustration of a CF Valve utilizing in the mixing device (and/or treatment device) is shown, according to one embodiment. The CF Isolation Valve 500 may include a housing 502, a solenoid 504, an inlet area, an outlet area, and a CF Valve (and/or CFiVe) 508. In this example, the CF Isolation Valve 500 receives an inlet flow 506 and produces an outlet flow 510. In this example, the inlet flow 506 varies from a first pressure 506A (e.g., 130 PSI) to an Nth pressure (e.g., 15 PSI). Further, in this example, the outlet flow 510 is produced with a target flow that is +/−2.44% (See reference numbers 510A and 510B). Therefore, regardless of the inlet pressure fluctuations, the CF Isolation Valve 500 delivers a constant output pressure flow downstream. The CF Valve (and/or CFiVe) diaphragm assembly is tuned to constantly modulate to maintain the set downstream application pressure and flow rate.

Figure 6:
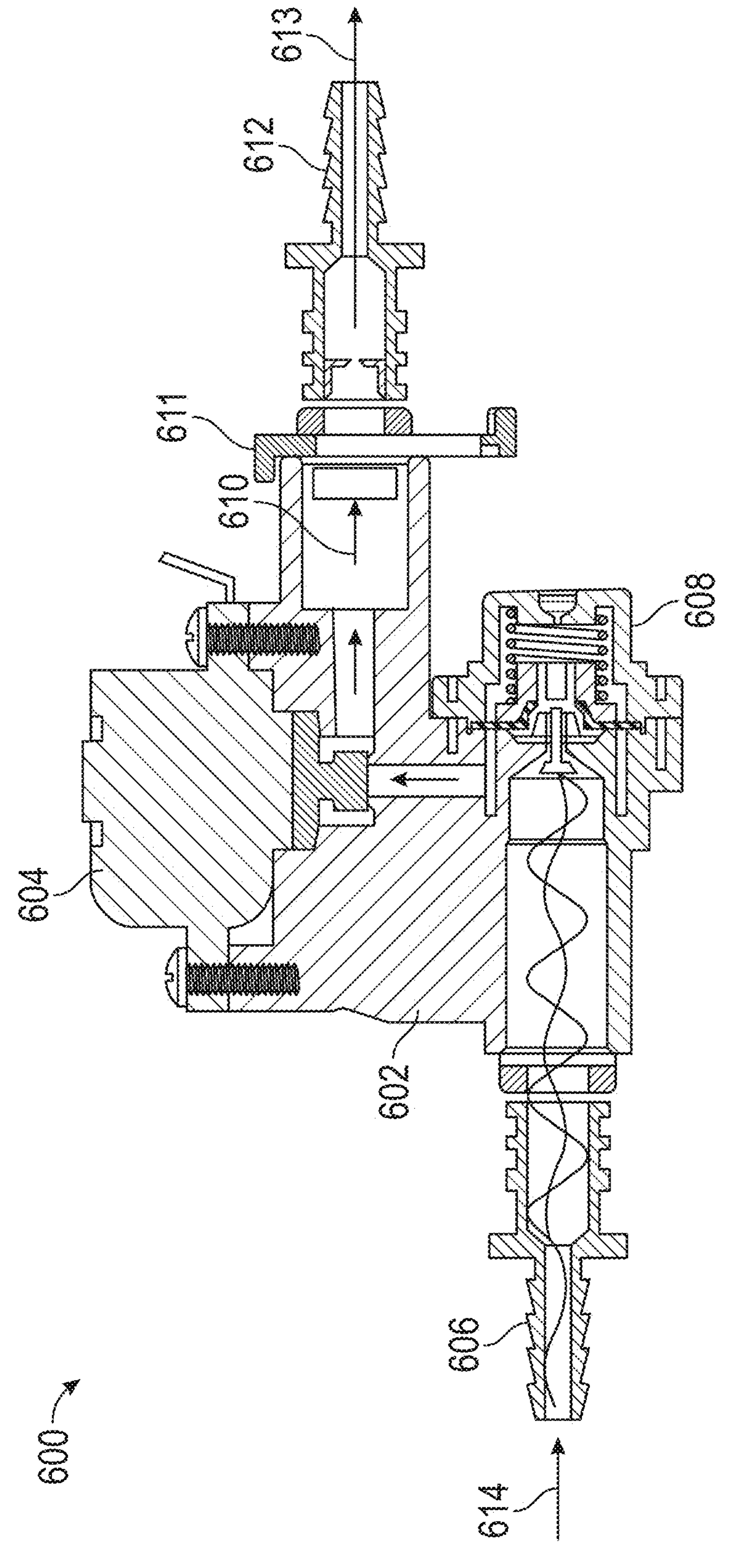
FIG. 6 is an illustration of a CF Valve and a solenoid utilizing in the mixing device (and/or treatment device), according to one embodiment.

In FIG. 6, an illustration of a CF Valve and a solenoid utilizing in the mixing device (and/or treatment device) is shown, according to one embodiment. The CF Isolation Valve 600 may include a housing 602, a solenoid 604, an inlet area, an outlet area, a first barb fitting 606, a CF Valve 608, an orifice bushing 610, a coupling device 611, and a second barb fitting 612. In various examples, various orifice sizes can be utilized. For example, a 0.056" orifice can be utilized for 1.0 ounces/second. In another example, a 0.063" orifice can be utilized for 1.2 ounces/second. In another example, a 0.073" orifice can be utilized for 1.4 ounces/second. In yet another example, a 0.080" orifice can be utilized for 1.6 ounces/second. In this example, there is an inlet flow 614 and an outlet flow 613. In various examples, one or more orifices may be 0.001", 0.002", . . . , 0.015", 0.016", . . . , 0.050", 0.051", . . . , 0.075", 0.076", . . . , 0.111", 0.0112", . . . , 0.999", 1.000", etc.

In a first example, three similar fluids needing a wide range of dose rates are utilized. For example, A1:0.043" (e.g., a first ingredient high flow orifice); A2: 0.015" (e.g., a first ingredient low flow orifice); B1: 0.043" (a second ingredient high flow orifice); B2: 0.015" (e.g., a second ingredient low flow orifice); C1: 0.043" (e.g., a third ingredient and/or Nth ingredient high flow orifice); and C2: 0.015" (e.g., a third ingredient and/or Nth ingredient low flow orifice). In this example, the flow rates for these fluids when the 0.015" CF VALVE (AND/OR CFIVE) is fully open is similar to when the 0.043" CF VALVE (AND/OR CFIVE) is pulsing at 10%. In this way, the ingredient injection rate spans from the low flow CF VALVE (AND/OR CFIVE) at 10% to the high flow CF VALVE (AND/OR CFIVE) at 100%. This is a 1:100 dose range and allows the system and/or device to dose each ingredient from 0.1% to 10% of the total blend.

In a second example, the three fluids with different viscosities, wide range of dose rates are utilized. The configuration may be as follows: A1: 0.043" (e.g., a first ingredient high flow orifice); A2: 0.015" (e.g., a first ingredient low flow orifice); B1: 0.060" (e.g., a second ingredient high flow orifice); B2: 0.030" (e.g., a second ingredient low flow orifice); C1: 0.090" (e.g., a third and/or Nth ingredient high flow orifice); and C2: 0.043" (e.g., a third and/or Nth ingredient low flow orifice). In this orifice configuration, ingredient A is not particularly viscous, ingredient B is more viscous, and ingredient C is very viscous. In this example, with this orifice configuration, the system and/or device could still dose each ingredient from 0.1% to 10% of the total blend.

In a third example, three fluids with different viscosities, but limited dose requirements are utilized. The configuration may be as follows: A1: 0.043" (e.g., a first ingredient high flow orifice); A2: N/A (e.g., a first ingredient low flow orifice); B1: 0.043" (e.g., a second ingredient high flow orifice); B2: N/A (e.g., a second ingredient low flow orifice); C1: 0.090" (e.g., a third and/or Nth ingredient high flow orifice); and C2: N/A (e.g., a third and/or Nth ingredient low flow orifice). In this example, each ingredient needs to be dosed at 2%, 4%, and 8%. An orifice of 0.043" works for ingredients A and B, but a larger orifice is needed for ingredient C. In one example, in all three cases a single orifice size can dose at the three required flow rates.

In a fourth example, three fluids with different viscosities and varying dose requirements are utilized. The orifice configuration is as follows: A1: 0.043" (e.g., a first ingredient high flow orifice); A2: 0.015" (e.g., a first ingredient low flow orifice); B1: 0.060" (e.g., a second ingredient high flow orifice); B2: 0.025" (e.g., a second ingredient low flow orifice); C1: 0.043" (e.g., a third and/or Nth ingredient high flow orifice); and C2: N/A (e.g., a third and/or Nth ingredient high flow orifice). In this example, ingredient B (e.g., the second ingredient) is more viscous than ingredient A (e.g., the first ingredient), but both require a wide range of dose rates so they each utilize two different orifice sizes. The third ingredient has a limited dose rate (in one example, only one dose rate at all times, such as 2%), so only one orifice is needed.

Figure 7:
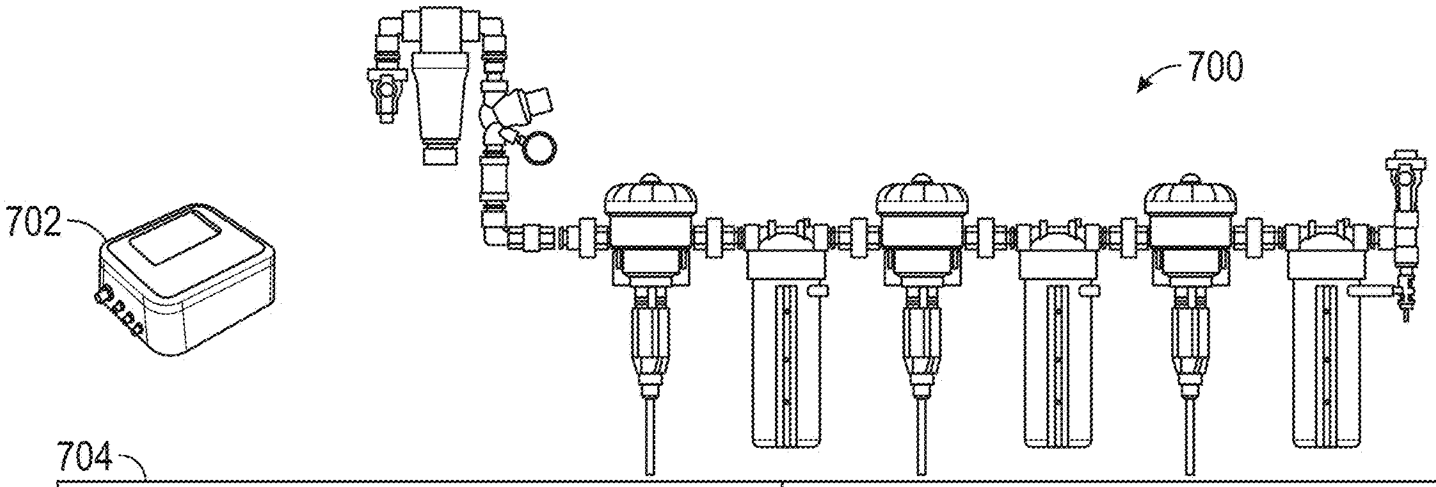
FIG. 7 is an illustration of characteristics of the mixing device (and/or treatment device), according to one embodiment.

In FIG. 7, an illustration of characteristics of the mixing device (and/or treatment device) is shown, according to one embodiment. In one example, a treatment system 700 may be connected to a remote display 702 (and/or mobile display and/or mobile device). In addition, the treatment system may have various characteristics described in a chart 704. In one example, the mixing device (and/or treatment device) may have a footprint of 18" by 12" by 10". However, any dimensions may be utilized. Further, in another example, the mixing device (and/or treatment device) may be portable. In another example, the mixing device (and/or treatment device) is stationary. In addition, the mixing device (and/or treatment device) may have various flow rates (e.g., 1 GPM, 2 GPM, 3 GPM, 4 GPM, 5 GPM, etc.). In one example, the flow rate is 3 GPM (gallons per minute). In various examples, the flow rate may be 0.5 GPM, 0.75 GPM, 1.0 GPM, 1.5 GPM, 1.75 GPM, 2.0 GPM, 2.5 GPM, 2.75 GPM, 3.0 GPM, 3.5 GPM, 3.75 GPM, 4.0 GPM, 4.5 GPM, 4.75 GPM, 5.0 GPM, 5.5 GPM, 5.75 GPM, 6.0 GPM, . . . 20 GPM. Further, the flow rate may be adjusted either automatically and/or manually from any flow rate discussed in this disclosure to any other flow rate discussed in this disclosure. In another example, the dose range may be anywhere from 1:1000 to 1:10. Further, the dosage rate may be adjusted either automatically and/or manually from any dosage rate discussed in this disclosure to any other dosage rate discussed in this disclosure.

In addition, as discussed in this disclosure, the dosage may be programmed into the mixing device (and/or treatment device). In another example, there may be a sold out alarm, a maintenance alarm, an inventory low alarm, a temperature alarm, one or more characteristics alarms, a flow rate alarm, a dosage alarm, a pressure alarm, and/or any other mixing device (and/or treatment device) related alarm. In another example, the pressure drop through the system may be 2 PSI (e.g. pounds per square inch). Further, in various examples, the pressure drop through the system may be in the range of 1 PSI to 3 PSI. In one example, the mixing device (and/or treatment device) may connect to a remote device, the Internet, a central server, a control center, a monitoring center, and/or any combination thereof.

Figure 8A:
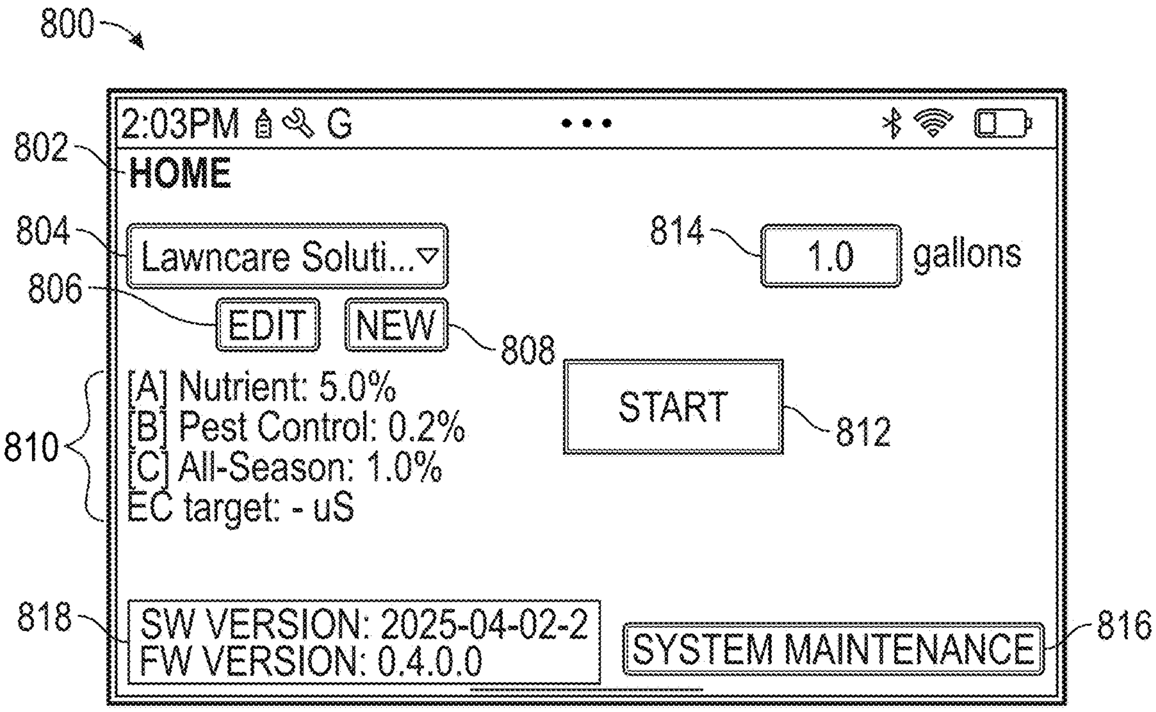
FIG. 8A is an illustration of a user interface for the mixing device (and/or treatment device), according to one embodiment.

In FIG. 8A, an illustration of a user interface for the mixing device (and/or treatment device) is shown, according to one embodiment. In one example, the user interface may be a mobile device. In another example, the user interface may be on the mixing device (and/or treatment device). In another example, the user interface may be utilized on a mobile device, a remote device, and/or on the unit.

In an embodiment, a user interface home page 800 may include a home button 802, a solutions menu 804, an edit button 806, a new button 808, a characteristics section 810, a start button 812, a flow rate button 814, a system maintenance button 816, and/or a system version area 818. In one example, the home button 802 (once pressed) returns the user to a main programmed page and/or layout. In another example, the solutions menu 804 may include one or more products (e.g., pest control, grease removal, cleaning, and/or any other product and/or formula discussed in this disclosure). In one example, the edit button 806 may allow for a product and/or formula to be edited. For example, a formula may include 5.0% nutrient, 0.2% pest control, and 1.0% all-season. In this example, by selecting the edit button 806, a customer may modify the 5.0 nutrient value to a 6.0% nutrient value; modify the 0.2% pest control value to a 0.1% pest control value; and/or modify the 1.0% all-season value to a 3.0% all-season value. In another example, the characteristics section 810 may display one or more characteristics of the product and/or formula. In another example, the start button 812 may start the procedure which may include priming the system. In another example, the flow rate button 814 may show the flow rate of the product and/or formula. In one example, the flow rate button 814 may be modified to change the flow rate of the product and/or formula. In another example, the system maintenance button 816 may be utilized to initiate a maintenance function and/or determine whether maintenance is required for the system. In another example, the system version area 818 may show which version is currently being implemented.

Figure 8B:
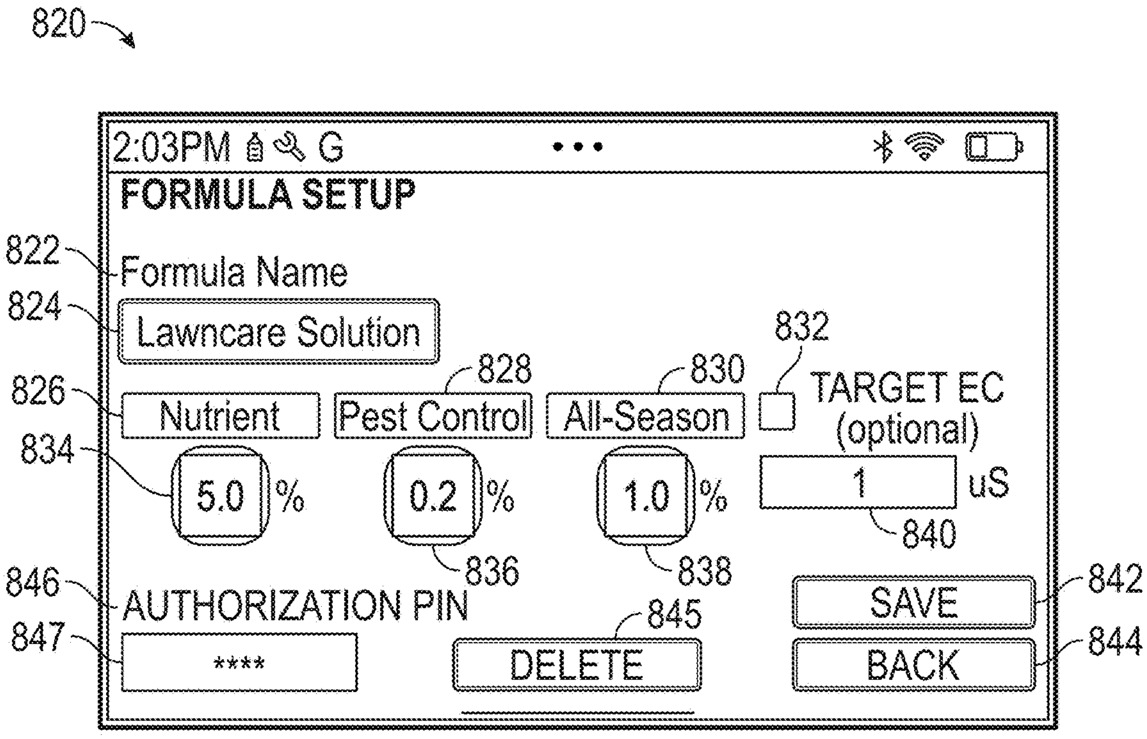
FIG. 8B is another illustration of a user interface for the mixing device (and/or treatment device), according to one embodiment.

In FIG. 8B, another illustration of a user interface for the mixing device (and/or treatment device) is shown, according to one embodiment. In one example, a formula setup page 820 may include a formula name area 822, a formula solution area 824, a nutrient area 826, a pest control area 828, an all-season area 830 (and/or ingredient names), a target EC area 832, a percentage level of nutrient area 834, a percentage level of pest control area 836, a percentage level of all-season area 838, an uS target (and/or level) area 840, an authorization pin area 846, an authorization pin entry area 847, a delete button 845, a save button 842, and/or a back button 844.

In various embodiments, electrical conductivity ("EC") is utilized and EC is measured in microsiemens. Microsiemens (µS or µS) is a unit of electrical conductance, specifically one millionth of a siemens(S).

In one example, the formula setup page 820 may include the formula name area 822. For example, the formula name area 822 may show that the current product and/or formula is named "Total Pest Control". In another example, the formula solution area 824 may show a formula solution name. In another example, the nutrient area 826 may show a level of nutrient (e.g., the percentage level of nutrient area 834 or 5%). In another example, the pest control area 828 may show a level of pest control (e.g., the percentage level of pest control area 836 or 0.2%). In another example, the all-season area 830 may show a level of all-season (e.g., a percentage level of all-season area 838 or 1.0%). In another example, the target EC area 832 may show a targeted EC. Further, the uS level area 840 may show a level of uS (e.g., 1). In another example, the authorization pin area 846 may highlight a pin code area where the authorization pin entry area 847 must be made (e.g., a code to activate and/or modify the system). In another example, the delete button 845 allows the customer to delete one or more data points. Further, the save button 842 allows the customer to save one or more data points. In another example, the back button 844 allows the customer to go back to a previous page.

Figure 8C:
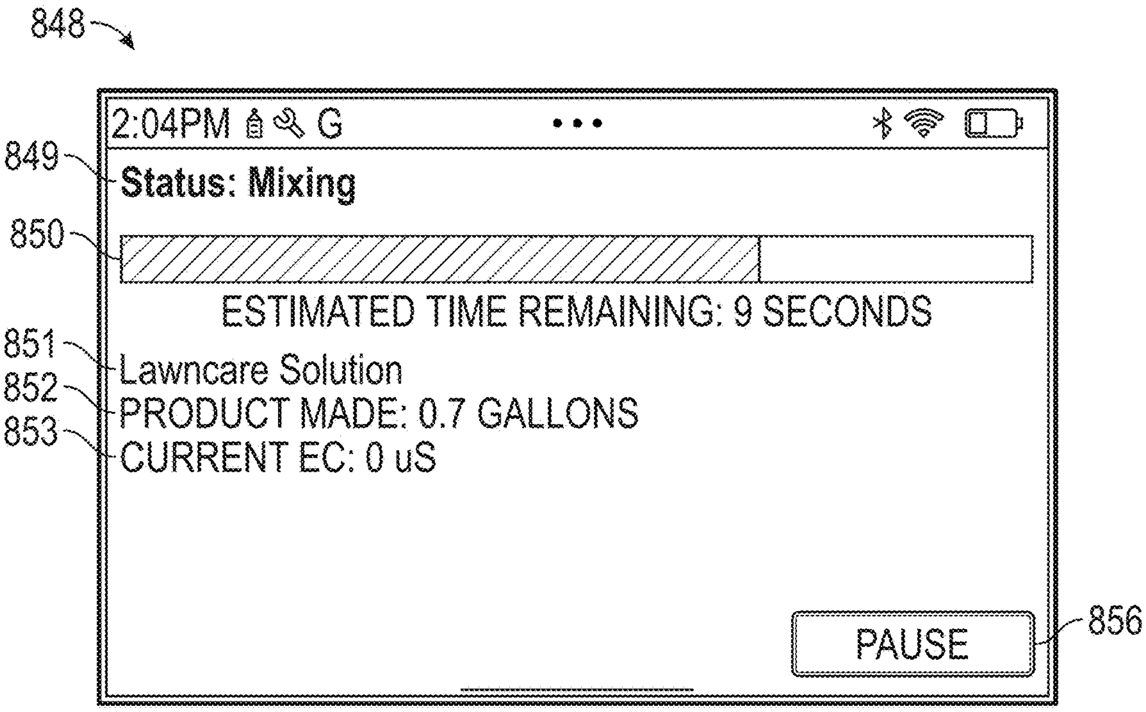
FIG. 8C is another illustration of a user interface for the mixing device (and/or treatment device), according to one embodiment.

In FIG. 8C, another illustration of a user interface for the mixing device (and/or treatment device) is shown, according to one embodiment. In one example, a system running page 848 may include a status area 849 (e.g., mixing status, running status, ending status, starting status, error status, warning status, etc.), a status bar 850, a lawncare solution area 851, a product made area 852, and/or a current EC area 853.

Figure 8D:
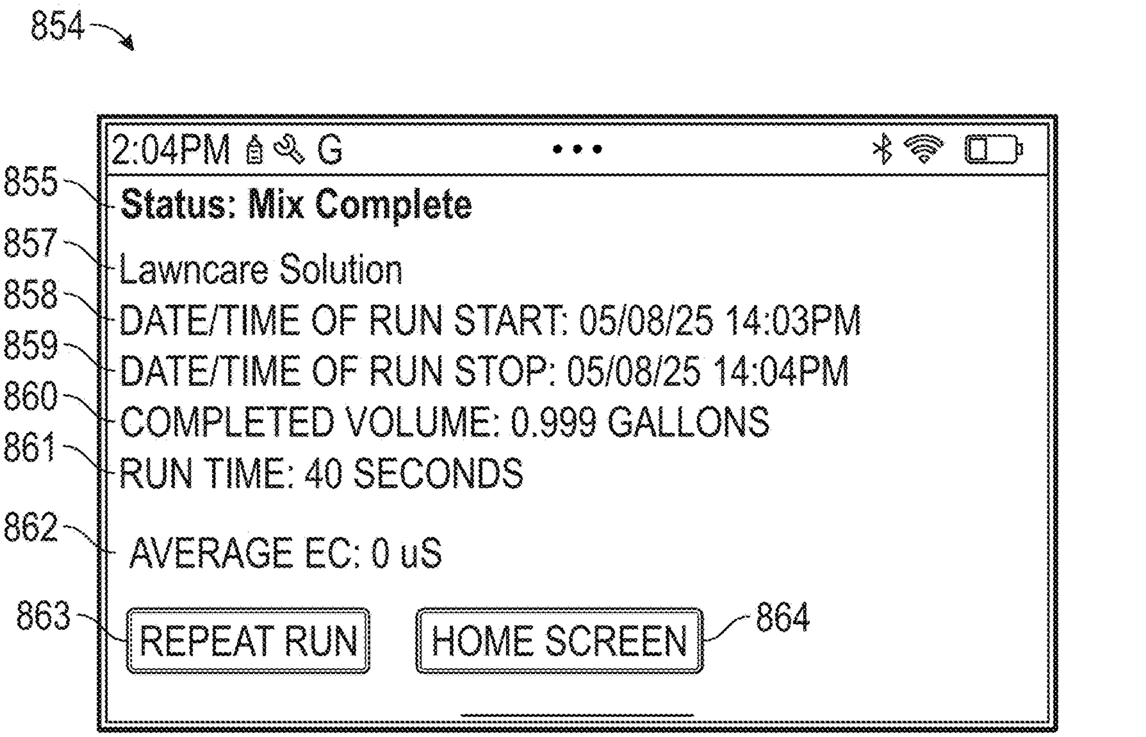
FIG. 8D is another illustration of a user interface for the mixing device (and/or treatment device), according to one embodiment.

In FIG. 8D, another illustration of a user interface for the mixing device (and/or treatment device) is shown, according to one embodiment. In one example, a run complete page 854 may include a status area 855 (e.g., mixing complete), a pause button 856 (see FIG. 8C), a lawncare solution area 857, a start time area 858, a stop time area 859, a completed volume area 860, a run time area 861, an average EC area 862, a repeat run button 863, and/or a home screen button 864.

Figure 8E:
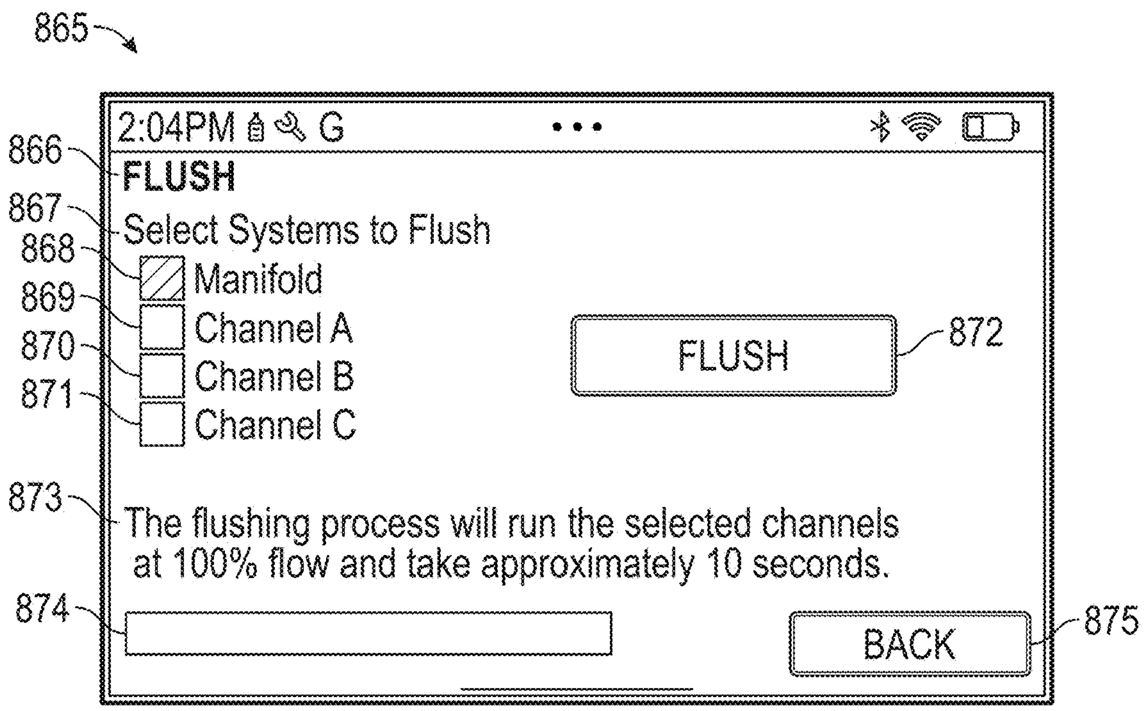
FIG. 8E is another illustration of a user interface for the mixing device (and/or treatment device), according to one embodiment.

In FIG. 8E, another illustration of a user interface for the mixing device (and/or treatment device) is shown, according to one embodiment. In one example, a flush interface page 865 may include a flush title area 866, a select system(s) to flush area 867 with a first area to flush button 868; a second area to flush button 869; a third area to flush button 870; and/or an Nth area to flush button 871, a flush button 872, a detailed flush description area 873, a flush status area 874, and/or a back button 875. In one example, a customer may select one or more of the first area to flush button 868; the second area to flush button 869; the third area to flush button 870; and/or the Nth area to flush button 871. In this example, the customer has selected the first area to flush button 868 which is indicated by the button being shaded. Further, the flush button 872 may active the flushing functionality.

Figure 9:
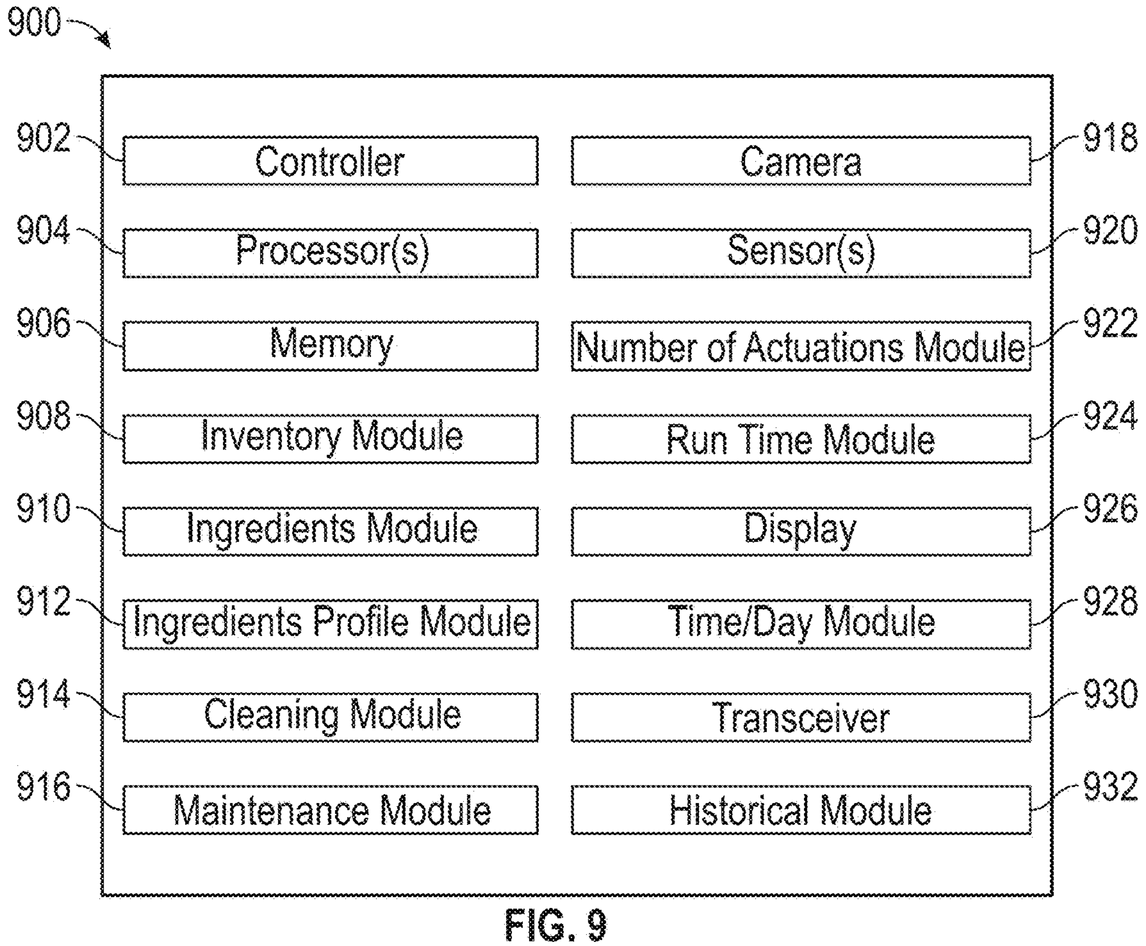
FIG. 9 is a block diagram of the mixing device (and/or treatment device), according to one embodiment.

In FIG. 9, a block diagram of the mixing device (and/or treatment device) is shown, according to one embodiment. In one example, a block diagram 900 may include a controller 902, one or more processors 904, a memory 906, an inventory module 908, an ingredients module 910, an ingredients profile module 912, a cleaning module 914, a maintenance module 916, one or more cameras 918, one or more sensors 920, a number of actuations module 922, a runtime module 924, a display 926, a time/day module 928, a transceiver 930, and/or a historical module 932. In one example, the inventory module 908 may have one or more data points relating to inventories of one or more products (e.g., inventory level for product 1, expiration date for product 2, cost for product 3, last order date and quantity for product 4, number of actuations for product 5, estimated date for reorder of product 5 based on actuations, estimated date for reorder of product 6 based on expiration date, estimated date for reorder of product 7 based on inventory level, inventory seasonally adjusted data for product N, and/or any combination thereof). In another example, the ingredients module 910 may have data relating to one or more ingredients. In another example, the ingredients profile module 912 may have any data relating to any testing and/or disclosure in this document. In another example, the cleaning module 914 may have data relating to one or more cleaning procedures, cleaning timelines, cleaning requirements, and/or any other cleaning data. In another example, the maintenance module 916, may have data relating to one or more maintenance procedures, maintenance timelines, maintenance requirements, and/or any other maintenance data. In another example, the one or more cameras 918 may be utilized for remote monitoring of one or more system units, one or more products, and/or one or more treatment areas. In another example, the one or more sensors 920 may be utilized for product monitoring, inventory level monitoring, maintenance monitoring, flow rate monitoring, product quality monitoring, treatment area monitoring, and/or any other monitoring. In another example, the number of actuations module 922 may be utilized to monitor the number of actuations which may be utilized for inventory management and/or product utilization management and/or cost management. In another example, the runtime module 924 may be utilized to track the run time and/or utilization rate of the product and/or chemicals. Further, runtime module 924 may be utilized for cost management and/or inventory management. In another example, the display 926 may be utilized to display various data points and obtain data enter from the customer and/or programmer. In another example, the time/day module 928 may be utilized to set mixing and/or treatment times based on the time of day, the weather, the season, the day, and/or any combination thereof. In another example, the historical module 932 may include data relating to any historical and/or past event.

Figure 10:
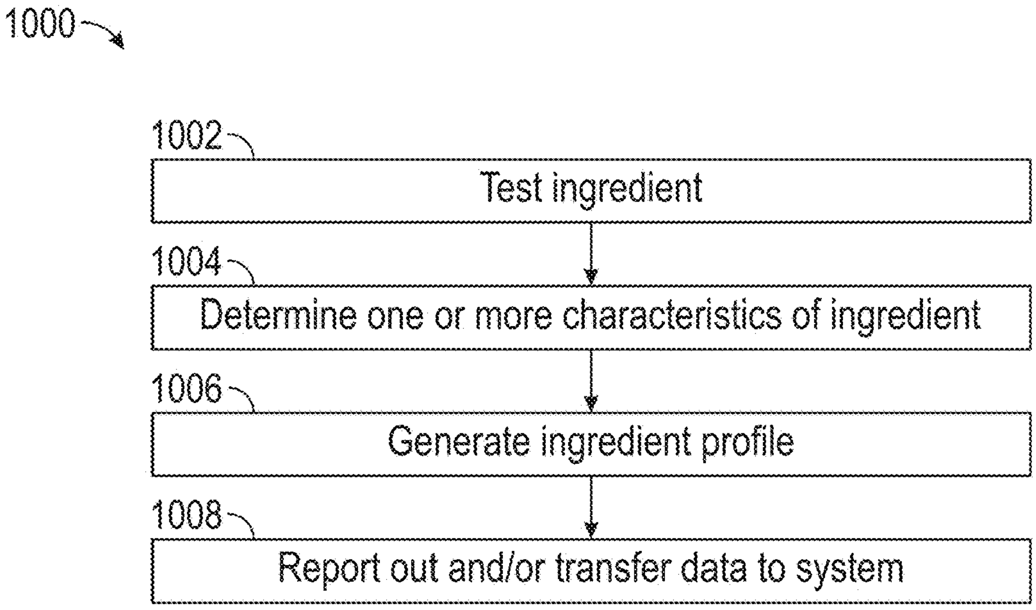
FIG. 10 is a flow chart, according to one embodiment.

In FIG. 10, a flow chart is shown, according to one embodiment. In one embodiment, a method 1000 may include testing an ingredient (step 1002). Further, the method 1000 may include determining one or more characteristics of the ingredient (step 1004). The method may include generating an ingredient profile (step 1006). In addition, the method 1000 may include reporting out and/or transferring the data to a system, a remote device, a control center, and/or one or more processing devices and/or processors (step 1008).

Figure 11:
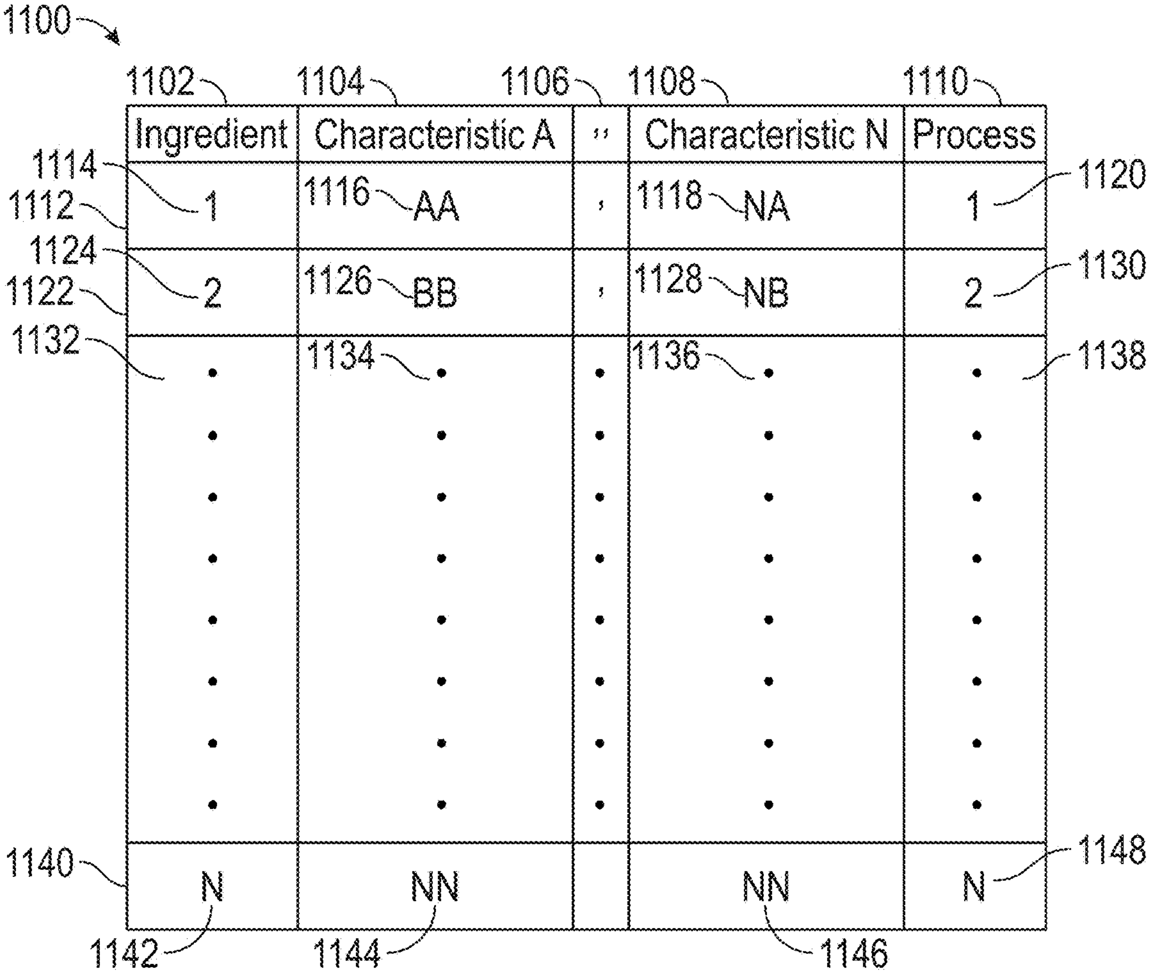
FIG. 11 is an ingredient profiling table, according to one embodiment.

In FIG. 11, an ingredient profiling table 1100 is shown, according to one embodiment. In one example, the ingredient profile table 1100 may include an ingredients column 1102, a first ingredient characteristic column 1104, multiple ingredient characteristic columns 1106, an Nth ingredient characteristic column 1108, and/or a process column 1110. In one example, the ingredients column 1102 may include a first ingredient 1112 with a first ingredient name 1114, a second ingredient 1122 with a second ingredient name 1124, multiple ingredients with multiple ingredient names 1132, and/or an Nth ingredient 1140 with an Nth ingredient name 1142. In addition, the first ingredient 1112 may have a first ingredient first characteristic 1116, first ingredient multiple characteristics, a first ingredient Nth characteristic 1118, and/or a first ingredient process 1130. In another example, the second ingredient 1122 may have a second ingredient first characteristic 1126, second ingredient multiple characteristics, a second ingredient Nth characteristic 1128, and/or a second ingredient process 1120. Further, multiple ingredients 1132 may have multiple first characters 1134, . . . , multiple characteristics, multiple Nth characteristics 1136, and/or multiple processes 1138. In another example, the Nth ingredient 1140 may have an Nth ingredient first characteristic 1144, an Nth ingredient multiple characteristics, an Nth ingredient Nth characteristic 1146, and/or an Nth ingredient process 1148.

Figure 12:
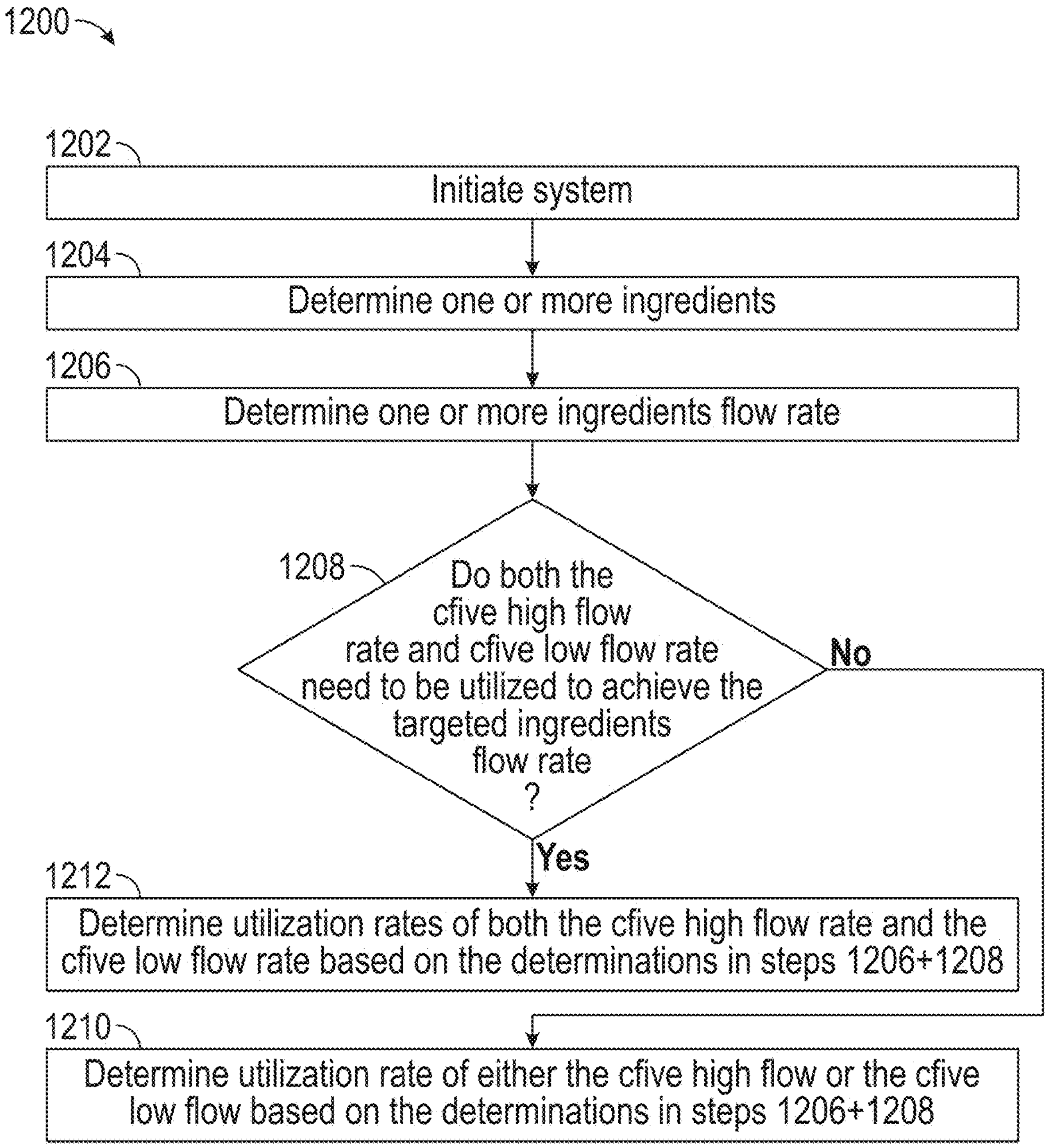
FIG. 12 is a flow chart, according to one embodiment.

In FIG. 12, a flow chart is shown, according to one embodiment. A method 1200 may include initiating the system (step 1202). The method 1200 may include determining one or more ingredients (step 1204). The method 1200 may include determining one or more ingredients flow rates (step 1206). The method 1200 may include determining whether both the CFive high flow rate and the CFive low flow rate need to be utilized to achieve the targeted ingredients flow rates (step 1208). This is an optional step. In various examples, the controller only runs one of the high flow CF Valve or the low flow CF Valve and no determination is completed regarding using one or the other.

If the answer is no to step 1208, the method 1200 may include determining the utilization rate of either the CFive high flow or the CFive low flow based on the determinations in steps 1206 and 1208 (step 1210). If the answer is yes in step 1208, the method 1200 may include determining the utilization rates of both the CFive high flow and the CFive low flow based on the determinations in steps 1206 and 1208 (step 1212).

Figure 13:
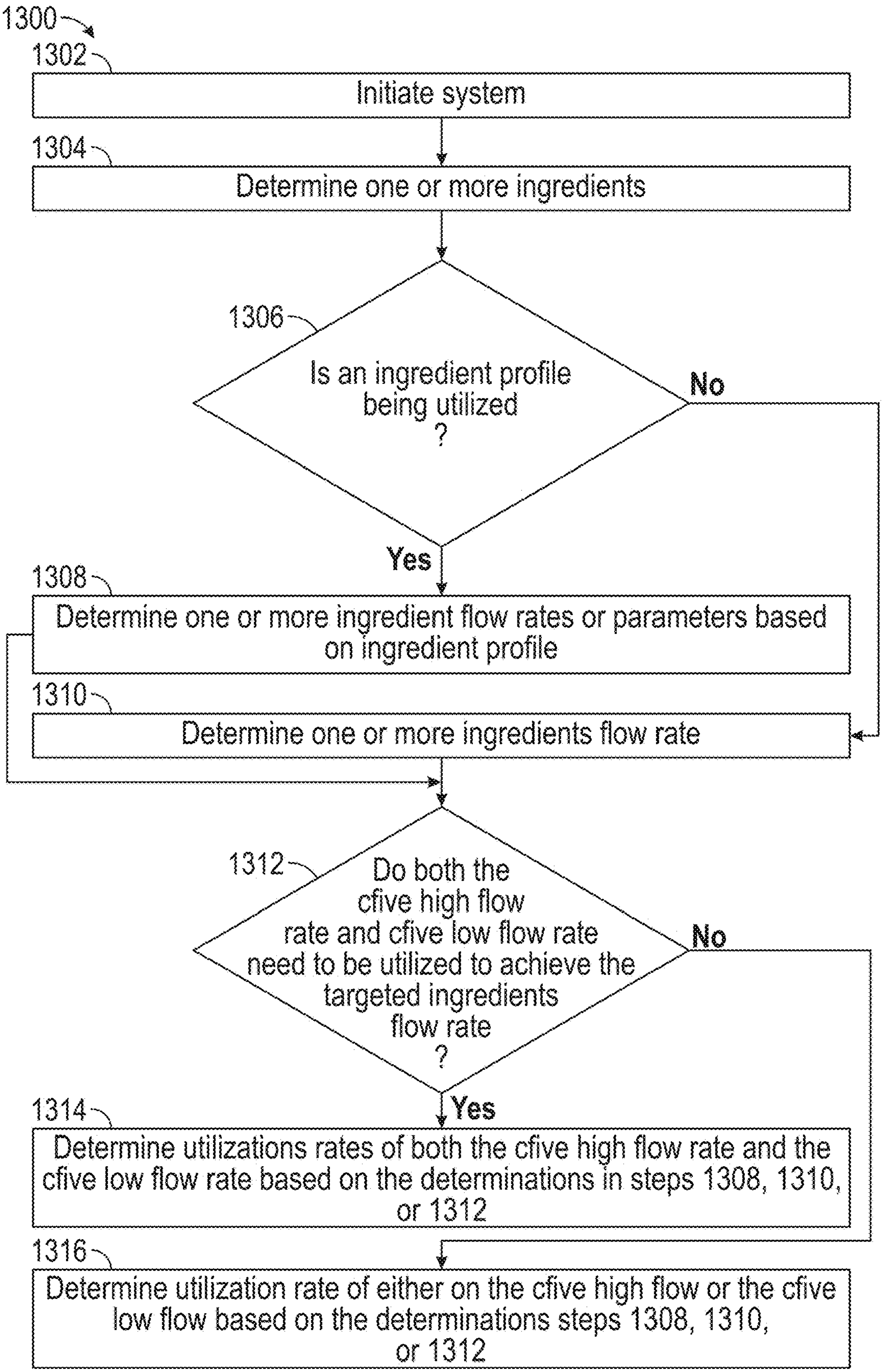
FIG. 13 is a flow chart, according to one embodiment.

In FIG. 13, a flow chart is shown, according to one embodiment. A method 1300 may include initiating the system (step 1302). The method 1300 may include determining one or more ingredients (step 1304). The method 1300 may include determining whether an ingredient profile is being utilized (step 1306). If the answer to step 1306 is no, then the method 1300 may include determining one or more ingredients flow rates (step 1310). The method 1300 may include determining whether both the CFive high flow rate and the CFive low flow rate need to be utilized to achieve the targeted ingredients flow rates (step 1312). This is an optional step. In various examples, the controller only runs one of the high flow CF Valve or the low flow CF Valve and no determination is completed regarding using one or the other.

If the answer is no to step 1312, the method 1300 may include determining the utilization rate of either the CFive high flow or the CFive low flow based on the determinations in steps 1308, 1310, or 1312 (step 1316). If the answer is yes in step 1312, the method 1300 may include determining the utilization rates of both the CFive high flow and the CFive low flow based on the determinations in steps 1308, 1310, or 1312 (step 1314).

If the answer to step 1306 is yes, then the method 1300 may include determining one or more ingredients flow rates or parameters based on an ingredient profile (step 1308). If the answer is yes in step 1312, the method 1300 may include determining the utilization rates of both the CFive high flow and the CFive low flow based on the determinations in steps 1308, 1310, or 1312 (step 1314). If the answer is no in step 1312, the method 1300 may include determining the utilization rates of both the CFive high flow and the CFive low flow based on the determinations in steps 1308, 1310, or 1312 (step 1314). This is an optional step. In various examples, the controller only runs one of the high flow CF Valve or the low flow CF Valve and no determination is completed regarding using one or the other.

In FIG. 14A, a benchmark value chart is shown, according to one embodiment. In one example, a benchmark value chart 1400 may include a CF Valve high flow table 1402 and a CF Valve low flow table 1404. In one example, the CF Valve high flow table 1402 may include one or more uS values and percentage concentration value 1406. The concentration value 1406 represents the concentration of the ingredient as a percentage of the total solution. In one example, a concentration value of 2 represents a lab sample with 2% ingredient and 98% water. In another example, the CF Valve low flow table 1404 may include one or more uS values and percentage concentration values 1408. For example, a percentage concentration value of 0.1 represents a lab sample with 0.1% ingredient and 99.9% water.

In various embodiments, electrical conductivity ("EC") is utilized and EC is measured in microsiemens. Microsiemens (μS or μS) is a unit of electrical conductance, specifically one millionth of a siemens(S).

The output of the mixing device (and/or treatment device) may be to utilize various product formulas. For example, Formula 1 may be 3.5% A, 0.4% B, and 0% C. In another example, Formula 2 may be 8% A, 8% B, 1.5% C. In addition, Formula 3 may be 10% A, 0% B, and 2.8% C. Further, Formula 4 may be 0.7% A, 1.2% B, and 0% C. In various embodiments, there may be two ingredients, three ingredients, four ingredients, . . . , twenty ingredients, . . . , Nth ingredients. In various embodiments, the products and/or ingredients may be liquid fertilizer (Urea, Ammonia Nitrate), plant nutrient formulas, disinfectant, tile cleaner, degreaser (acetone or isopropyl alcohol), surfactants, Surfactant based cleaners (C9-11 alcohols ethoxylated, Sodium Lauryl Sulfate), herbicides (Glysophate, MCPA, MCPP-p), and/or pesticides (Bifenthrin).

In another example, the CF Valve high flow table 1402 may include a 900 uS reading associated with a first concentration value 1410 (e.g., a percentage concentration value of 1.0 represents a lab sample with 1.0% ingredient and 99.0% water); a 1320 uS reading associated with a second concentration value 1412 (e.g., a percentage concentration value of 2.0 represents a lab sample with 2.0% ingredient and 98.0% water); a 1820 uS reading associated with a third concentration value 1414 (e.g., a percentage concentration value of 3.0 represents a lab sample with 3.0% ingredient and 97.0% water); a 2240 uS reading associated with a fourth concentration value 1416 (e.g., a percentage concentration value of 4.0 represents a lab sample with 4.0% ingredient and 96.0% water); a 2750 uS reading associated with a fifth concentration value 1418 (e.g., a percentage concentration value of 5.0 represents a lab sample with 5.0% ingredient and 95.0% water); a 3150 uS reading associated with a sixth concentration value 1420 (e.g., a percentage concentration value of 6.0 represents a lab sample with 6.0% ingredient and 94.0% water); a 3660 uS reading associated with a seventh concentration value 1422 (e.g., a percentage concentration value of 7.0 represents a lab sample with 7.0% ingredient and 93.0% water); a 3960 uS reading associated with an eighth concentration value 1424 (e.g., a percentage concentration value of 8.0 represents a lab sample with 8.0% ingredient and 92.0% water); a 4520 uS reading associated with a nineth concentration value 1426 (e.g., a percentage concentration value of 9.0 represents a lab sample with 9.0% ingredient and 91.0% water); and/or a 4840 uS reading associated with a tenth concentration value 1428 (e.g., a percentage concentration value of 10.0 represents a lab sample with 10.0% ingredient and 90.0% water).

In another example, the CF Valve low flow table 1404 may include a 640 uS reading associated with a first concentration value 1430 (e.g., a percentage concentration value of 0.1 represents a lab sample with 0.1% ingredient and 99.9% water); a 670 uS reading associated with a second concentration value 1432 (e.g., a percentage concentration value of 0.2 represents a lab sample with 0.2% ingredient and 99.8% water); a 700 uS reading associated with a third concentration value 1434 (e.g., a percentage concentration value of 0.3 represents a lab sample with 0.3% ingredient and 99.7% water); a 730 uS reading associated with a fourth concentration value 1436 (e.g., a percentage concentration value of 0.4 represents a lab sample with 0.4% ingredient and 99.6% water); a 760 uS reading associated with a fifth concentration value 1438 (e.g., a percentage concentration value of 0.1 represents a lab sample with 0.5% ingredient and 99.5% water); a 800 uS reading associated with a sixth concentration value 1440 (e.g., a percentage concentration value of 0.6 represents a lab sample with 0.6% ingredient and 99.4% water); a 830 uS reading associated with a seventh concentration value 1442 (e.g., a percentage concentration value of 0.7 represents a lab sample with 0.7% ingredient and 99.3% water); a 860 uS reading associated with an eighth concentration value 1444 (e.g., a percentage concentration value of 0.8 represents a lab sample with 0.8% ingredient and 99.2% water); a 910 uS reading associated with a nineth concentration value 1446 (e.g., a percentage concentration value of 0.9 represents a lab sample with 0.9% ingredient and 99.1% water); and/or a 970 uS reading associated with a tenth concentration value 1448 (e.g., a percentage concentration value of 1.0 represents a lab sample with 1.0% ingredient and 99.0% water).

It should be noted that any valve (e.g., high flow valve, low flow valve, and/or any valve disclosed in this disclosure) may be opened for a time period in the range of 50 milliseconds to 1000 milliseconds. Therefore, a valve may be opened for 50 milliseconds, 51 milliseconds, 52 milliseconds, 53 milliseconds, . . . , 997 milliseconds, 998 milliseconds, 999 milliseconds, and/or 1000 milliseconds.

In FIG. 14B, baseline test run charts are shown, according to various embodiments. In one example, various baseline runs (e.g., run 1 low flow, run 2 low flow, run 3 low flow, run 1 high flow, run 2 high flow, and run 3 high flow) were performed. These runs were performed with different percent opening settings (e.g., 0.1, 0.2, . . . , 1, 2, . . . , and/or 10). In one example, low flow runs (e.g., 3) on a 10 percent opening 1457 were performed (e.g., valve opened for 100/1000 milliseconds or 0.1 seconds or 1/10 of a second). As shown in the percentage opening column 1452, the opening percentage was set to 10 percent. As shown in a first run column 1453, the uS value was 920 uS. In a second run column 1454, the uS value was 820 uS. In a third run column 1455, the uS value was 790. Further, in an average column 1456, the average uS value was 843 uS.

In one example, low flow runs (e.g., 3) on a 20 percent opening 1458 were performed (e.g., valve opened for 200/1000 milliseconds or 0.2 seconds or 2/10 of a second). As shown in the percentage opening column 1452, the opening percentage was set to 20 percent. As shown in the first run column 1453, the uS value was 790 uS. In the second run column 1454, the uS value was 790 uS. In the third run column 1455, the uS value was 780. Further, in the average column 1456, the average uS value was 787 uS.

In one example, low flow runs (e.g., 3) on a 30 percent opening 1459 were performed (e.g., valve opened for 300/1000 milliseconds or 0.3 seconds or 3/10 of a second). As shown in the percentage opening column 1452, the opening percentage was set to 30 percent. As shown in the first run column 1453, the uS value was 770 uS. In the second run column 1454, the uS value was 780 uS. In the third run column 1455, the uS value was 800. Further, in the average column 1456, the average uS value was 783 uS.

In one example, low flow runs (e.g., 3) on a 40 percent opening 1460 were performed (e.g., valve opened for 400/1000 milliseconds or 0.4 seconds or 4/10 of a second). As shown in the percentage opening column 1452, the opening percentage was set to 40 percent. As shown in the first run column 1453, the uS value was 810 uS. In the second run column 1454, the uS value was 810 uS. In the third run column 1455, the uS value was 810. Further, in the average column 1456, the average uS value was 810 uS.

In one example, low flow runs (e.g., 3) on a 50 percent opening 1461 were performed (e.g., valve opened for 500/1000 milliseconds or 0.5 seconds or 5/10 of a second). As shown in the percentage opening column 1452, the opening percentage was set to 50 percent. As shown in the first run column 1453, the uS value was 790 uS. In the second run column 1454, the uS value was 810 uS. In the third run column 1455, the uS value was 830. Further, in the average column 1456, the average uS value was 810 uS.

In one example, low flow runs (e.g., 3) on a 60 percent opening 1462 were performed (e.g., valve opened for 600/1000 milliseconds or 0.6 seconds or 6/10 of a second). As shown in the percentage opening column 1452, the opening percentage was set to 60 percent. As shown in the first run column 1453, the uS value was 850 uS. In the second run column 1454, the uS value was 850 uS. In the third run column 1455, the uS value was 860. Further, in the average column 1456, the average uS value was 853 uS.

In one example, low flow runs (e.g., 3) on a 70 percent opening 1463 were performed (e.g., valve opened for 700/1000 milliseconds or 0.7 seconds or 7/10 of a second). As shown in the percentage opening column 1452, the opening percentage was set to 70 percent. As shown in the first run column 1453, the uS value was 890 uS. In the second run column 1454, the uS value was 890 uS. In the third run column 1455, the uS value was 850. Further, in the average column 1456, the average uS value was 877 uS.

In one example, low flow runs (e.g., 3) on a 80 percent opening 1464 were performed (e.g., valve opened for 800/1000 milliseconds or 0.8 seconds or 8/10 of a second). As shown in the percentage opening column 1452, the opening percentage was set to 80 percent. As shown in the first run column 1453, the uS value was 910 uS. In the second run column 1454, the uS value was 880 uS. In the third run column 1455, the uS value was 930. Further, in the average column 1456, the average uS value was 907 uS.

In one example, low flow runs (e.g., 3) on a 90 percent opening 1465 were performed (e.g., valve opened for 900/1000 milliseconds or 0.9 seconds or 9/10 of a second). As shown in the percentage opening column 1452, the opening percentage was set to 90 percent. As shown in the first run column 1453, the uS value was 930 uS. In the second run column 1454, the uS value was 930 uS. In the third run column 1455, the uS value was 920. Further, in the average column 1456, the average uS value was 927 uS.

In one example, low flow runs (e.g., 3) on a 100 percent opening 1466 were performed (e.g., valve opened for 1000/1000 milliseconds or 1.0 seconds or 10/10 of a second). As shown in the percentage opening column 1452, the opening percentage was set to 100 percent. As shown in the first run column 1453, the uS value was 920 uS. In the second run column 1454, the uS value was 970 uS. In the third run column 1455, the uS value was 920. Further, in the average column 1456, the average uS value was 937 uS.

In one example, high flow runs (e.g., 3) on a 10 percent opening 1473 were performed (e.g., valve opened for 100/1000 milliseconds or 0.1 seconds or 1/10 of a second). As shown in the percentage opening column 1468, the opening percentage was set to 10 percent. As shown in a first run column 1469, the uS value was 980 uS. In a second run column 1470, the uS value was 950 uS. In a third run column 1471, the uS value was 970. Further, in an average column 1472, the average uS value was 967 uS.

In one example, high flow runs (e.g., 3) on a 20 percent opening 1474 were performed (e.g., valve opened for 200/1000 milliseconds or 0.2 seconds or 2/10 of a second). As shown in the percentage opening column 1468, the opening percentage was set to 20 percent. As shown in the first run column 1469, the uS value was 1440 uS. In the second run column 1470, the uS value was 1370 uS. In the third run column 1471, the uS value was 1420. Further, in the average column 1472, the average uS value was 1410 uS.

In one example, high flow runs (e.g., 3) on a 30 percent opening 1475 were performed (e.g., valve opened for 300/1000 milliseconds or 0.3 seconds or 3/10 of a second). As shown in the percentage opening column 1468, the opening percentage was set to 30 percent. As shown in the first run column 1469, the uS value was 1930 uS. In the second run column 1470, the uS value was 1860 uS. In the third run column 1471, the uS value was 1890. Further, in the average column 1472, the average uS value was 1893 uS.

In one example, high flow runs (e.g., 3) on a 40 percent opening 1476 were performed (e.g., valve opened for 400/1000 milliseconds or 0.4 seconds or 4/10 of a second). As shown in the percentage opening column 1468, the opening percentage was set to 40 percent. As shown in the first run column 1469, the uS value was 2420 uS. In the second run column 1470, the uS value was 2340 uS. In the third run column 1471, the uS value was 2450. Further, in the average column 1472, the average uS value was 2403 uS.

In one example, high flow runs (e.g., 3) on a 50 percent opening 1477 were performed (e.g., valve opened for 500/1000 milliseconds or 0.5 seconds or 5/10 of a second). As shown in the percentage opening column 1468, the opening percentage was set to 50 percent. As shown in the first run column 1469, the uS value was 2910 uS. In the second run column 1470, the uS value was 3020 uS. In the third run column 1471, the uS value was 2960. Further, in the average column 1472, the average uS value was 2963 uS.

In one example, high flow runs (e.g., 3) on a 60 percent opening 1478 were performed (e.g., valve opened for 600/1000 milliseconds or 0.6 seconds or 6/10 of a second). As shown in the percentage opening column 1468, the opening percentage was set to 60 percent. As shown in the first run column 1469, the uS value was 3370 uS. In the second run column 1470, the uS value was 3450 uS. In the third run column 1471, the uS value was 3470. Further, in the average column 1472, the average uS value was 3430 uS.

In one example, high flow runs (e.g., 3) on a 70 percent opening 1479 were performed (e.g., valve opened for 700/1000 milliseconds or 0.7 seconds or 7/10 of a second). As shown in the percentage opening column 1468, the opening percentage was set to 70 percent. As shown in the first run column 1469, the uS value was 4000 uS. In the second run column 1470, the uS value was 3970 uS. In the third run column 1471, the uS value was 3980. Further, in the average column 1472, the average uS value was 3983 uS.

In one example, high flow runs (e.g., 3) on a 80 percent opening 1480 were performed (e.g., valve opened for 800/1000 milliseconds or 0.8 seconds or 8/10 of a second). As shown in the percentage opening column 1468, the opening percentage was set to 80 percent. As shown in the first run column 1469, the uS value was 4550 uS. In the second run column 1470, the uS value was 4520 uS. In the third run column 1471, the uS value was 4580. Further, in the average column 1472, the average uS value was 4550 uS.

In one example, high flow runs (e.g., 3) on a 90 percent opening 1481 were performed (e.g., valve opened for 900/1000 milliseconds or 0.9 seconds or 9/10 of a second). As shown in the percentage opening column 1468, the opening percentage was set to 90 percent. As shown in the first run column 1469, the uS value was 5050 uS. In the second run column 1470, the uS value was 5130 uS. In the third run column 1471, the uS value was 5090. Further, in the average column 1472, the average uS value was 5090 uS.

In one example, high flow runs (e.g., 3) on a 100 percent opening 1482 were performed (e.g., valve opened for 1000/1000 milliseconds or 1.0 seconds or 10/10 of a second). As shown in the percentage opening column 1468, the opening percentage was set to 100 percent. As shown in the first run column 1469, the uS value was 5490 uS. In the second run column 1470, the uS value was 5480 uS. In the third run column 1471, the uS value was 5450. Further, in the average column 1472, the average uS value was 5473 uS.

Figure 15:
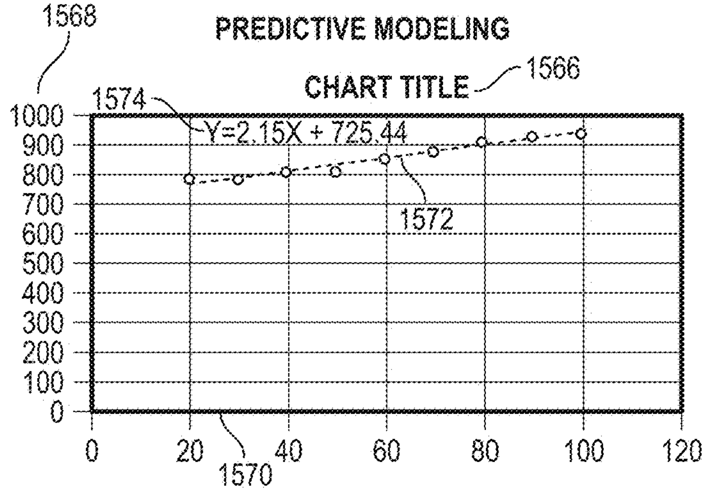
FIG. 15 are predictive modeling charts, according to various embodiments.
Figure 15:
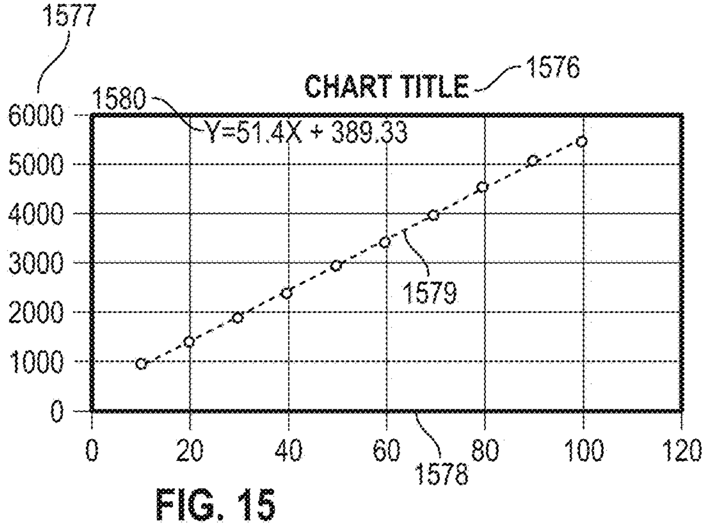

In FIG. 15, predictive modeling charts 1500 are shown, according to various embodiments. In one example, a CF Valve low flow chart 1506 utilizes an orifice size of 0.016". In this example, the CF Valve low flow chart 1506 includes a blend percentage column 1508, a percentage open column 1510, a lab test uS column 1512, and a field average uS column 1514. In a first example, a first blend value 1516 is 0.1; a percentage open is 10; a lab test uS is 640 uS; and a field average uS is 843. In a second example, a second blend value 1518 is 0.2; a percentage open is 20; a lab test uS is 670 uS; and a field average uS is 787. In a third example, a third blend value 1520 is 0.3; a percentage open is 30; a lab test uS is 700 uS; and a field average uS is 783. In a fourth example, a fourth blend value 1522 is 0.4; a percentage open is 40; a lab test uS is 730 uS; and a field average uS is 810. In a fifth example, a fifth blend value 1524 is 0.5; a percentage open is 50; a lab test uS is 760 uS; and a field average uS is 810. In a sixth example, a sixth blend value 1526 is 0.6; a percentage open is 60; a lab test uS is 800 uS; and a field average uS is 853. In a seventh example, a seventh blend value 1528 is 0.7; a percentage open is 70; a lab test uS is 830 uS; and a field average uS is 877. In an eighth example, an eighth blend value 1530 is 0.8; a percentage open is 80; a lab test uS is 860 uS; and a field average uS is 907. In a nineth example, a nineth blend value 1532 is 0.9; a percentage open is 90; a lab test uS is 910 uS; and a field average uS is 927. In a tenth example, a tenth blend value 1534 is 1.0; a percentage open is 100; a lab test uS is 970 uS; and a field average uS is 937.

In one example, a CF Valve high flow chart 1536 utilizes an orifice size of 0.045". In this example, the CF Valve high flow chart 1536 includes a blend percentage column 1538, a percentage open column 1540, a lab test uS column 1542, and a field average uS column 1544. In a first example, a first blend value 1545 is 1.0; a percentage open is 10; a lab test uS is 900 uS; and a field average uS is 967. In a second example, a second blend value 1548 is 2.0; a percentage open is 20; a lab test uS is 1320 uS; and a field average uS is 1410. In a third example, a third blend value 1550 is 3.0; a percentage open is 30; a lab test uS is 1820 uS; and a field average uS is 1893. In a fourth example, a fourth blend value 1552 is 4.0; a percentage open is 40; a lab test uS is 2240 uS; and a field average uS is 2403. In a fifth example, a fifth blend value 1554 is 5.0; a percentage open is 50; a lab test uS is 2750 uS; and a field average uS is 2963. In a sixth example, a sixth blend value 1556 is 6.0; a percentage open is 60; a lab test uS is 3150 uS; and a field average uS is 3430. In a seventh example, a seventh blend value 1558 is 7.0; a percentage open is 70; a lab test uS is 3660 uS; and a field average uS is 3983. In an eighth example, an eighth blend value 1560 is 8.0; a percentage open is 80; a lab test uS is 3960 uS; and a field average uS is 4550. In a nineth example, a nineth blend value 1562 is 9.0; a percentage open is 90; a lab test uS is 4520 uS; and a field average uS is 5090. In a tenth example, a tenth blend value 1564 is 10.0; a percentage open is 100; a lab test uS is 4840 uS; and a field average uS is 5473.

In another example, a predictive modeling chart 1502 shows a chart title 1566, a y-axis 1568, and x-axis 1570, a line 1572, and/or a formula 1574. In this example, the chart title 1566 may be a CF Valve low flow predictive modeling. In this example, the y-axis 1568 is in uS and the numbers run from 0 to 1000. Further, the x-axis 1570 is in percentage open and the numbers run from 0 to 120 percentage. However, the percentage open really only runs from 0 to 100 percentage open. In one example, the formula is $Y=2.15X+725.44$ which yields the line 1572 as shown. The line 1572 goes from a uS number of 787 to 937 as shown in the CF Valve low flow chart 1566.

In another example, a predictive modeling chart shows a chart title 1576, a y-axis 1577, and x-axis 1578, a line 1579, and/or a formula 1580. In this example, the chart title 1576 may be a CF Valve high flow predictive modeling. In this example, the y-axis 1577 is in uS and the numbers run from 0 to 6000. Further, the x-axis 1578 is in percentage open and the numbers run from 0 to 120 percentage. However, the percentage open really only runs from 0 to 100 percentage open. In one example, the formula is $Y=51.4X+389.33$ which yields the line 1579 as shown. The line 1579 goes from a uS number of 967 to 5473 as shown in the CF Valve high flow chart 1576.

In another example, targeted uS charts 1504 for both the CF Valve low flow and the CF Valve high flow are show. In this example, a top chart may include a targeted us column 1581 and a projected percentage open column 1582 for the CF Valve low flow. In a first example for the CF Valve which is shown as the top chart, a targeted uS is 640 and the projected percentage open is −40. Further, in a second example, the targeted uS is 670 and the projected percentage open is −26. In another example, the targeted uS is 700 and the projected percentage open is −12. Further, the targeted uS may be 730 and the projected percentage open is 2. In another example, the targeted uS is 760 and the projected percentage open is 16. In another example, the targeted uS is 800 and the projected percentage open is 35. In another example, the targeted uS is 830 and the projected percentage open is 49. In another example, the targeted uS is 860 and the projected percentage open is 63. In another example, the targeted uS is 910 and the projected percentage open is 86. In another example, the targeted uS is 970 and the projected percentage open is 114.

In this example, a bottom chart may include a targeted uS column and a projected percentage open column for the CF Valve high flow. In a first example for the high flow CF Valve which is shown as the bottom chart, a targeted uS is 900 and the projected percentage open is 10. Further, in a second example, the targeted uS is 1320 and the projected percentage open is 18. In another example, the targeted uS is 1820 and the projected percentage open is 28. In another example, the targeted uS is 2240 and the projected percentage open is 36. Further, the targeted uS may be 2750 and the projected percentage open is 46. In another example, the targeted uS is 3150 and the projected percentage open is 54. In another example, the targeted uS is 3660 and the projected percentage open is 64. In another example, the targeted uS is 3960 and the projected percentage open is 69. In another example, the targeted uS is 4520 and the projected percentage open is 80. In another example, the targeted uS is 4840 and the projected percentage open is 87.

Figure 16:
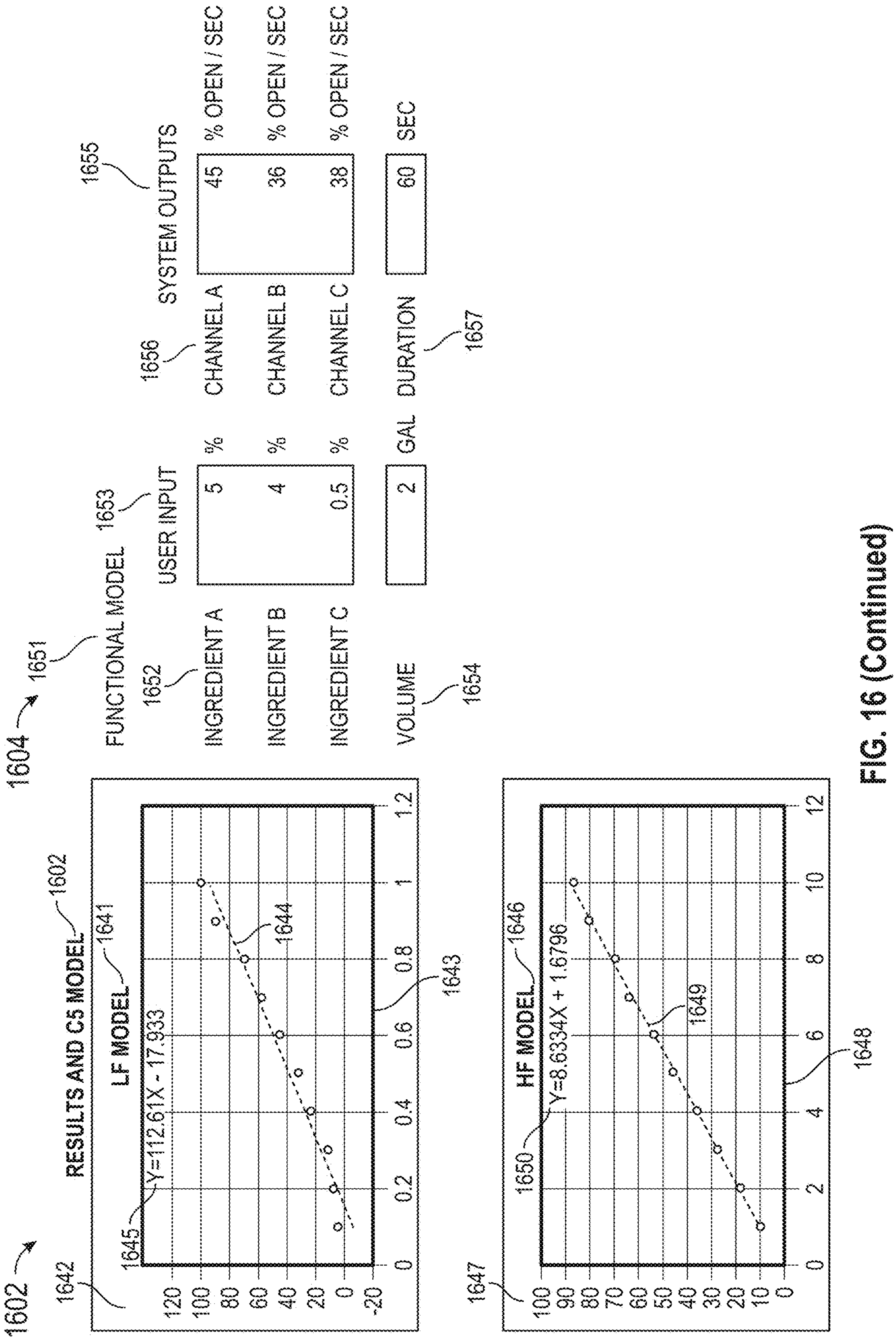
FIG. 16 is a chart showing various results, according to one embodiment.

In FIG. 16, charts 1600 showing various results are shown, according to one embodiment. In one example, a low flow chart 1605 may include a lab percentage opening settings 1606, a targeted uS 1607, a percentage opening 1608, a measure uS 1609, and/or a variance 1624. In a first example, a first lab percentage opening settings 1610 is 0.1; the targeted uS is 640, the percentage opening is 4, the measured uS is 660, and the variance is 3.1%. In a second example, a second lab percentage opening settings 1612 is 0.2; the targeted uS is 670, the percentage opening is 7, the measured uS is 680, and the variance is 1.5%. In a third example, a third lab percentage opening settings 1614 is 0.3; the targeted uS is 700, the percentage opening is 11, the measured uS is 680, and the variance is 2.9%. In a fourth example, a fourth lab percentage opening settings 1616 is 0.4; the targeted uS is 730, the percentage opening is 23, the measured uS is 690, and the variance is 5.5%. In a fifth example, a fifth lab percentage opening settings 1618 is 0.5; the targeted uS is 760, the percentage opening is 32, the measured uS is 710, and the variance is 6.6%. In a sixth example, a sixth lab percentage opening settings 1619 is 0.6; the targeted uS is 800, the percentage opening is 45, the measured uS is 760, and the variance is 5.0%. In a seventh example, a seventh lab percentage opening settings 1620 is 0.7; the targeted uS is 830, the percentage opening is 58, the measured uS is 790, and the variance is 4.8%. In an eighth example, an eighth lab percentage opening settings 1621 is 0.8; the targeted uS is 860, the percentage opening is 70, the measured uS is 820, and the variance is 4.7%. In a ninth example, a ninth lab percentage opening settings 1622 is 0.9; the targeted uS is 910, the percentage opening is 90, the measured uS is 910, and the variance is 0.0%. In a tenth example, a tenth lab percentage opening settings 1623 is 1.0; the targeted uS is 970, the percentage opening is 100, the measured uS is 910, and the variance is 6.2%.

In one example, a high flow chart 1625 may include a lab percentage opening settings 1626, a targeted uS 1627, a percentage opening 1628, a measure uS 1629, and/or a variance 1630. In a first example, a first lab percentage opening settings 1631 is 1.0; the targeted uS is 900, the percentage opening is 10, the measured uS is 1000, and the variance is 11.1%. In a second example, a second lab percentage opening settings 1632 is 2.0; the targeted uS is 1320, the percentage opening is 18, the measured uS is 1330, and the variance is 0.8%. In a third example, a third lab percentage opening settings 1633 is 3.0; the targeted uS is 1820, the percentage opening is 28, the measured uS is 1780, and the variance is 2.2%. In a fourth example, a fourth lab percentage opening settings 1634 is 4.0; the targeted uS is 2240, the percentage opening is 36, the measured uS is 2190, and the variance is 2.2%. In a fifth example, a fifth lab percentage opening settings 1635 is 5.0; the targeted uS is 2750, the percentage opening is 46, the measured uS is 2740, and the variance is 0.4%. In a sixth example, a sixth lab percentage opening settings 1636 is 6.0; the targeted uS is 3150, the percentage opening is 54, the measured uS is 3100, and the variance is 1.6%. In a seventh example, a seventh lab percentage opening settings 1637 is 7.0; the targeted uS is 3660, the percentage opening is 64, the measured uS is 3640, and the variance is 0.5%. In an eighth example, an eighth lab percentage opening settings 1638 is 8.0; the targeted uS is 3960, the percentage opening is 69, the measured uS is 3960, and the variance is 0.0%. In a ninth example, a ninth lab percentage opening settings 1639 is 9.0; the targeted uS is 4520, the percentage opening is 80, the measured uS is 4380, and the variance is 3.1%. In a tenth example, a tenth lab percentage opening settings 1640 is 10.0; the targeted uS is 4840, the percentage opening is 87, the measured uS is 4780, and the variance is 1.2%.

In one example, a results and modeling chart 1602 shows a chart title 1641, a y-axis 1642, and x-axis 1643, a line 1644, and/or a formula 1645. In this example, the chart title 1641 may be CF Valve low flow model. In this example, the y-axis 1642 is in valve percentage opening values and the numbers run from −20 to 120. Further, the x-axis 1643 is in ingredient concentration percent and/or percentage and the numbers run from 0 to 1.2 percentage. However, the percentage openings for both only runs from 0 to 100 percentage open. In one example, the formula is $Y=112.61X-17.933$ which yields the line 1644 as shown. The line 1644 starts by interpolating the numbers of 4 to 100 as shown in the CF Valve low flow chart 1641.

In one example, a results and modeling chart (lower chart) shows a chart title 1646, a y-axis 1647, and x-axis 1648, a line 1649, and/or a formula 1650. In this example, the chart title 1646 may be CF Valve high flow model. In this example, the y-axis 1647 is in valve percentage opening values and the numbers run from 0 to 100. Further, the x-axis 1648 is in ingredient concentration percent and/or percentage and the numbers run from 0 to 12 percentage. However, the percentage openings for both only runs from 0 to 100 percentage open. In one example, the formula 1650 is $Y=8.6334X+1.6796$ which yields the line 1649 as shown. The line 1649 starts by interpolating the numbers of 10 to 87 as shown in the CF Valve high flow chart 1646.

In another example, an input area 1604 is shown. In this example, a functional model may include a user input area 1653 and a system outputs area 1655. In one example, the user input area 1653 includes one or more ingredients 1652 were various inputs may be entered (e.g., 5% for ingredient A, 4, % for ingredient B, 0.5% for ingredient C, etc.) and a volume area 1654 were various volumes (e.g., 0.1 GPM, 0.2 GPM, 0.3 GPM, 0.4 GPM, 0.5 GPM, . . . , 2 GPM, 2.1 GPM, . . . , 10 GPM, 10.1 GPM, . . . , 20 GPM (GPM=gallons per minute)) may be entered. In another example, the system outputs area 1655 may include one or more channels (e.g. Channel A, Channel B, Channel C, . . . . Channel Nth) 1656 and a duration area 1657. In one example, the Channel A outputs may include 45% open per second (note any percent opening setting(s) disclosed in this document may be utilized). In one example, the Channel B outputs may include 36% open per second (note any percent opening setting(s) disclosed in this document may be utilized). In one example, the Channel C outputs may include 38% open per second (note any percent opening setting(s) disclosed in this document may be utilized). Further, the duration area 1657 may have 60 seconds as its entered data. In various examples, the duration time may be any time period disclosed in this document. Further, the duration time may be 1 second, 2 seconds, . . . , 60 seconds, 61 seconds, . . . , 3599 seconds, 3600 seconds, . . . , 36000 seconds, 36001 seconds, 86400 seconds, 86401 seconds, . . . , 604,800 seconds, 604,801 seconds, . . . , etc.

In one example, the total flow rate is 2 gallons per minute (GPM). In various examples, the total flow rate may be any flow rate disclosed in this document. In this example, there are three important design aspects to achieve this fixed output: 1) The 2X-3 pressure setting; 2) The main manifold design; and 3) The outlet orifice sizing. In this example, the CF Valve only regulates the pressure exactly at the outlet of the valve. Naturally it cannot directly control outcomes further down the line. So to produce a constant output flow rate the manifold must be designed to take as little pressure loss as possible and the outlet orifice must be sized so that the CF Valve can successfully regulate. In one example, if this is achieved, then ingredients can be injected into the manifold at up to 30% of total flow output without impacting the total output flow rate. Also, based on the manifold pressure remaining steady those ingredients can be injected at predictable rates. Therefore, in one example, the system can produce fluid blends with predictable concentrations of ingredient. In this example, when the manifold design minimizes pressure losses, then the total output flow rate is fixed by the outlet orifice size. In one example, the orifice size is approximately 0.150" to achieve 2 GPM.

In another example, based on the fixed manifold pressure and total system flow rate described above, each ingredient is injected based on the CF VALVE (AND/OR CFIVE) orifice size and how long the system opens the CF VALVE (AND/OR CFIVE) each second. In another example, orifice size and % open setting result in a predictable ingredient flow rate. In various examples, the orifice sizes are limited to approximately 0.015" at the small end and 0.090" at the large end. Any smaller and they can plug. Any larger and the CF VALVE (AND/OR CFIVE) cannot regulate. In one example, the controller and solenoids can open the CF VALVE (AND/OR CFIVE) for any % of 1 second between 10% and 100%. Meaning the system may open a valve for 0.1 seconds every second up to 1 second of every second. Further, the system may achieve any fraction in between (0.4, 0.76, 0.23, etc.). In another example, once an orifice size is selected, it is installed in the system and does not change. In this example, the dosage range through that orifice is only varied by the % open time of the CF VALVE (AND/OR CFIVE) valve which means that at most an ingredient can be pulsed from 10% open to 100% open (a 1:10 ratio). For example, if the high flow CF VALVE (AND/OR CFIVE) orifice is sized to deliver 0.2 GPM when fully open, then it can achieve any flow rate between 0.02 and 0.2 GPM. If the system was dosing that ingredient at 0.1 GPM then it would open that CF VALVE (AND/OR CFIVE) for half (0.5 sec) of each second. In another example, the orifice sizes may be adjustable and/or changed.

In another example, each ingredient will need slightly different % open time to achieve a desired dose rate through an orifice based on viscosity. Fortunately, these necessary adjustments to the % open are linear and can be calculated with a Y=MX+B formula. In one example, the % open time for a CF VALVE (AND/OR CFIVE)/orifice for a given ingredient can be modeled using a Y=MX+B formula where Y is the % open and X is the desired dose. For example, for a product with the high flow CF VALVE (AND/OR CFIVE) formula of Y=8.6X+1.7, and the system and/or device wants to know how long to open the CF VALVE (AND/OR CFIVE) to get a 7% dose the math is: % Open=8.6*7+1.7, resulting in 61.9%. If a user enters in 7% the controller will open the CF VALVE (AND/OR CFIVE) for 619 mS of each second (0.619 seconds/second).

In another example, ingredient modeling can be accomplished. For example, to find out how long a CF VALVE (AND/OR CFIVE) needs to open to achieve a specific flow rate, a lab test protocol is utilized to determine the Y=MX+B formula for a given ingredient and orifice size. In one example, the protocol has 4 steps. The first step is to create samples on the lab scale by hand for dose rates of 0.1% through 10%. The first step continues by building lab samples from 0.1% to 1% in increments of 0.1%. The first step continues by building lab samples from 1% to 10% in increments of 1%. The first step continues by measuring the electrical conductivity of each of those samples in uS. The first step ends by determining EC values that are our target values for the dose rates described above. In this example, the protocol continues with step 2. In step 2, the ingredient is run through the device and measurements of the output EC values at ten % open settings for the high flow and ten % open settings for the low flow are recorded. The second step continues by measuring for high and low flow samples at 10% open to 100% open in increments of 10%. The second step continues by collecting three samples for each % open and average the results. The second step ends by naming these values field values at nominal % open settings. The protocol continues with step 3. In step 3, a chart of the field values against the nominal % open settings is generated. This chart is utilized to generated a trendline to predict the % open settings needed to achieve the target values. Step 3 continues by utilized this trendline to create a formula (e.g., Y=MX+B) except the Y is the EC value and the X is the % open setting. Further, when we enter the target EC values into the formula it gives us the predicted % open settings to achieve the target values. The protocol continues with step 4. In step 4, tests are run to determine the actual % open settings for the system. First, a run is generated with each predicted % open setting and a confirmation functionality is performed to determine if the output EC is within 5% of the target value. It should be noted that the target values correlate to specific dosage rates between 0.1% and 10%. Once the predicted values are confirmed, or modified to achieve the target values, we can finally use these acutal % open settings to make a trendline and formula for that ingredient. In this example, the resulting Y=MX+B formula where Y=% open and X=desired dose % can be used to calculate the necessary % open to achieve a desired dose rate.

In another example, the programming of the controller identifies whether or not to use the high or low CF VALVE (AND/OR CFIVE) based on whether or not the user's requested dose rate is more or less than 1%. If the customer enters 0.6% the controller will use the low flow CF VALVE (AND/OR CFIVE) and its associated formula. If the customer user enters 5.5% then the controller will use the high flow CF VALVE (AND/OR CFIVE) and its associated formula. In another example, the controller may utilize both the low flow CF VALVE (AND/OR CFIVE) and the high flow CF VALVE (AND/OR CFIVE) to achieve the desired dosages and/or ratios.

In another example, ingredient profiles may be utilized as shown below:

| Ingredient | Viscosity in cP@ 70F | High Flow Orifice | Low Flow Orifice | Hi Formula | Low Formula | Hi Dose Range | Lo Dose Range |
|---|---|---|---|---|---|---|---|
| A Outdoor | 0.95 | 0.043 | 0.015 | Y = 8.6X + 1.7 | Y = 113X + 18 | 1-10% | 0.1-1% |
| B Herbicide | 18 | 0.090 | 0.030 | Y = 13X + 2 | Y = 140X + 50 | 1-7% | 0.4-1% |
| C Green | 2 | 0.043 | 0.015 | Y = 11.5X + 4 | Y = 120X + 12 | 1-8% | 0.2-1% |

In another example, a modeling method may include: once a modest database of ingredients and flow models is developed (~ten products) by the methods described above, the system may use an open air flow test with a CF VALVE (AND/OR CFIVE) and a single orifice size to profile the new ingredient based on the previously modeled ingredients. For example, new ingredients will only need to be run on this open air test to accurately project a flow model for the system. This method will cut down on the time needed to model each material and the amount of material needed to do the modeling. In another example, knowing viscosity values alone is enough to model fluids for certain orifice sizes. For example, a viscosity database may have a third viscosity measured at 5 and a fourth viscosity measured at 6. Therefore, in one example, based on the formula being linear, if a fifth viscosity measured at 5.5, it would be determined that the characteristics are in the middle of the third viscosity measurement and the fourth viscosity measurement.

In another example, the system may be developed to inject ingredients at 0.1% to 10% of the total system flow. Since the total system flow is fixed at 2 GPM, this means that each ingredient orifice and % model is designed to deliver ingredients at 0.002 to 0.2 GPM (0.1% to 10% of 2 GPM). In one example, each CF VALVE (AND/OR CFIVE) is capable of dosing up to 0.5 GPM. In another example, each ingredient pump is also sized to deliver up to 0.5 GPM at the required pressure. For example, if a user wanted to dilute one ingredient at 1:5 an orifice could be sized to dose that ingredient at 0.4 GPM on the high flow CF VALVE (AND/OR CFIVE). In another example, the system configuration could connect ingredient to lines A and B, adding 10% through each to achieve the total 20% dose rate.

Figure 17:
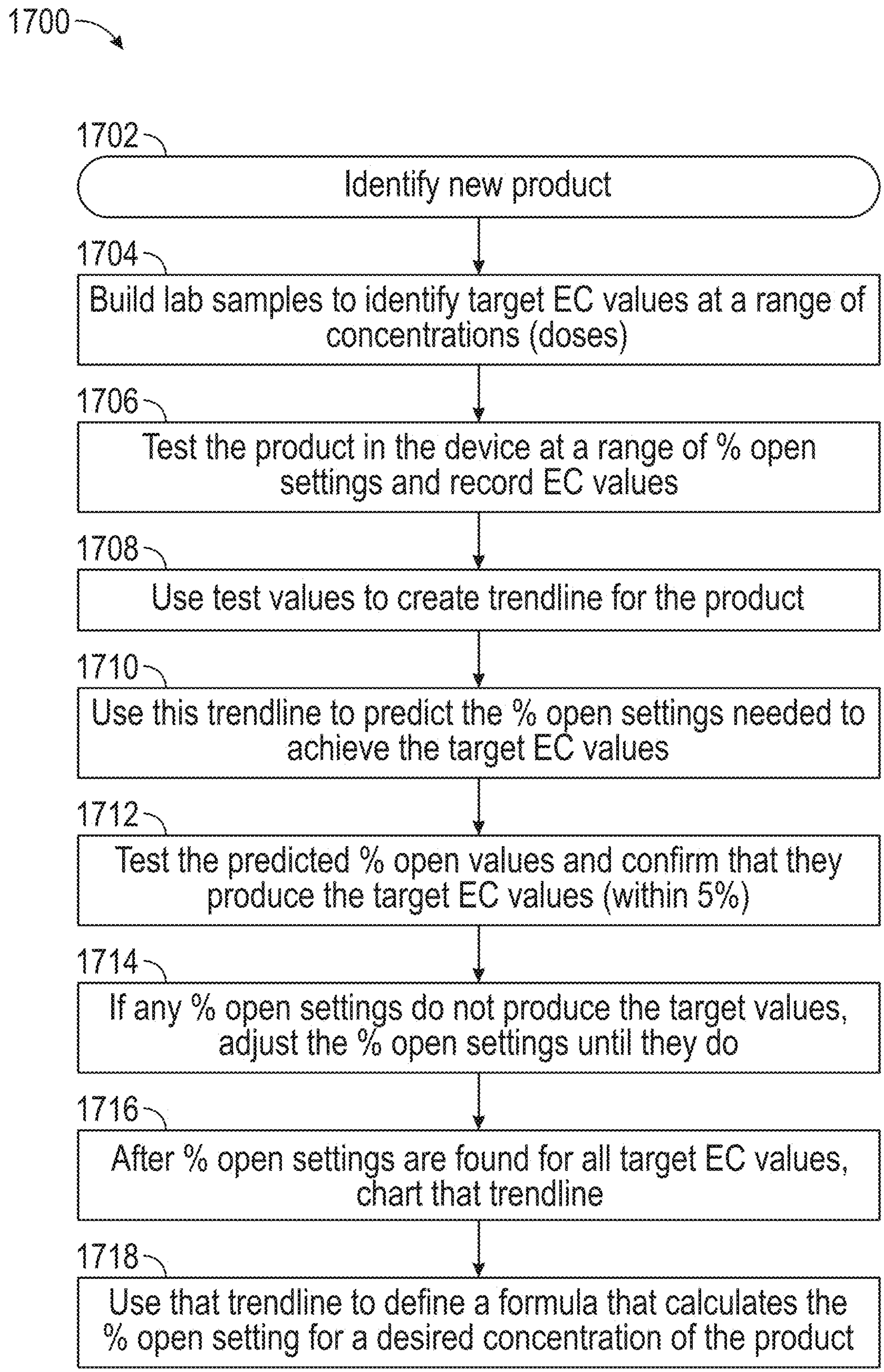
FIG. 17 is a flow chart, according to one embodiment.

In FIG. 17, a flow chart is shown, according to one embodiment. In one example, a method 1700 may include identifying a new product (step 1702). The method 1700 may include building lab samples to identify target EC values at a range of concentrations (e.g., doses) (step 1704). The method 1700 may include testing the product in the device at a range of percentage open settings and recording EC values (step 1706). The method 1700 may include using test values to create trendline(s) for the product (step 1708). The method 1700 may include using these trendline(s) to predict the percentage open settings needed to achieve the target EC values (step 1710). The method 1700 may include testing the predicted percentage open values and confirming that they produce the target EC values (within a tolerate level—+/−5 percent) (step 1712). The method 1700 may include that if any percentage open setting does not produce the target values adjusting the percentage opening settings until the values are within the tolerance level (step 1714). The method 1700 may include after the percentage opening settings are found for all EC values, creating and/or charting a trendline (step 1716). The method 1700 may include using that trendline to define a formula that calculates the percentage opening settings for a desired concentration of the product (step 1718).

Figure 18:
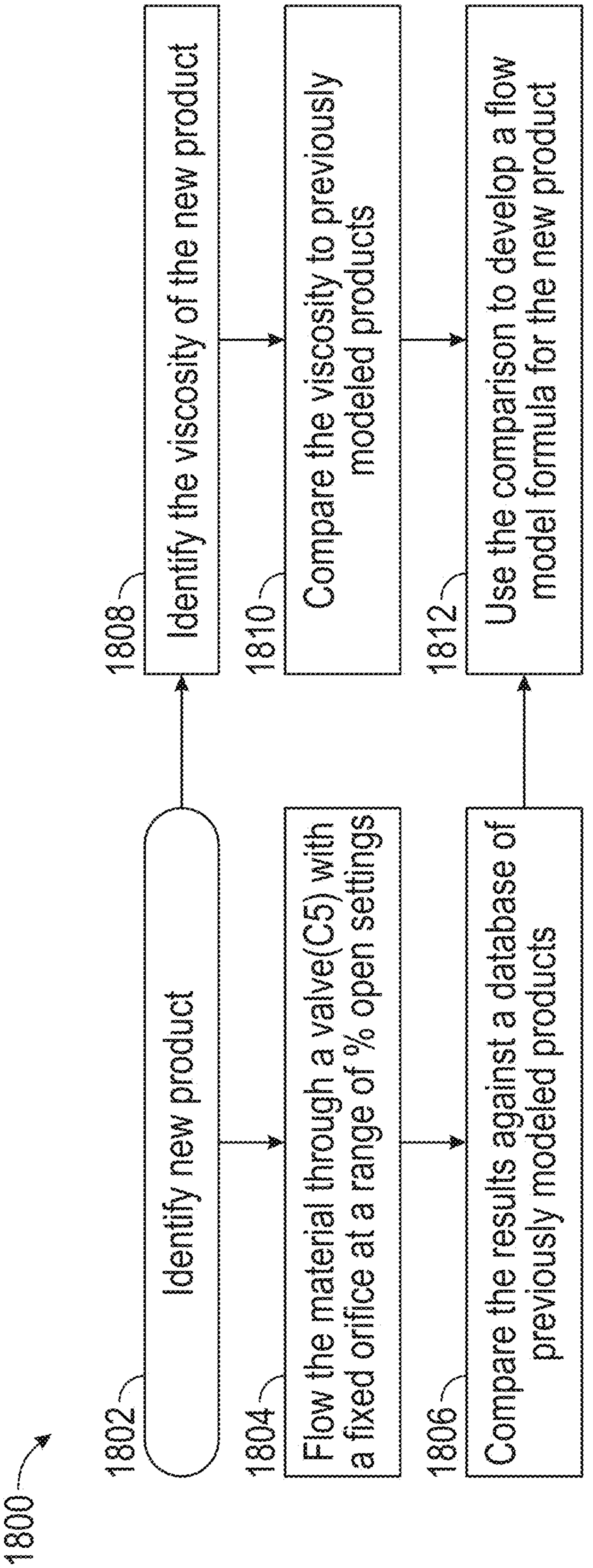
FIG. 18 is a flow chart, according to one embodiment.

In FIG. 18, a flow chart is shown, according to one embodiment. A method 1800 may include identifying a new product 1802. The method 1800 may include flowing the material through a valve with a fixed orifice at a range of percentage opening settings (e.g., 0.1, 0.2, . . . , 1, 2, . . . , and/or 10) (step 1804). The method 1800 may include comparing the results achieved in step 1804 against a database of previously modeled products (step 1806). The method 1800 may include using the comparison to develop a flow model formula for the new product (step 1812).

In various embodiments, it should be noted that the 0.1% dose setting for the CF Valve low flow and the 1.0% dose setting for the CF Valve high flow may result in both of the valve being opened for 100/1000 milliseconds or 0.1 seconds or 1/10 of a second. Further, the 0.2% dose setting for the CF Valve low flow and the 2.0% dose setting for the CF Valve high flow may result in both of valves being opened for 200/1000 milliseconds or 0.2 seconds or 2/10 of a second. In addition, the 0.3% dose setting for the CF Valve low flow and the 3.0% dose setting on the CF Valve high flow may result in both of valves being opened for 300/1000 milliseconds or 0.3 seconds or 3/10 of a second. In another example, the 0.4% dose setting for the CF Valve low flow and the 4.0% dose setting on the CF Valve high flow may result in both of valves being opened for 400/1000 milliseconds or 0.4 seconds or 4/10 of a second. Further, the 0.5% dose setting for the CF Valve low flow and the 5.0% dose setting on the CF Valve high flow may result in both of valves being opened for 500/1000 milliseconds or 0.5 seconds or 5/10 of a second. In another example, the 0.6% dose setting for the CF Valve low flow and the 6.0% dose setting on the CF Valve high flow may result in both of valves being opened for 600/1000 milliseconds or 0.6 seconds or 6/10 of a second. Further, the 0.7% dose setting for the CF Valve low flow and the 7.0% dose setting on the CF Valve high flow may result in both of valves being opened for 700/1000 milliseconds or 0.7 seconds or 7/10 of a second. In addition, the 0.8% dose setting for the CF Valve low flow and the 8.0% dose setting on the CF Valve high flow may result in both of valves being opened for 800/1000 milliseconds or 0.8 seconds or 8/10 of a second. Further, the 0.9% dose setting for the CF Valve low flow and the 9.0% dose setting on the CF Valve high flow may result in both of valves being opened for 900/1000 milliseconds or 0.9 seconds or 9/10 of a second. In another example, the 1.0% dose setting for the CF Valve low flow and the 10.0% dose setting on the CF Valve high flow may result in both of valves being opened for 1000/1000 milliseconds or 1.0 second or 10/10 of a second. The differences in actual flow rates are based on the orifice sizes utilized with each of the CF Valve low flow and the CF Valve high flow.

Alternatively, the method 1800 may identify a new product (step 1802). The method 1800 may identify the viscosity of the new product (step 1804). The method 1800 may compare the viscosity to previously modeled products with known viscosities (step 1810). The method 1800 may use the viscosity comparison to develop a flow model formula for the new product based on the viscosity comparison (step 1812).

Figure 19:
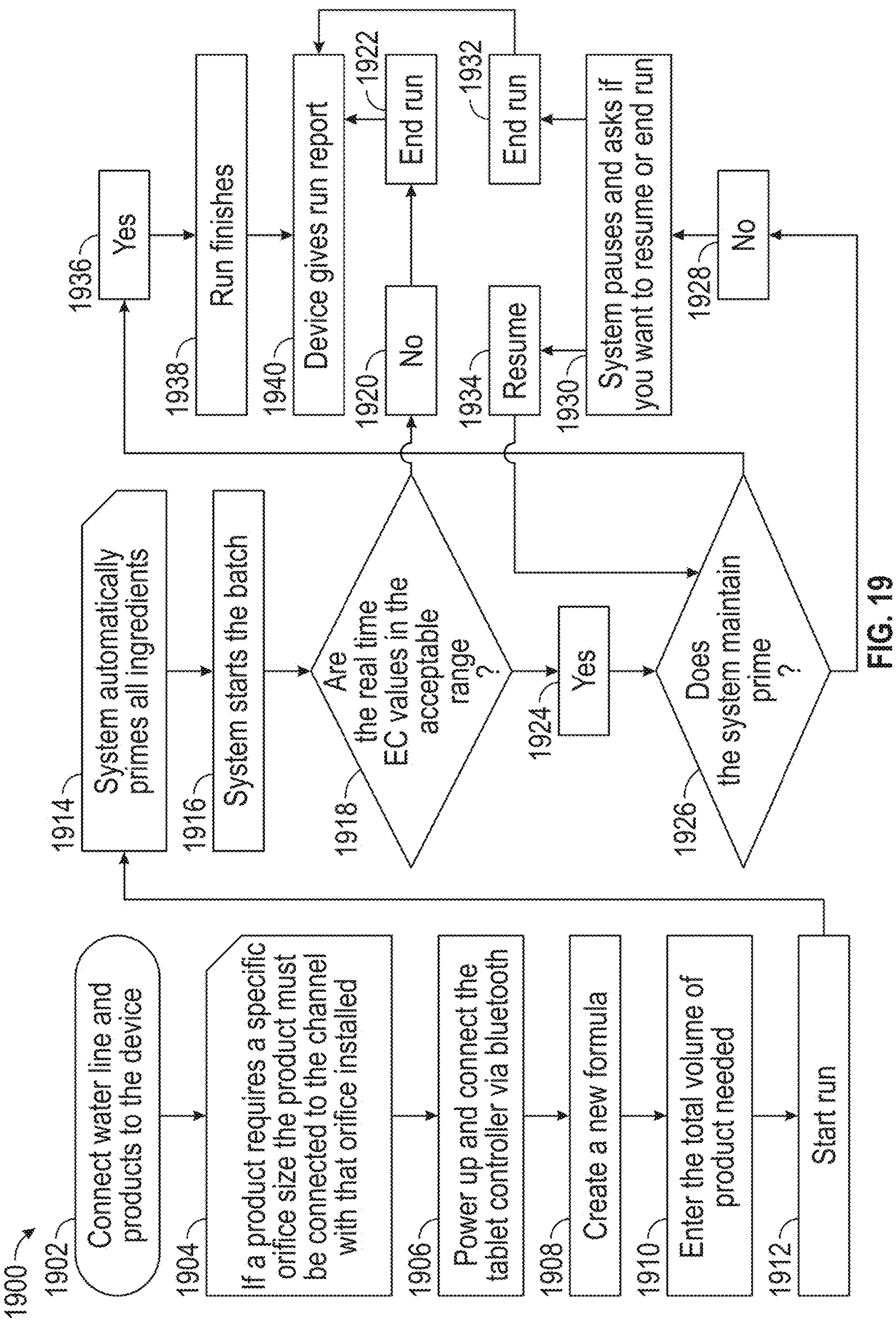
FIG. 19 is a flow chart, according to one embodiment.

In FIG. 19, a flow chart is shown, according to one embodiment. A method 1900 may include connecting the water line and products (e.g., ingredients) to the device (step 1902). The method 1900 may include determining if the product requires a specific orifice size, then the product must be connected to the channel with that orifice installed. Therefore, connecting the product to the correct channel based on the orifice size needed (step 1904). The method 1900 may include powering up and connect the tablet controller via Bluetooth and/or the Internet and/or hardwired landline (step 1906). The method 1900 may include create a new formula (step 1908). The method 1900 may include entering the total volume of product needed (step 1910). The method 1900 may include starting a run (step 1912). The method 1900 may include the system automatically priming all the ingredients (step 1914). The method 1900 may include starting the batching process (step 1916). The method 1900 may include determining whether the real time EC values are in the acceptable range (step 1918). Based on a negative response (step 1920) at step 1918, the method 1900 may include ending the run (step 1922) and generating a run report (step 1940). Based on a positive response (step 1924), the method 1900 may include determining whether the system has maintained prime status (step 1926). Based on a negative response (step 1928), the method 1900 may include the system pausing and asking the user do you want to resume or end the run (step 1930). If the user wants to end the run (step 1932), then the method 1900 may generate a run report (step 1940). If the user wants to resume (step 1934), then the method 1900 returns to step 1926. Based on a positive response to the system maintaining a prime condition (step 1936), the method 1900 may finish the run (step 1938) and generate a run report (step 1940).

In one embodiment, a mixing device may include: an ingredient source coupled to a check valve and an ingredient pump, the ingredient pump coupled to an ingredient pump outlet line; a water supply connected to a water CF Valve, the water CF Valve coupled to a water outlet line; the ingredient pump outlet line coupled to a high flow CF Valve and a low flow CF Valve; and a controller configured to operate at least one of the high flow CF Valve and the low flow CF Valve based on formula data to produce an ingredient outlet flow from at least one of the high flow CF Valve and the low flow CF Valve where the ingredient outlet flow and a water outlet flow from the water outlet line mix to produce a product mixture based on the formula data.

In another example, the mixing device may include a pressure sensor which may monitor the product mixture. In another example, the mixing device may include a temperature sensor to monitor the product mixture. In another example, the mixing device may include a conductivity sensor to monitor the product mixture. In another example, the mixing device may include a priming solenoid coupled to the ingredient pump and a priming solenoid outlet line coupled to the priming solenoid. In another example, the mixing device may include a water check valve and a flush solenoid valve, where the flush solenoid valve is coupled between the ingredient check valve and the ingredient pump. In another example, the mixing device may include a high flow orifice connected to the high flow CF Valve. In another example, the mixing device may include a low flow orifice connected to the low flow CF Valve. In another example, the mixing device may include a high flow orifice connected to the high flow CF Valve and a low flow orifice connected to the low flow CF Valve. In another example, the low flow orifice is smaller than the high flow orifice.

In another embodiment, the mixing device may include: a first ingredient source coupled to a first ingredient check valve and a first ingredient pump, the first ingredient pump coupled to a first ingredient pump outlet line; a water supply connected to a water CF Valve, the water CF Valve coupled to a water outlet line; the first ingredient pump outlet line coupled to a first ingredient high flow CF Valve and a first ingredient low flow CF Valve; a second ingredient source coupled to a second ingredient check valve and a second ingredient pump, the second ingredient pump coupled to a second ingredient pump outlet line; the second ingredient pump outlet line coupled to a second ingredient high flow CF Valve and a second ingredient low flow CF Valve; a third ingredient source coupled to a third ingredient check valve and a third ingredient pump, the third ingredient pump coupled to a third ingredient pump outlet line; the third ingredient pump outlet line coupled to a third ingredient high flow CF Valve and a third ingredient low flow CF Valve; and a controller configured to operate at least one of: the first ingredient high flow CF Valve; the first ingredient low flow CF Valve; the second ingredient high flow CF Valve; the second ingredient low flow CF Valve; the third ingredient high flow CF Valve; and the third ingredient low flow CF Valve based on formula data to produce an ingredient outlet flow from at least one of the first ingredient high flow CF Valve; the first ingredient low flow CF Valve; the second ingredient high flow CF Valve; the second ingredient low flow CF Valve; the third ingredient high flow CF Valve; and the third ingredient low flow CF Valve to produce an ingredient outlet flow where the ingredient outlet flow and a water outlet flow from the water outlet line mix to produce a product mixture based on the formula data.

In another example, the mixing device may include a conductivity sensor to monitor the product mixture. In another example, the mixing device may include a temperature sensor to monitor the product mixture. In another example, the mixing device may include a first ingredient high flow orifice connected to the first ingredient high flow CF Valve; a second ingredient high flow orifice connected to the second ingredient high flow CF Valve; and a third ingredient high flow orifice connected to the third ingredient high flow CF Valve. In another example, the mixing device may include a first ingredient low flow orifice connected to the first ingredient low flow CF Valve; a second ingredient low flow orifice connected to the second ingredient low flow CF Valve; and a third ingredient low flow orifice connected to the third ingredient low flow CF Valve. In another example, the mixing device may include a first ingredient high flow orifice connected to the first ingredient high flow CF Valve; a first ingredient low flow orifice connected to the first ingredient low flow CF Valve; a second ingredient high flow orifice connected to the second ingredient high flow CF Valve; a second ingredient low flow orifice connected to the second ingredient low flow CF Valve; a third ingredient high flow orifice connected to the third ingredient high flow CF Valve; and a third ingredient low flow orifice connected to the third ingredient low flow CF Valve. In another example the first ingredient low flow orifice is smaller than the first ingredient high flow orifice; the second ingredient low flow orifice is smaller than the second ingredient high flow orifice; and the third ingredient low flow orifice is smaller than the third ingredient high flow orifice.

In another embodiment, a mixing device may include: a first ingredient source coupled to a first ingredient check valve and a first ingredient pump, the first ingredient pump coupled to a first ingredient pump outlet line; a water supply connected to a water CF Valve, the water CF Valve coupled to a water outlet line; the first ingredient pump outlet line coupled to a first ingredient high flow CF Valve and a first ingredient low flow CF Valve; a second ingredient source coupled to a second ingredient check valve and a second ingredient pump, the second ingredient pump coupled to a second ingredient pump outlet line; the second ingredient pump outlet line coupled to a second ingredient high flow CF Valve and a second ingredient low flow CF Valve; a third ingredient source coupled to a third ingredient check valve and a third ingredient pump, the third ingredient pump coupled to a third ingredient pump outlet line; the third ingredient pump outlet line coupled to a third ingredient high flow CF Valve and a third ingredient low flow CF Valve; a controller configured to operate at least one of: the first ingredient high flow CF Valve; the first ingredient low flow CF Valve; the second ingredient high flow CF Valve; the second ingredient low flow CF Valve; the third ingredient high flow CF Valve; and the third ingredient low flow CF Valve based on formula data to produce an ingredient outlet flow from at least one of the first ingredient high flow CF Valve; the first ingredient low flow CF Valve; the second ingredient high flow CF Valve; the second ingredient low flow CF Valve; the third ingredient high flow CF Valve; and the third ingredient low flow CF Valve to produce an ingredient outlet flow where the ingredient outlet flow and a water outlet flow from the water outlet line mix to produce a product mixture based on the formula data; and a first ingredient motor sensor configured to measure an electrical current status of the first ingredient motor.

In another example, the controller determines a first ingredient inventory status based on an electrical current status signal received from the first ingredient motor sensor. In another example, the controller initiates an inventory warning notice for a first ingredient, an inventory alarm notification for the first ingredient, and/or generates an order request for the first ingredient based on the first ingredient inventory status. In one example, there is a current sensor in the controller that monitors the current to each motor.

In various embodiments, the pressurized container and/or pressurized vessel may be pressurized via any liquid, gas, and/or any combination thereof (e.g., CO2, water, air, nitrogen, etc.). In various embodiments, the container and/or vessel may be non-pressurized.

In various examples, one or more CF Valves with or without solenoids may be utilized. Further, one or more cannisters may be utilized. In addition, one or more mixing manifolds may be utilized. In another example, one or more post-mixing areas may be utilized. In another example, static mixers and/or compensators may be utilized to assist with flow rates and mixing. In another example, orifices at outlets of the CF Valves may set the flow rate and/or pressure. In another example, air compressors may be utilized instead of CO2 or water to pressurize the cannister.

This disclosure relates generally to fluid valves, and is concerned in particular with a regulating valve that is normally closed, that is opened by a variable fluid pressure above a selected threshold level, and that when open, serves to deliver the fluid at a constant pressure and flow rate.

In one example, a regulating valve for receiving fluid at a variable pressure from a fluid source and for delivering the fluid at a substantially constant pressure and flow rate to a fluid applicator or the like, the valve including: a cup-shaped base having a cylindrical wall segment terminating in an upper rim, and an externally projecting first flange; a cap having an inwardly projecting ledge and an externally projecting second flange, the cup-shaped base and the cap being configured and dimensioned for assembly as a unitary housing, with the cylindrical wall segment of the cup-shaped base inserted into the cap, and with the extent of such insertion being limited by the abutment of the first flange with the second flange to thereby provide a space between the upper rim of the cup-shaped base and the inwardly projecting ledge of the cap; a barrier wall subdividing the interior of the housing into a head section and a base section; a modulating assembly subdividing the base section into a fluid chamber and a spring chamber; an inlet in the cap for connecting the head section to the fluid source; a port in the barrier wall connecting the head section to the fluid chamber, the port being aligned with a central first axis of the valve; an outlet in the cap communicating with the fluid chamber, the outlet being aligned on a second axis transverse to the first axis; a stem projecting from the modulating assembly along the first axis through the port into the head section; a flexible diaphragm supporting the modulating assembly within the housing for movement in opposite directions along the first axis, the diaphragm having an outer periphery captured in the space between the inwardly projecting ledge of the cap and a rim of the cylindrical wall segment of the cup-shaped base; a spring in the spring chamber, the spring being arranged to resiliently urge the modulating assembly into a closed position at which the diaphragm is in sealing contact with the barrier wall to thereby prevent fluid flow from the head section via the port and fluid chamber to the outlet, the spring acting in concert with the modulating assembly and the stem projecting therefrom to modulate the size of the port as an inverse function of the variable fluid pressure in the input sections whereby the pressure and flow rate of the fluid delivered to the outlet is maintained substantially constant, the valve being automatically actuated when the pressure of the fluid acting on the modulating assembly exceeds a threshold level, and being automatically closed when the pressure drops below the threshold level.

Further, the CF Valve may maintain a relative constant flow of fluid from a variable pressure fluid supply to a fluid outlet, the CF Valve including: a) a valve housing having an inlet port and an outlet port adapted to be connected to the variable pressure fluid supply and the fluid outlet; b) a diaphragm chamber interposed between the inlet port and the outlet port; c) a cup contained within the diaphragm chamber; d) a diaphragm closing the cup; e) a piston assembly secured to a center of the diaphragm, the piston assembly having a cap and a base; f) a stem projecting from the cap through a first passageway in a barrier wall to terminate in a valve head; and g) a spring in the cup coacting with the base of the piston assembly for urging the diaphragm into a closed position, and the spring being responsive to fluid pressure above a predetermined level to adjust a size of a control orifice.

In another example, the CF Valve may maintain a relative constant flow of fluid from a variable pressure fluid supply to a fluid outlet, the CF Valve including: a base having a wall segment terminating in an upper rim, and a projecting first flange; a cap having a projecting ledge and a projecting second flange, the wall segment of the base being located inside the cap with a space between the upper rim of the base and the projecting ledge of the cap; a barrier wall subdividing an interior of a housing into a head section and a base section; a modulating assembly subdividing the base section into a fluid chamber and a spring chamber; an inlet in the cap for connecting the head section to a fluid source; a port in the barrier wall connecting the head section to the fluid chamber, the port being aligned with a central first axis of the CF Valve; an outlet in the cap communicating with the fluid chamber, the outlet being aligned on a second axis transverse to the first axis; a stem projecting from the modulating assembly along the first axis through the port into the head section; a diaphragm supporting the modulating assembly within the housing for movement in opposite directions along the first axis, a spring in the spring chamber, the spring being arranged to urge the modulating assembly into a closed position at which the diaphragm is in sealing contact with the barrier wall, and the spring being responsive to fluid pressure above a predetermined level to adjust a size of a control orifice.

A constant flow regulating valve includes a closure mechanism configured and arranged to override the modulating mode of the valve and to close the valve at fluid inlet pressures both below and above the valve's threshold level. The closure mechanism may be selectively deactivated to thereby allow the valve to assume its normal pressure responsive regulating functions. Embodiments of the regulating valve incorporate pressure relief devices and vent seals, with configurations suitable for incorporation into the trigger assemblies of portable sprayers.

This disclosure relates generally to fluid valves, and is concerned in particular with a regulating valve that operates in response to a variable fluid inlet pressure above a selected threshold level to deliver the fluid at a constant outlet pressure and flow rate. A closure mechanism is selectively operable either to accommodate the valve's normal pressure responsive regulating functions, or to override such functions by maintaining the valve in a closed state at inlet pressures both above and below the threshold level.

In one example, valves are normally closed in response to fluid inlet pressures below a threshold level, and operate in a modulating mode in response to variable fluid inlet pressures above the threshold level to deliver fluids at constant outlet pressures and flow rates. However, at fluid inlet pressures above the threshold level, such valves remain open and cannot serve as shut off valves, thus making it necessary to employ additional and separately operable valves to achieve this added function.

In accordance with one aspect of the present disclosure, the known regulating valves are modified to include closure mechanisms configured and arranged to override the modulating mode of the valves and to maintain closure of the valves at fluid inlet pressures both below and above the threshold level. The closure mechanisms may be selectively deactivated to thereby allow the valves to assume their normal pressure responsive regulating functions.

In accordance with still another aspect of the present disclosure, the vent opening communicating with the valve's spring chamber is provided with a seal which allows air to escape and enter the spring chamber, but which prevents the escape of liquid from the spring chamber in the event that the valve diaphragm is breached.

In accordance with another aspect of the present disclosure, a pressure relief mechanism is provided for relieving residual fluid inlet pressure below the threshold level when the valve is closed.

As used herein, the term "mobile device" refers to a device that may from time to time have a position that changes. Such changes in position may comprise of changes to direction, distance, and/or orientation. In particular examples, a mobile device may comprise of a cellular telephone, wireless communication device, user equipment, laptop computer, other personal communication system ("PCS") device, personal digital assistant ("PDA"), personal audio device ("PAD"), portable navigational device, or other portable communication device. A mobile device may also comprise of a processor or computing platform adapted to perform functions controlled by machine-readable instructions.

The methods and/or methodologies described herein may be implemented by various means depending upon applications according to particular examples. For example, such methodologies may be implemented in hardware, firmware, software, or combinations thereof. In a hardware implementation, for example, a processing unit may be implemented within one or more application specific integrated circuits ("ASICs"), digital signal processors ("DSPs"), digital signal processing devices ("DSPDs"), programmable logic devices ("PLDs"), field programmable gate arrays ("FPGAs"), processors, controllers, micro-controllers, microprocessors, electronic devices, other devices units designed to perform the functions described herein, or combinations thereof.

Some portions of the detailed description included herein are presented in terms of algorithms or symbolic representations of operations on binary digital signals stored within a memory of a specific apparatus or a special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

Reference throughout this specification to "one example," "an example," "embodiment," "another example", and/or similar language should be considered to mean that the particular features, structures, or characteristics may be combined in one or more examples. Any combination of any element in this disclosure with any other element in this disclosure is hereby disclosed. For example, an element ("one example," "an example," "embodiment," "another example", or similar language) can be combined with any element in this document ("one example," "an example," "embodiment," "another example", or similar language).

While there has been illustrated and described what are presently considered to be example features, it will be understood by those skilled in the art that various other modifications may be made, and equivalents may be substituted, without departing from the disclosed subject matter. Additionally, many modifications may be made to adapt a particular situation to the teachings of the disclosed subject matter without departing from the central concept described herein. Therefore, it is intended that the disclosed subject matter not be limited to the particular examples disclosed.

The invention claimed is:

1. A mixing device comprising:

an ingredient source coupled to a check valve and an ingredient pump, the ingredient pump coupled to an ingredient pump outlet line;

a water supply connected to a water CF Valve, the water CF Valve coupled to a water outlet line;

the ingredient pump outlet line coupled to a high flow CF Valve and a low flow CF Valve; and a controller configured to operate at least one of the high flow CF Valve and the low flow CF Valve based on formula data to produce an ingredient outlet flow from at least one of the high flow CF Valve and the low flow CF Valve;

wherein the ingredient outlet flow and a water outlet flow from the water outlet line mix to produce a product mixture based on the formula data.

2. The mixing device of claim 1, further comprising a pressure sensor configured to monitor the product mixture or ingredient availability.

3. The mixing device of claim 1, further comprising a temperature sensor configured to monitor the product mixture.

4. The mixing device of claim 1, further comprising a conductivity sensor configured to monitor the product mixture.

5. The mixing device of claim 1, further comprising a priming solenoid coupled to the ingredient pump and a priming solenoid outlet line coupled to the priming solenoid.

6. The mixing device of claim 1, further comprising a water check valve and a flush solenoid valve, where the flush solenoid valve is coupled between the ingredient check valve and the ingredient pump.

7. The mixing device of claim 1, further comprising a high flow orifice connected to the high flow CF Valve.

8. The mixing device of claim 1, further comprising a low flow orifice connected to the low flow CF Valve.

9. The mixing device of claim 1, further comprising a high flow orifice connected to the high flow CF Valve and a low flow orifice connected to the low flow CF Valve.

10. The mixing device of claim 9, wherein the low flow orifice is smaller than the high flow orifice.

11. A mixing device comprising:

a first ingredient source coupled to a first ingredient check valve and a first ingredient pump, the first ingredient pump coupled to a first ingredient pump outlet line;

a water supply connected to a water CF Valve, the water CF Valve coupled to a water outlet line;

the first ingredient pump outlet line coupled to a first ingredient high flow CF Valve and a first ingredient low flow CF Valve;

a second ingredient source coupled to a second ingredient check valve and a second ingredient pump, the second ingredient pump coupled to a second ingredient pump outlet line;

the second ingredient pump outlet line coupled to a second ingredient high flow CF Valve and a second ingredient low flow CF Valve;

a third ingredient source coupled to a third ingredient check valve and a third ingredient pump, the third ingredient pump coupled to a third ingredient pump outlet line;

the third ingredient pump outlet line coupled to a third ingredient high flow CF Valve and a third ingredient low flow CF Valve;

and a controller configured to operate at least one of: the first ingredient high flow CF Valve; the first ingredient low flow CF Valve; the second ingredient high flow CF Valve; the second ingredient low flow CF Valve; the third ingredient high flow CF Valve; and the third ingredient low flow CF Valve based on formula data to produce an ingredient outlet flow from at least one of the first ingredient high flow CF Valve;

the first ingredient low flow CF Valve; the second ingredient high flow CF Valve; the second ingredient low flow CF Valve; the third ingredient high flow CF Valve; and the third ingredient low flow CF Valve to produce an ingredient outlet flow;

wherein the ingredient outlet flow and a water outlet flow from the water outlet line mix to produce a product mixture based on the formula data.

12. The mixing device of claim 11, further comprising a conductivity sensor configured to monitor the product mixture.

13. The mixing device of claim 11, further comprising a temperature sensor configured to monitor the product mixture.

14. The mixing device of claim 11, further comprising a first ingredient high flow orifice connected to the first ingredient high flow CF Valve; a second ingredient high flow orifice connected to the second ingredient high flow CF Valve; and a third ingredient high flow orifice connected to the third ingredient high flow CF Valve.

15. The mixing device of claim 11, further comprising a first ingredient low flow orifice connected to the first ingredient low flow CF Valve; a second ingredient low flow orifice connected to the second ingredient low flow CF Valve; and a third ingredient low flow orifice connected to the third ingredient low flow CF Valve.

16. The mixing device of claim 1, further comprising a first ingredient high flow orifice connected to the first ingredient high flow CF Valve; a first ingredient low flow orifice connected to the first ingredient low flow CF Valve; a second ingredient high flow orifice connected to the second ingredient high flow CF Valve; a second ingredient low flow orifice connected to the second ingredient low flow CF Valve; a third ingredient high flow orifice connected to the third ingredient high flow CF Valve; and a third ingredient low flow orifice connected to the third ingredient low flow CF Valve.

17. The mixing device of claim 9, wherein the first ingredient low flow orifice is smaller than the first ingredient high flow orifice; the second ingredient low flow orifice is smaller than the second ingredient high flow orifice; and the third ingredient low flow orifice is smaller than the third ingredient high flow orifice.

18. A mixing device comprising:

a first ingredient source coupled to a first ingredient check valve and a first ingredient pump, the first ingredient pump coupled to a first ingredient pump outlet line;

a water supply connected to a water CF Valve, the water CF Valve coupled to a water outlet line;

the first ingredient pump outlet line coupled to a first ingredient high flow CF Valve and a first ingredient low flow CF Valve;

a second ingredient source coupled to a second ingredient check valve and a second ingredient pump, the second ingredient pump coupled to a second ingredient pump outlet line;

the second ingredient pump outlet line coupled to a second ingredient high flow CF Valve and a second ingredient low flow CF Valve;

a third ingredient source coupled to a third ingredient check valve and a third ingredient pump, the third ingredient pump coupled to a third ingredient pump outlet line;

the third ingredient pump outlet line coupled to a third ingredient high flow CF Valve and a third ingredient low flow CF Valve;

a controller configured to operate at least one of: the first ingredient high flow CF Valve; the first ingredient low flow CF Valve; the second ingredient high flow CF Valve; the second ingredient low flow CF Valve; the third ingredient high flow CF Valve; and the third ingredient low flow CF Valve based on formula data to produce an ingredient outlet flow from at least one of the first ingredient high flow CF Valve;

the first ingredient low flow CF Valve; the second ingredient high flow CF Valve; the second ingredient low flow CF Valve; the third ingredient high flow CF Valve; and the third ingredient low flow CF Valve to produce an ingredient outlet flow;

wherein the ingredient outlet flow and a water outlet flow from the water outlet line mix to produce a product mixture based on the formula data; and a first ingredient motor sensor configured to measure an electrical current status of the first ingredient motor.

19. The mixing device of claim 18, wherein the controller is configured to determine a first ingredient inventory status base on an electrical current status signal received from the first ingredient motor sensor.

20. The mixing device of claim 19, wherein the controller is configured to initiate at least one of an inventory warning notice for a first ingredient, an inventory alarm notification for the first ingredient, and generate an order request for the first ingredient based on the first ingredient inventory status.

* * * * *